(12) United States Patent
Plant

(10) Patent No.: US 12,089,666 B2
(45) Date of Patent: Sep. 17, 2024

(54) ENERGY ABSORBING SYSTEMS

(71) Applicant: RHEON LABS LTD, London (GB)

(72) Inventor: Daniel James Plant, South Glamorgan (GB)

(73) Assignee: RHEON LABS LTD., London (GB)

( * ) Notice: Subject to any disclaimer, the term of this patent is extended or adjusted under 35 U.S.C. 154(b) by 461 days.

(21) Appl. No.: 15/904,244

(22) Filed: Feb. 23, 2018

(65) Prior Publication Data

US 2018/0184732 A1    Jul. 5, 2018

Related U.S. Application Data

(63) Continuation of application No. PCT/GB2016/052650, filed on Aug. 25, 2016.

(51) Int. Cl.
*B32B 3/12* (2006.01)
*A41D 13/015* (2006.01)
(Continued)

(52) U.S. Cl.
CPC .......... *A41D 13/0156* (2013.01); *A41D 31/28* (2019.02); *A41D 31/285* (2019.02); *A42B 3/065* (2013.01); *A42B 3/124* (2013.01); *A63B 71/081* (2013.01); *B01D 39/1692* (2013.01); *B32B 3/12* (2013.01); *B32B 3/26* (2013.01); *B32B 3/30* (2013.01); *B32B 5/028* (2013.01); *B32B 5/06* (2013.01); *B32B 5/18* (2013.01); *B32B 5/245* (2013.01); *B32B 25/10* (2013.01); *B32B 27/12* (2013.01); *B32B 27/283* (2013.01); *F16F 7/121* (2013.01); *A41D 19/01523* (2013.01); *B32B 2266/0207* (2013.01); *B32B 2266/0214* (2013.01); *B32B 2266/0228* (2013.01);
(Continued)

(58) Field of Classification Search
None
See application file for complete search history.

(56) References Cited

U.S. PATENT DOCUMENTS 3,877,076 A * 4/1975 Summers ............... A42B 3/124
2/414
8,001,622 B1 * 8/2011 Culley .................. A42B 3/127
2/267
(Continued)

FOREIGN PATENT DOCUMENTS

CN          102395286 A    3/2012
GB          2220612 A      1/1990
(Continued)

OTHER PUBLICATIONS

Plant, Daniel James, The Optimisation of Flexible Impact-Protection Systems for Varying Strain Rates and Energies, Mar. 2014 (Year: 2014).*
(Continued)

*Primary Examiner* — Mary I Omori
(74) *Attorney, Agent, or Firm* — Dinsmore & Shohl LLP

(57) ABSTRACT

Disclosed herein are flexible energy absorbing systems and methods of manufacturing flexible energy absorbing systems. The systems include one or more cells of a strain rate sensitive material and having a re-entrant geometry. Some of the systems have an anisotropic geometry to provide a different response to impacts from different directions.

13 Claims, 33 Drawing Sheets

(51) Int. Cl.
  *A41D 31/28*   (2019.01)
  *A42B 3/06*    (2006.01)
  *A42B 3/12*    (2006.01)
  *A63B 71/08*   (2006.01)
  *B01D 39/16*   (2006.01)
  *B32B 3/26*    (2006.01)
  *B32B 3/30*    (2006.01)
  *B32B 5/02*    (2006.01)
  *B32B 5/06*    (2006.01)
  *B32B 5/18*    (2006.01)
  *B32B 5/24*    (2006.01)
  *B32B 25/10*   (2006.01)
  *B32B 27/12*   (2006.01)
  *B32B 27/28*   (2006.01)
  *F16F 7/12*    (2006.01)
  *A41D 19/015*  (2006.01)

(52) U.S. Cl.
  CPC ............... *B32B 2266/0278* (2013.01); *B32B 2266/0292* (2013.01); *B32B 2307/54* (2013.01); *B32B 2307/546* (2013.01); *B32B 2307/56* (2013.01); *B32B 2307/732* (2013.01); *B32B 2437/00* (2013.01); *B32B 2571/00* (2013.01); *B32B 2571/02* (2013.01); *F16F 2224/0225* (2013.01)

(56) References Cited

U.S. PATENT DOCUMENTS

| | | | |
|---|---|---|---|
| 9,572,390 B1* | 2/2017 | Simpson | A42B 3/125 |
| 2002/0185795 A1* | 12/2002 | Le | B60R 21/04 |
| | | | 267/80 |
| 2004/0171321 A1* | 9/2004 | Plant | A41D 31/285 |
| | | | 442/64 |
| 2005/0133324 A1 | 6/2005 | Soto Bailon et al. | |
| 2005/0249917 A1 | 11/2005 | Trentacosta et al. | |
| 2006/0066134 A2 | 3/2006 | Carroll et al. | |
| 2006/0070171 A1 | 4/2006 | Copeland et al. | |
| 2011/0171420 A1* | 7/2011 | Yang | F16F 9/0418 |
| | | | 428/116 |
| 2011/0239346 A1 | 10/2011 | Doherty et al. | |
| 2012/0021167 A1* | 1/2012 | Plant | B25G 1/10 |
| | | | 428/116 |
| 2013/0152286 A1 | 6/2013 | Cormier et al. | |
| 2013/0152287 A1* | 6/2013 | Cormier | A42B 3/124 |
| | | | 2/459 |
| 2013/0291289 A1* | 11/2013 | Szalkowski | A42B 3/12 |
| | | | 2/414 |
| 2014/0007322 A1* | 1/2014 | Marz | A42B 3/065 |
| | | | 2/411 |
| 2014/0097052 A1* | 4/2014 | Reynolds | F16F 1/376 |
| | | | 188/377 |
| 2014/0101816 A1 | 4/2014 | Toronjo | |
| 2014/0109286 A1* | 4/2014 | Blakely | A42B 1/22 |
| | | | 2/69 |
| 2015/0232053 A1 | 8/2015 | Cormier et al. | |
| 2015/0257471 A1* | 9/2015 | Warmouth | A42B 3/122 |
| | | | 2/413 |

FOREIGN PATENT DOCUMENTS

| | | |
|---|---|---|
| GB | 2476839 A | 7/2011 |
| GB | 2518668 A | 4/2015 |
| JP | 2007254920 A | 10/2007 |
| WO | 2004043688 A1 | 5/2004 |
| WO | 2010076257 A2 | 7/2010 |
| WO | 2012045169 A1 | 4/2012 |

OTHER PUBLICATIONS

First Office Action for Chinese Patent Application No. 2016800623194, dated May 5, 2019, 7 pages.
Second Office Action for Chinese Patent Application No. 2016800623194, dated Dec. 19, 2019, 8 pages.
Third Office Action for Chinese Patent Application No. 2016800623194, dated May 25, 2020, 4 pages.
Fourth Office Action for Chinese Patent Application No. 2016800623194, dated Dec. 31, 2020, 4 pages.
Examination Report for European Patent Application No. 16770294.3, dated Jul. 8, 2019, 6 pages.
Examination Report for European Patent Application No. 20187531.7, dated Feb. 25, 2021, 11 pages.
Search Report for United Kingdom Patent Application No. GB1602151.1, dated Jul. 1, 2016, 3 pages.
Office Action for Japanese Patent Application No. 2018-508224, dated Nov. 4, 2020, 6 pages.
Fifth Office Action for Chinese Patent Application No. 2016800623194, dated Apr. 14, 2021, 3 pages.
Search Report for United Kingdom Patent Application No. GB1804830.6, dated Aug. 10, 2021, 3 pages.
Decision of Rejection for Chinese Patent Application No. 201680062319.4, dated Nov. 17, 2021, 9 pages.

* cited by examiner

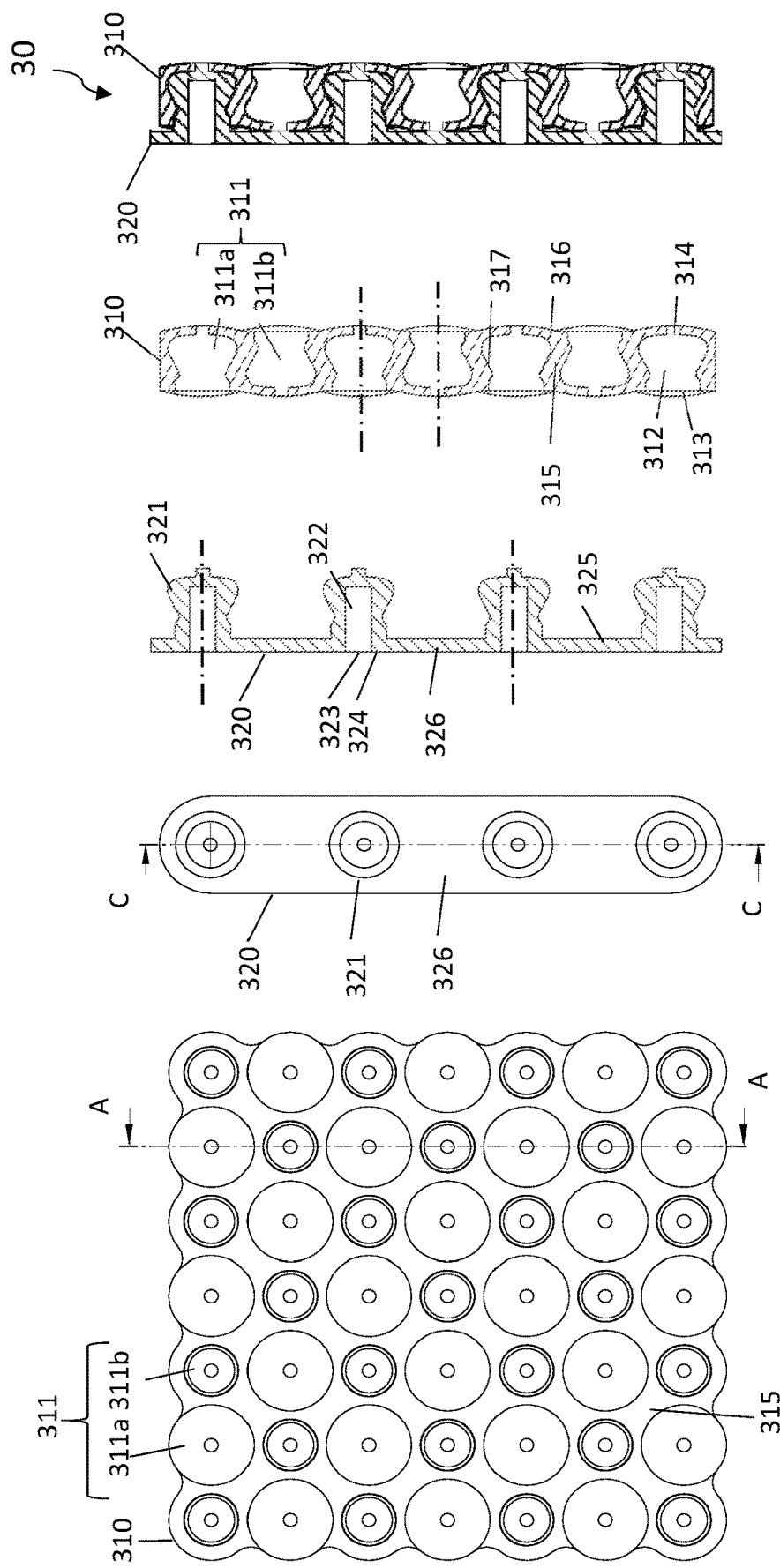

| Sample | kN | Accel | Thickness | Improvement in Performance | Increase in Mass |
|---|---|---|---|---|---|
| S2F 12mm no pins | 20.1 | 343 | 12mm | Control | Control |
| S2 Pins | 13.807 | 236 | 12mm | 31.2% | 5.5% |
| S2F Pins | 13.8 | 238 | 12mm | 30.6% | 5.6% |
| | | | | | |
| S2F Soft | 21.8 | 375 | 12mm | Control | Control |
| S2 Pins Soft | 14.4 | 248 | 12mm | 33.9% | 5.5% |
| S2F Pins Soft | 14.8 | 251 | 12mm | 33.1% | 5.6% |
| | | | | | |
| S2F Pins | 13.8 | 238 | 12mm | Control | Control |
| S2 16mm no Pins | 13.2 | 227 | 16mm | 4.6% | 34.0% |
| | | | | | |
| Solid 12mm | 15.8 | 272 | 12mm | Control | Control |
| S2F Pins | 13.8 | 238 | 12mm | 12.5% | -37.9% |

Fig. 10

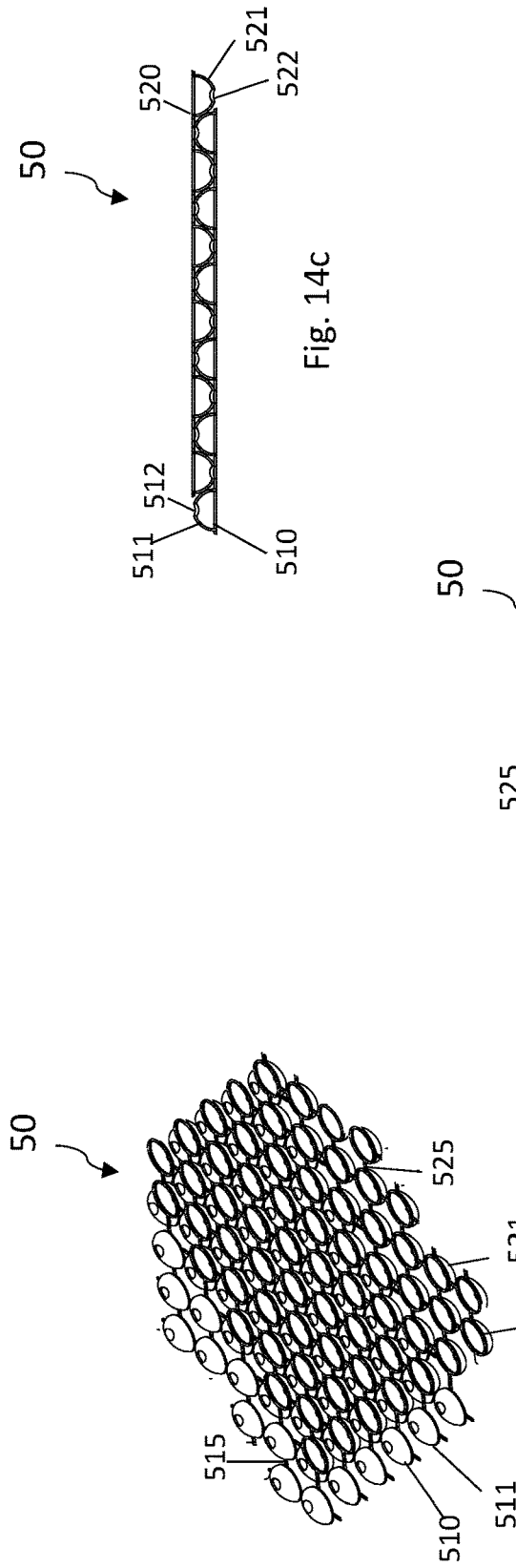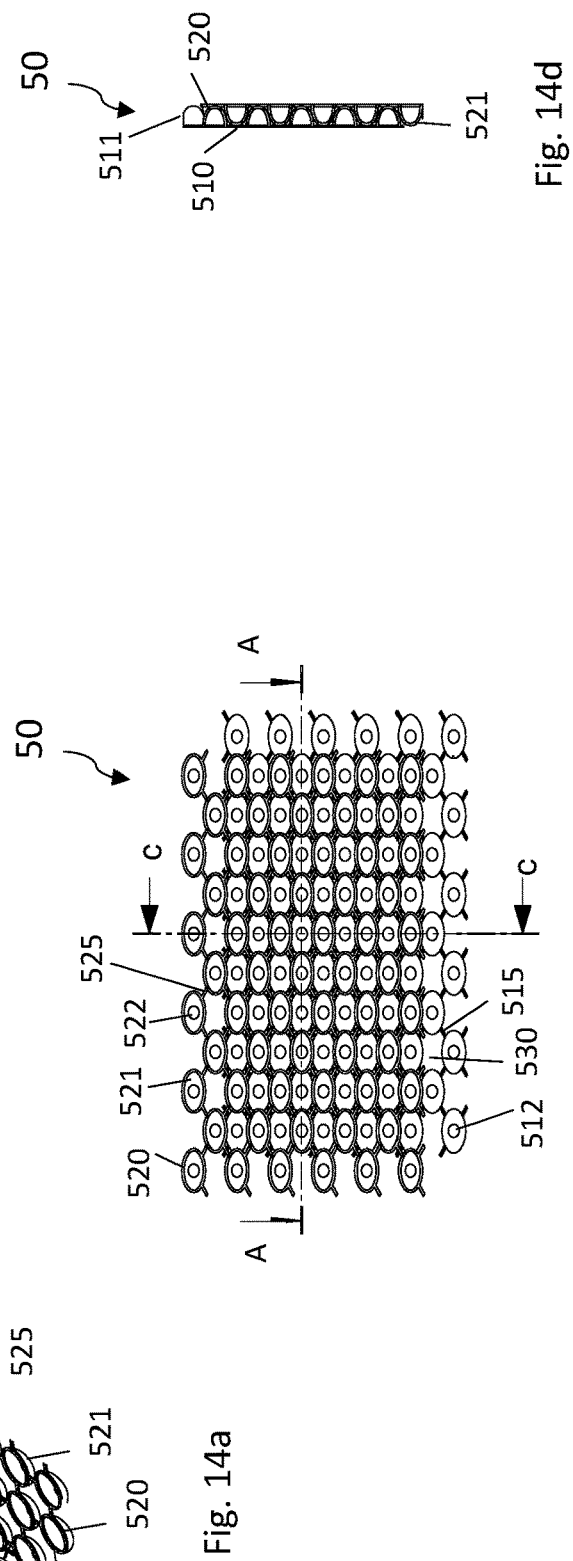

| Drop height | EPS helmet Peak accel. | Layer 310 Peak accel. | Body 55 Peak accel. |
|---|---|---|---|
| 100mm | 58.3g | 27.55g | 27.27g |
| 150mm | 83.2g | 39.82g | 38.64g |
| 200mm | 96.1g | 50.17g | 44.5g |

Fig. 16

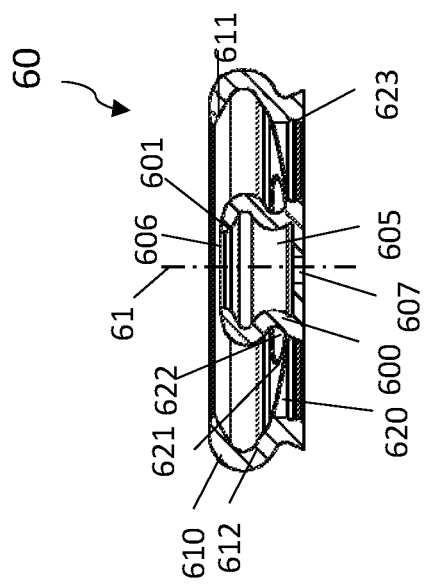
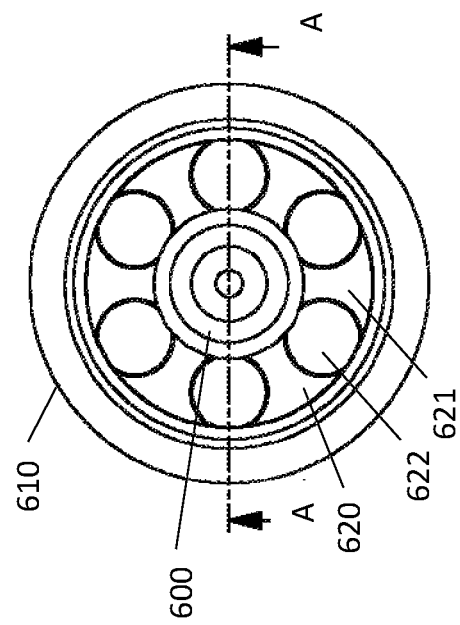
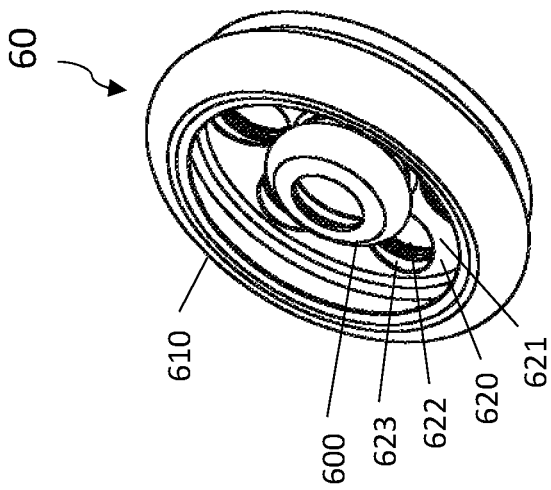

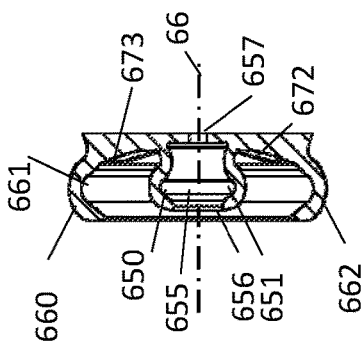
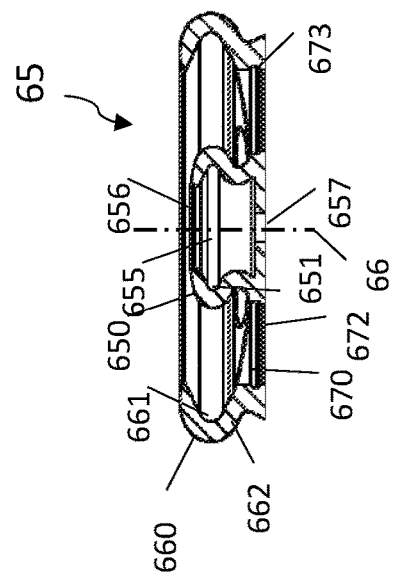
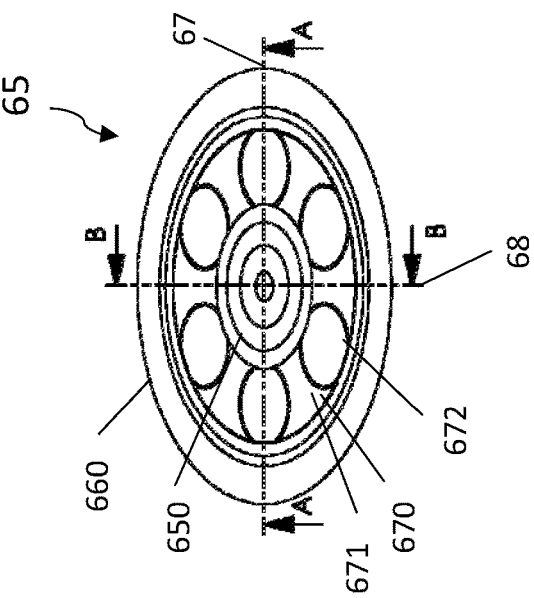
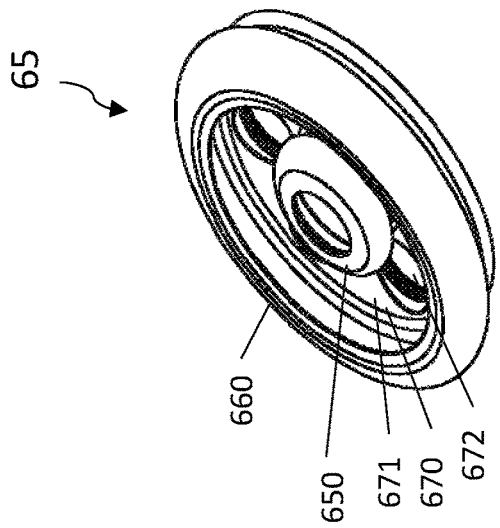
Fig. 18d
Fig. 18c
Fig. 18b
Fig. 18a

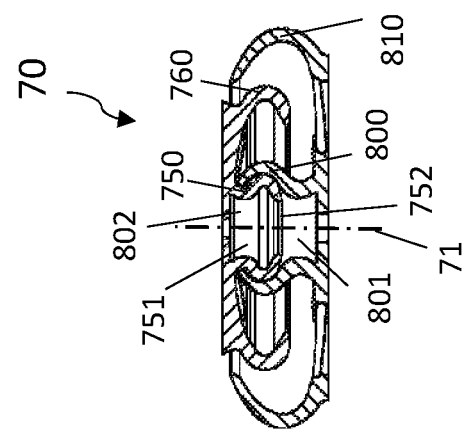
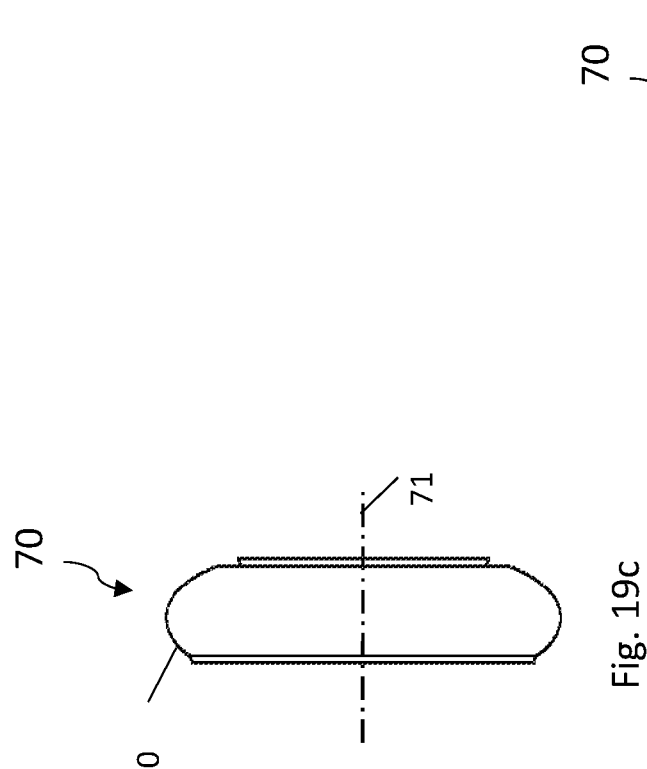
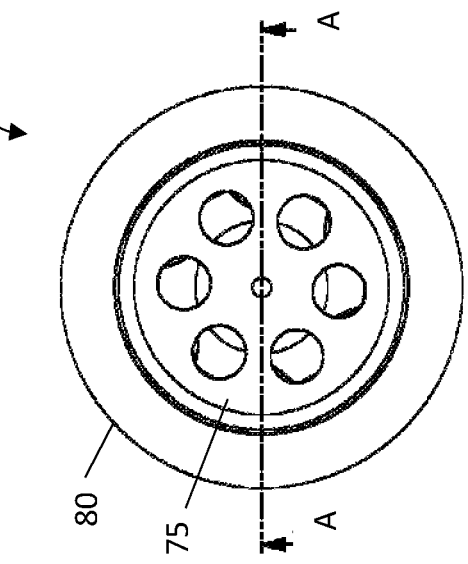
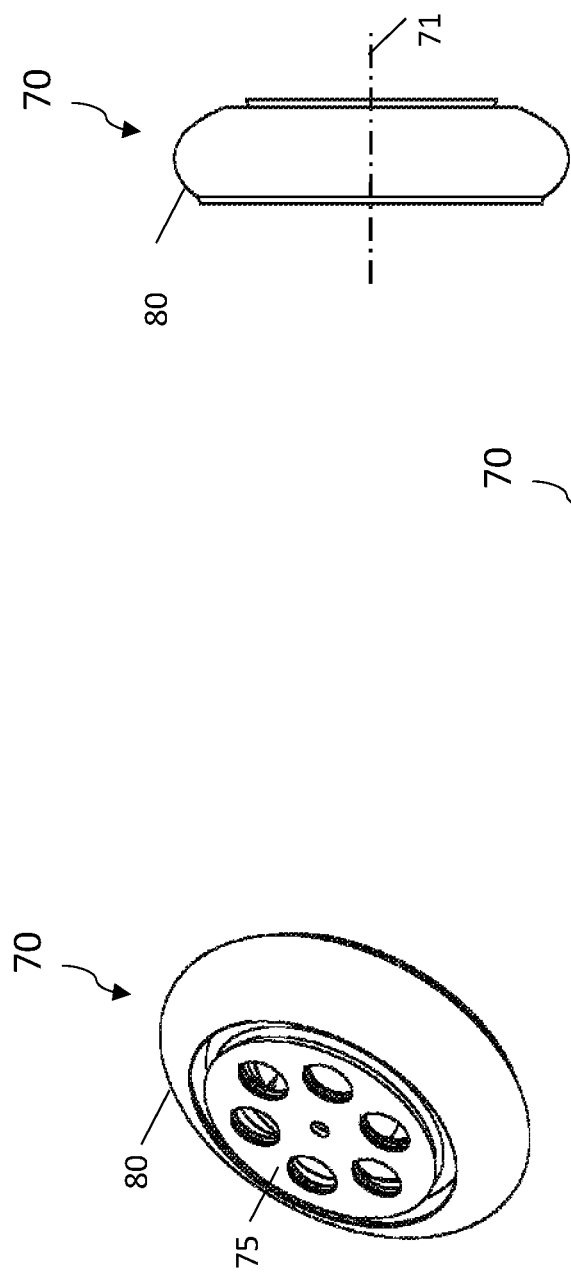

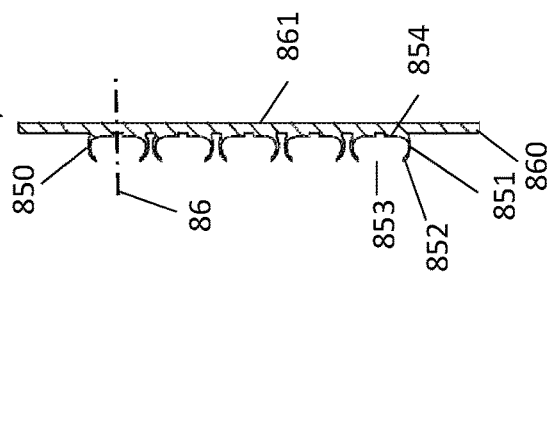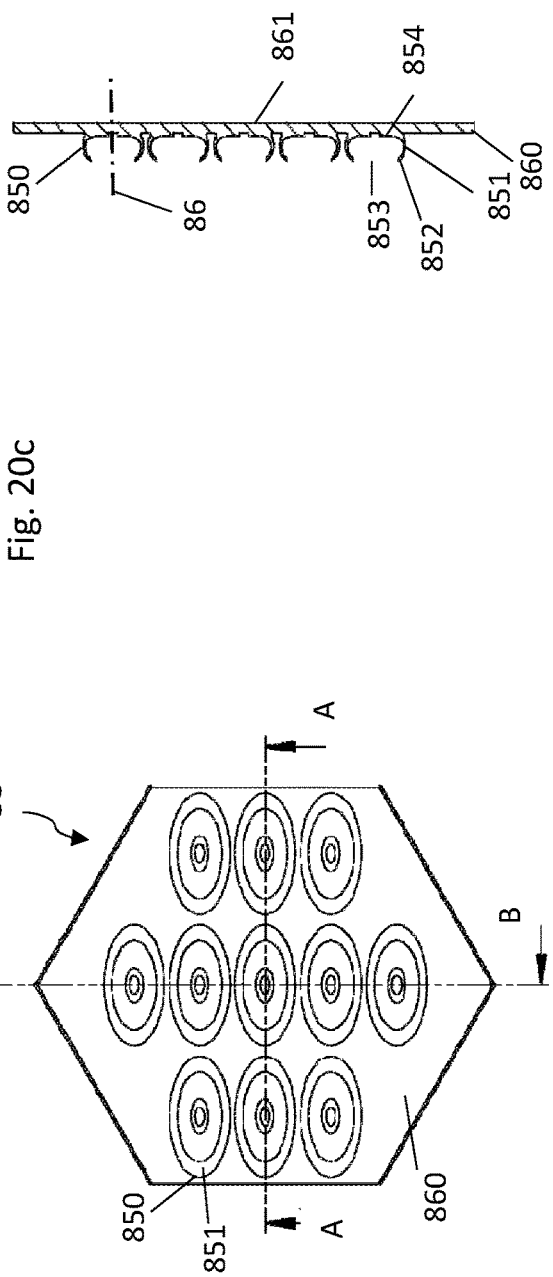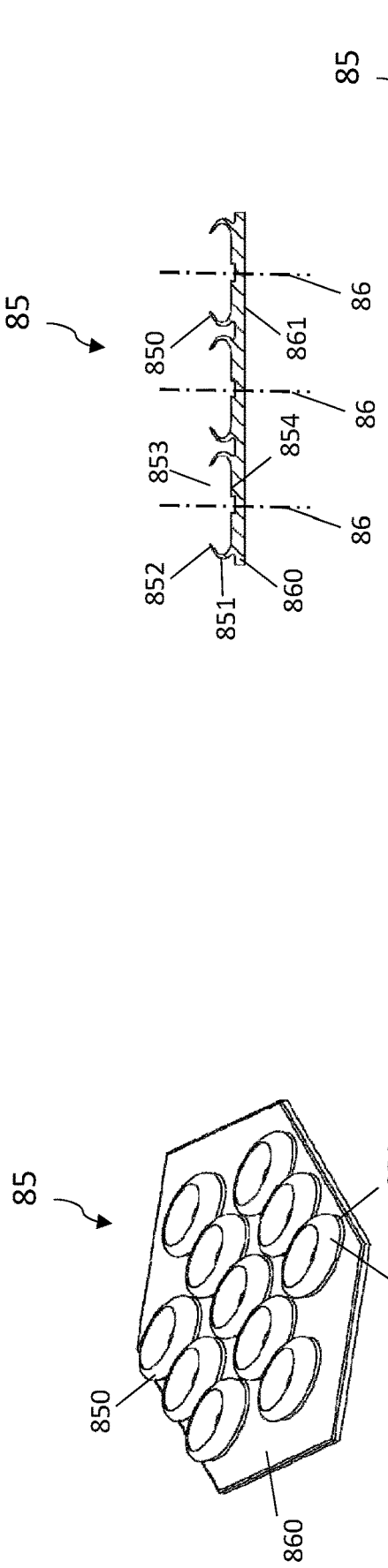
Fig. 20d
Fig. 20c
Fig. 20b
Fig. 20a

| Probability of Sustaining MTBI | Linear Acceleration | Rotational Acceleration |
|---|---|---|
| 25% | 66 G | 4600 rad/s$^2$ |
| 50% | 82 G | 5900 rad/s$^2$ |
| 80% | 106 G | 7900 rad/s$^2$ |

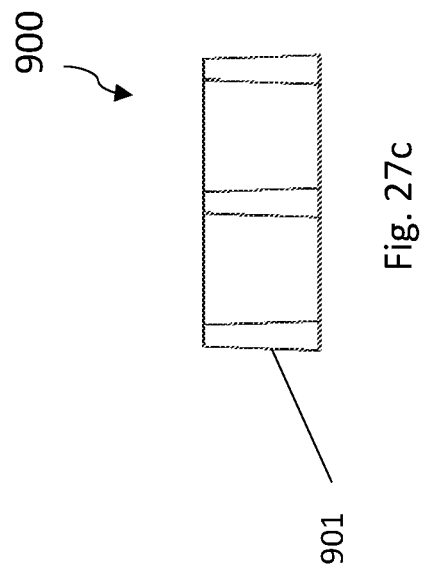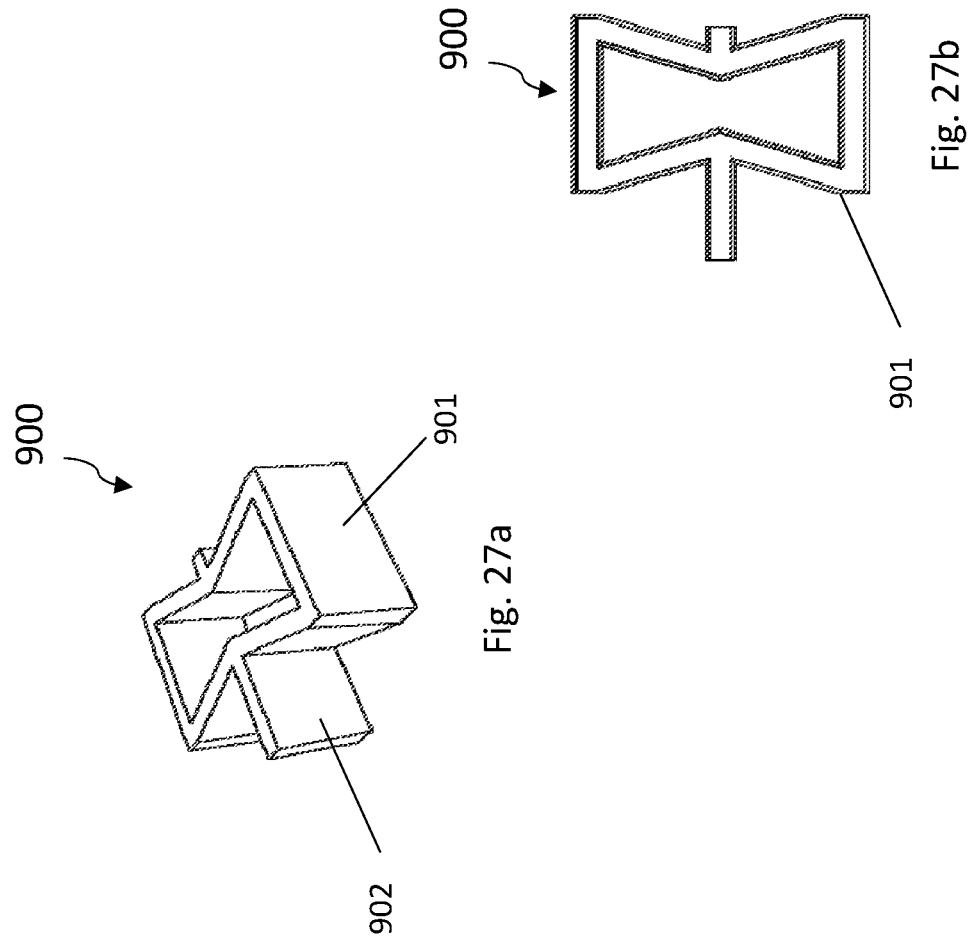

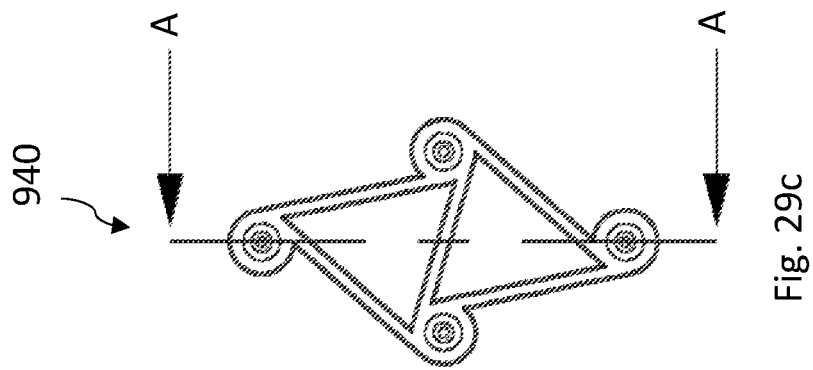
Fig. 29c
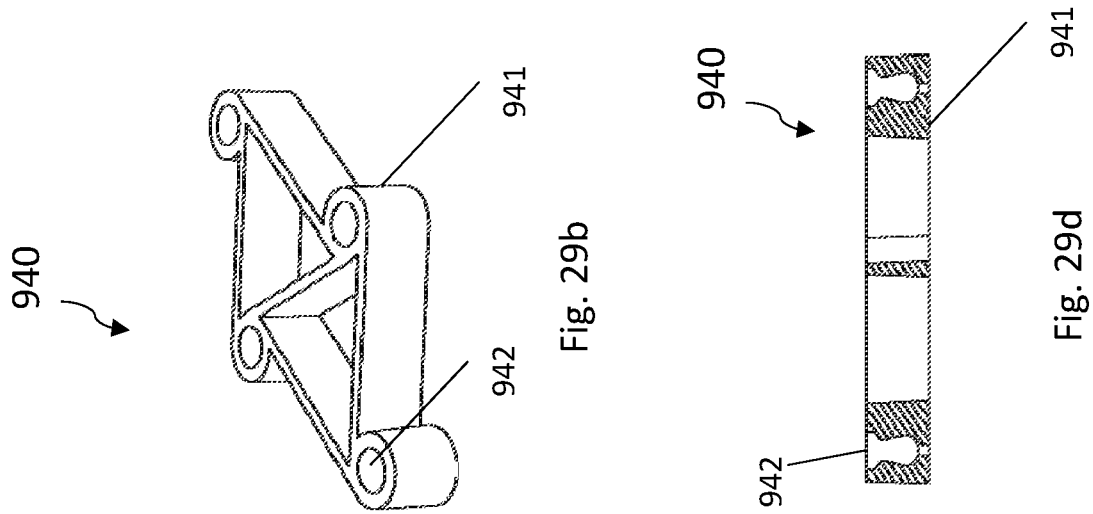
Fig. 29b
Fig. 29d
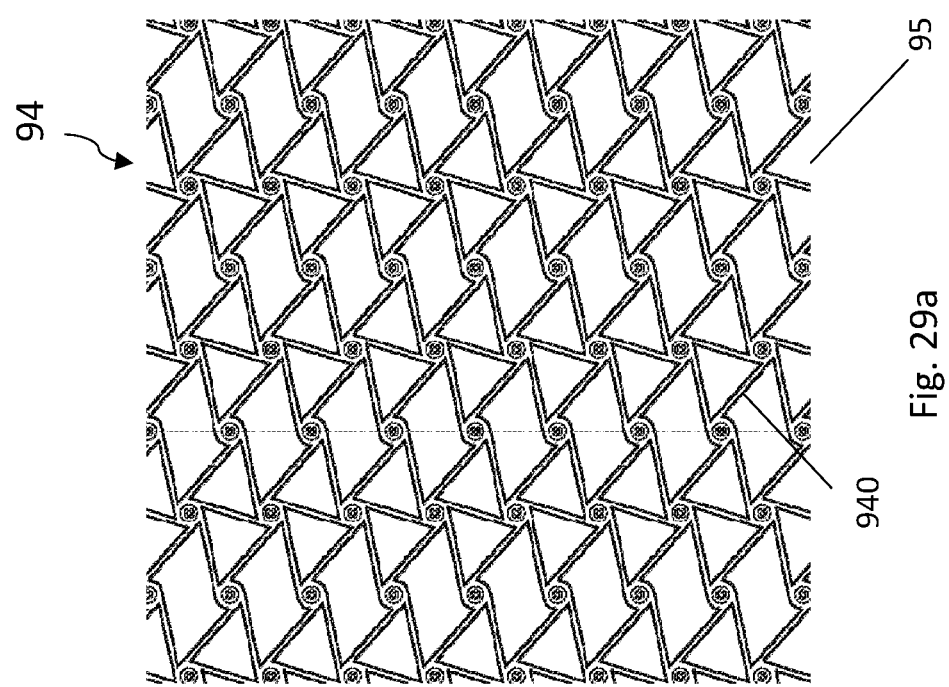
Fig. 29a

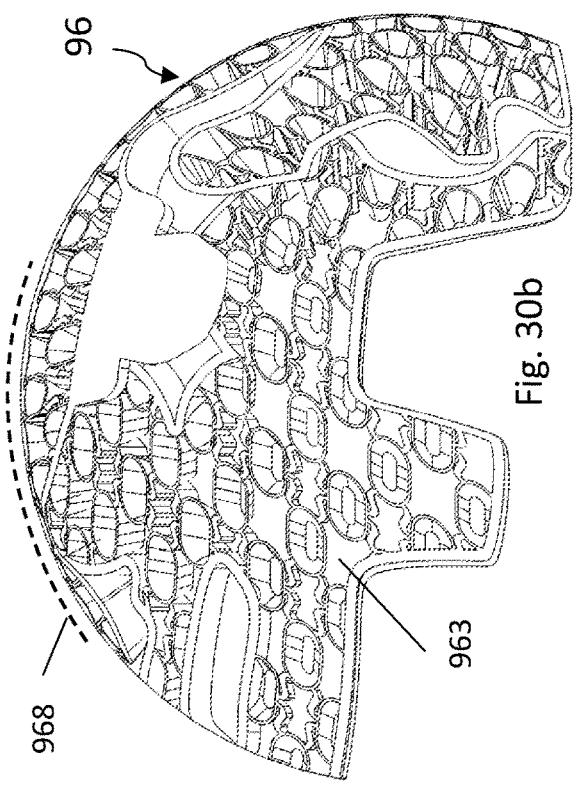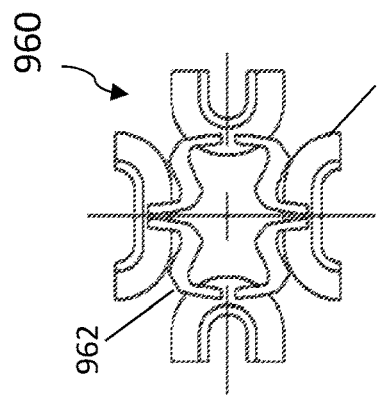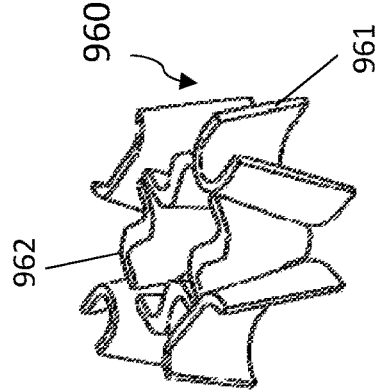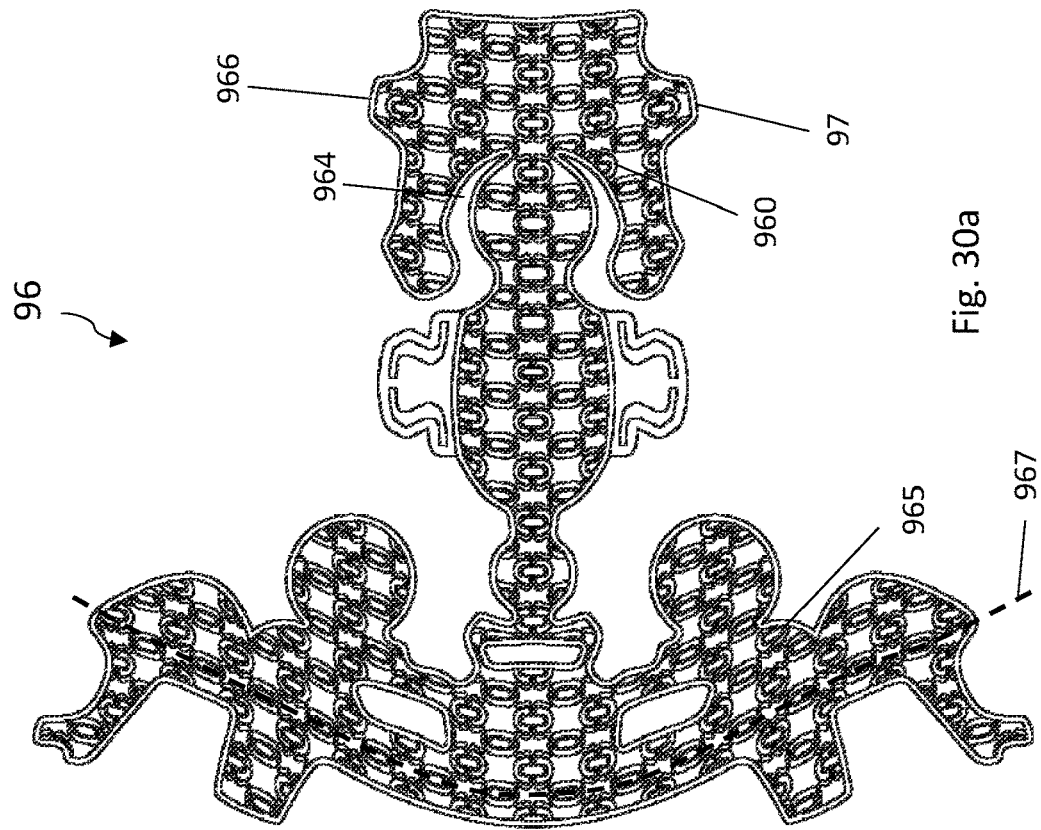

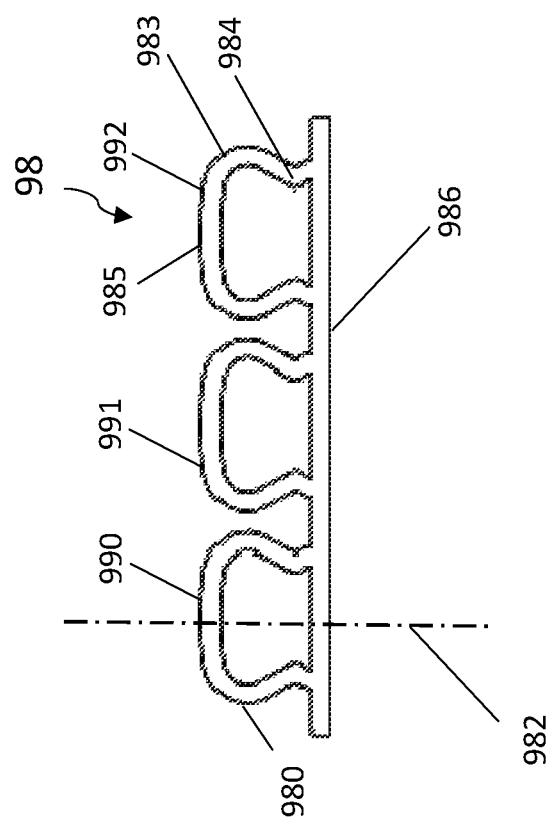
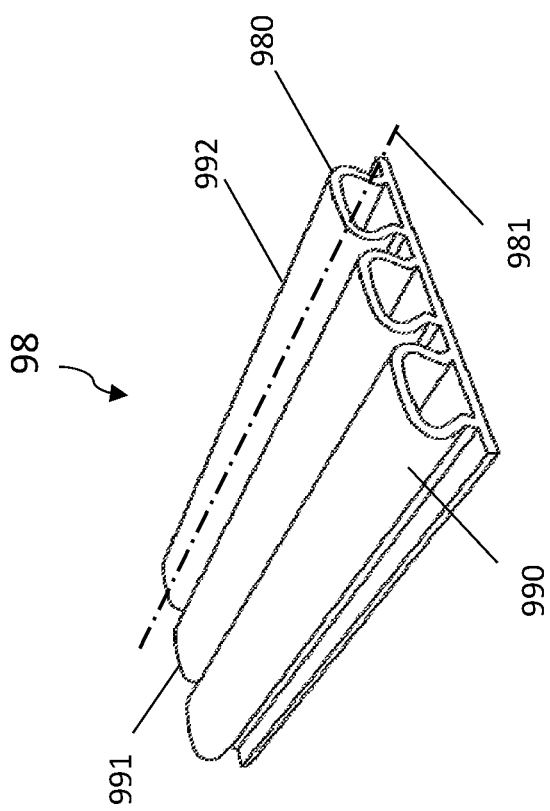
Fig. 31b
Fig. 31a

| Flexible Energy Absorbing System Tested | Helmet style | Impact Velocity (m/s) | Reference Linear Acc (g) | Reference Rotational Acc (rad/s²) | Advanced Liner Linear Acc (g) | Advanced Liner Rotational Acc (rad/s²) | Reduction in Linear Acc (%) | Reduction in Rotational Acc (%) |
|---|---|---|---|---|---|---|---|---|
| Fig 3, 2 cells, 10mm thick | Hockey | 4.4 | 40.9 | 5870 | 27.4 | 3141 | 33.0 | 46.5 |
| Fig 3, 1 cell, 10mm thick | Ski/snow | 4.4 | 51.3 | 5284 | 25.3 | 2666 | 50.7 | 49.5 |
| Fig 3, 1 cell, 5mm thick | Ski/snow | 4.4 | 39.9 | 4105 | 36.3 | 3663 | 9.0 | 10.8 |
| Fig 8a | American football | 5.5 | 62.8 | 6881 | 33.7 | 3394 | 46.3 | 50.7 |
| Fig 15 | Off-road M/cycle | 6.1 | 44.7 | 5420 | 43 | 4844 | 3.8 | 10.6 |
| Fig 17, 6mm thick | Road Bicycle | 4.4 | 39.2 | 4429 | 25.4 | 2914 | 35.2 | 34.2 |
| | Road Motorcycle | 4.4 | 37.6 | 4460 | 25.2 | 3103 | 33.0 | 30.4 |
| | Ski/snow | 4.4 | 51.3 | 5284 | 39 | 4426 | 24.0 | 16.2 |
| | Equestrian | 4.4 | 44.4 | 5854 | 41.1 | 5058 | 7.4 | 13.6 |
| Fig 17, 8mm thick | Equestrian | 4.4 | 44.4 | 5854 | 36.1 | 4332 | 18.7 | 26.0 |
| Fig 18 | Road M/cycle | 4.4 | 37.6 | 4460 | 31.2 | 3755 | 17.0 | 15.8 |
| Fig 18, dome inner cell | Road Bicycle | 4.4 | 39.2 | 4429 | 29.4 | 3511 | 25.0 | 20.7 |
| Fig 18 in Fig 19 config | Road M/cycle | 4.4 | 37.6 | 4460 | 25.4 | 2720 | 32.4 | 39.0 |
| Fig 19 | Road M/cycle | 4.4 | 37.6 | 4460 | 25.2 | 2684 | 33.0 | 39.8 |
| | Ski/snow | 4.4 | 51.3 | 5284 | 32.2 | 3329 | 37.2 | 37.0 |
| | Equestrian | 4.4 | 44.4 | 5854 | 31.1 | 3721 | 30.0 | 36.4 |
| | Off-road M/cycle | 4.4 | 38 | 4816 | 21.7 | 2423 | 42.9 | 49.7 |
| Fig 20, greater overhang | Hockey | 4.4 | 40.9 | 5870 | 27.3 | 3824 | 33.3 | 34.9 |
| | Off-road Bicycle | 4.4 | 53.3 | 5731 | 37.1 | 4013 | 30.4 | 30.0 |
| Fig 20, smaller overhang | Hockey | 4.4 | 40.9 | 5870 | 30.8 | 4126 | 24.7 | 29.7 |
| | Off-road Bicycle | 6 | 53.3 | 6192 | 44.9 | 4929 | 15.8 | 20.4 |
| Fig 28a-c, 2 cells, 6mm thick | Hockey | 5.5 | 52.1 | 7233 | 43.2 | 5029 | 17.1 | 30.5 |
| | Ski/snow | 4.4 | 39.9 | 4105 | 27.5 | 2842 | 31.1 | 30.8 |
| | Off-road M/cycle | 4.4 | 38 | 4816 | 22.8 | 2794 | 40.0 | 42.0 |

Fig. 32a

| Flexible Energy Absorbing System Tested | Helmet style | Impact Velocity (m/s) | Reference | | Advanced Liner | | Reduction in Linear Acc (%) | Reduction in Rotational Acc (%) |
|---|---|---|---|---|---|---|---|---|
| | | | Linear Acc (g) | Rotational Acc (rad/s²) | Linear Acc (g) | Rotational Acc (rad/s²) | | |
| Fig 28a-c, 1 cell, 6mm thick | American football | 5.5 | 62.8 | 6881 | 48.6 | 5757 | 22.6 | 16.3 |
| Fig 28a-c, 1 cell, 3mm thick, textile base | Hockey | 5.5 | 52.1 | 7233 | 43.7 | 4779 | 16.1 | 33.9 |
| Fig 31a-b | Off-road Bicycle | 4.4 | 53.7 | 7258 | 49.6 | 5771 | 7.6 | 20.5 |

ENERGY ABSORBING SYSTEMS

CLAIM OF PRIORITY UNDER 35 U.S.C. § 119

This application is a continuation of PCT/GB2016/052650, filed Aug. 25, 2016, which claims priority to Great Britain Patent Application No. 1515169.9, filed Aug. 26, 2015, and Great Britain Patent Application No. 1602151.1, filed Feb. 5, 2016, all of which are herein incorporated by reference in their entirety.

INTRODUCTION

Technical Field

The present invention relates to energy absorbing systems. In particular, but not exclusively, the present invention relates to flexible energy absorbing systems comprising energy absorbing materials such as strain rate sensitive materials.

Background

Known impact protection systems typically fall into two types, namely those with a rigid exterior shell, which can be uncomfortable to wear (e.g. roller blade or skateboard knee or elbow pads) and those with foam or foam laminate pads (e.g. inserts for ski clothing), which provide poor levels of protection.

There is therefore a need to provide energy absorbing systems which are both lightweight and flexible, thus being comfortable to wear while still being able to dissipate and absorb shock loads applied to them, providing more effective protection.

U.S. patent application No. US-A-2012/021167 discloses the unexpected performance improvement of flexible energy systems which utilize a re-entrant geometry. The systems may include a tensile layer and may include materials that exhibit strain rate sensitivity. In US-A-2012/021167, the re-entrant structures are often considered as a single unit, which is repeated, having a re-entrant angle, or some negative draft angle. In some cases, the geometry lends itself to buckling or folding inwards during impact, improving the impact energy absorbing properties.

The following description and the related drawings set forth in detail certain illustrative features of one or more embodiments.

SUMMARY

According to a first aspect of the present invention, there is provided a flexible energy absorbing system comprising a plurality of layers, wherein each layer comprises a strain rate sensitive material, wherein each layer comprises one or more cells, wherein each of the one or more cells in a first layer in the plurality of layers comprises a re-entrant geometry along an axis, and wherein each of the one or more cells in a second layer in the plurality of layers comprises an at least partially overlapping region along the axis with a respective one or more cells in at least the first layer.

According to a second aspect of the present invention, there is provided a method of manufacturing a flexible energy absorbing system, the method comprising: forming a plurality of layers comprising a strain rate sensitive material; forming one or more cells in each layer in the plurality of layers; forming one or more cells comprising a re-entrant geometry along an axis in at least a first layer in the plurality of layers; and overlapping, at least partially, the one or more cells in a second layer in the plurality of layers with a respective one or more cells in at least the first layer in the plurality of layers.

According to a third aspect of the present invention, there is provided a flexible energy absorbing system comprising a first layer comprising one or more cells, each of the one or more cells having a re-entrant geometry, and a second layer comprising one or more protrusions, wherein the one or more protrusions in the second layer are configured to interlock with respective one or more cells in the first layer and wherein at least one of the first and second layers comprises a strain rate sensitive material.

According to a fourth aspect of the present invention, there is provided a method of manufacturing a flexible energy absorbing system, the method comprising: forming a first layer; forming one or more cells in the first layer, each of the one of more cells having a re-entrant geometry; forming a second layer; and forming one or more protrusions in the second layer, wherein the one or more protrusions in the second layer are configured to interlock with respective one or more cells in the first layer, and wherein at least one of the layers comprises strain rate sensitive material.

According to a fifth aspect of the present invention, there is provided a flexible energy absorbing system comprising a body, the body comprising an inner cell and an outer cell, wherein the inner cell is within the outer cell, wherein the inner cell is retained within the outer cell by a web, wherein at least one of the inner cell and the outer cell comprise a re-entrant geometry, wherein the body comprises a strain rate sensitive material, wherein the inner cell comprises an overhang at an opening of the inner cell, wherein the outer cell comprises an overhang at an opening of the outer cell, and wherein the overhang of the outer cell is different from the overhang of the inner cell.

According to a sixth aspect of the present invention, there is provided a method of manufacturing a flexible energy absorbing system, the method comprising forming a body, wherein forming the body comprises: forming an inner cell; forming an outer cell, wherein at least one of the inner cell and outer cell is formed with a re-entrant geometry; forming a web to retain the inner cell within the outer cell; forming an overhang in the inner cell at an opening of the inner cell; and forming a different overhang in the outer cell at an opening of the outer cell, wherein the body comprises strain rate sensitive material.

According to a seventh aspect of the present invention, there is provided a flexible energy absorbing system comprising a body, the body comprising an inner cell and an outer cell, wherein the inner cell is within the outer cell, wherein the inner cell is retained within the outer cell by a web, and wherein at least one of the inner cell and the outer cell comprise a re-entrant geometry, and wherein the body comprises a strain rate sensitive material, and wherein the inner cell and the outer cell are orientated in the same direction.

According to an eighth aspect of the present invention, there is provided a flexible energy absorbing system comprising a sheet of one or more cells, wherein at least one cell in the sheet comprises a re-entrant geometry, wherein the at least one cell comprises an anisotropic geometry, and wherein the sheet comprises an elastomeric material.

According to a ninth aspect of the present invention, there is provided a flexible energy absorbing system comprising a cell, wherein the cell comprises a constant cross-section along a first axis, wherein the cell comprises a re-entrant geometry along a second axis, and wherein the cell comprises a strain rate sensitive material.

According to a tenth aspect of the present invention, there is provided a flexible energy absorbing system comprising a plurality of cells on a plane, wherein the cells comprise a strain rate sensitive material, wherein the system is configurable in a planar form and in an aspherical form, and wherein, when configured in the aspherical form, the cells comprise a re-entrant geometry.

According to an eleventh aspect of the present invention, there is provided body armor comprising a system according to any of the first, third, fifth and seventh to tenth aspects of the present invention.

According to a twelfth aspect of the present invention, there is provided a helmet comprising a system according to any of the first, third, fifth and seventh to tenth aspects of the present invention.

According to a thirteenth aspect of the present invention, there is provided a method of manufacturing a flexible energy absorbing system, the method comprising: forming a cell having a constant cross-section along a first axis, forming the cell to have a re-entrant geometry along a second axis; and forming the cell using a strain rate sensitive material.

According to a fourteenth aspect of the present invention, there is provided a method of manufacturing a flexible energy absorbing system, the method comprising: forming a cell on a plane, forming the cell using a strain rate sensitive material; forming the system to be configurable in a planar form and in an aspherical form; and forming the system such that, when configured in the aspherical form, the cell comprises a re-entrant geometry.

According to a fifteenth aspect of the present invention, there is provided a flexible energy absorbing system comprising a plurality of cells, wherein the cells comprise a strain rate sensitive material, wherein the system is configurable in a planar form and a non-planar form, and wherein, when configured in the non-planar form, the cells comprise a re-entrant geometry.

According to a sixteenth aspect of the present invention, there is provided a system substantially in accordance with any of the examples as described herein with reference to and illustrated by the accompanying drawings.

Further features and advantages of the invention will become apparent from the following description of preferred embodiments of the invention, given by way of example only, which is made with reference to the accompanying drawings.

BRIEF DESCRIPTION OF THE DRAWINGS

The appended figures depict certain aspects of the one or more embodiments and are therefore not to be considered limiting of the scope of this disclosure.

FIGS. 8a-e show top views, cross-section views and an assembled cross-section view of an embodiment according to embodiments of the present invention;

FIG. 10 shows energy absorbing performance results for examples of embodiments according to the present invention;

FIGS. 14a-d show an isometric view, a tow view and two cross-sectional views of embodiments according to the present invention;

FIG. 16 shows energy absorbing performance results for examples of embodiments according to the present invention;

FIGS. 17a-c show an isometric view, front view and cross-section view of a body according to embodiments of the invention, respectively;

FIGS. 18a-d show an isometric view, front view, side view and two cross-section views of a body according to embodiments of the invention, respectively;

FIGS. 19a-d show an isometric view, front view, side view and cross-section view of an energy absorbing system according to embodiments of the invention, respectively;

FIGS. 20a-d show an isometric view, front view, side view and two cross-section views of a body according to embodiments of the invention, respectively;

FIGS. 27a-c show an isometric view, top view and side view of a cell of an energy absorbing system according to embodiments of the invention, respectively;

FIGS. 29a-d show a top view of an energy absorbing system according to embodiments of the invention in a planar form and an isometric view, top view and cross-section view of a cell of the energy absorbing system, respectively;

FIGS. 30a-d show a top view of an energy absorbing system according to embodiments of the invention in a planar form, a side view of the energy absorbing system in an aspherical form and an isometric view and a top view of a cell of the energy absorbing system, respectively;

FIGS. 31a-b show an isometric view and side view of an energy absorbing system according to embodiments of the invention, respectively;

FIGS. 32a-b show test results for energy absorbing systems according to embodiments of the invention compared to a reference; and FIG. 33 shows drop height v mean peak linear acceleration results for examples of embodiments according to the present invention.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
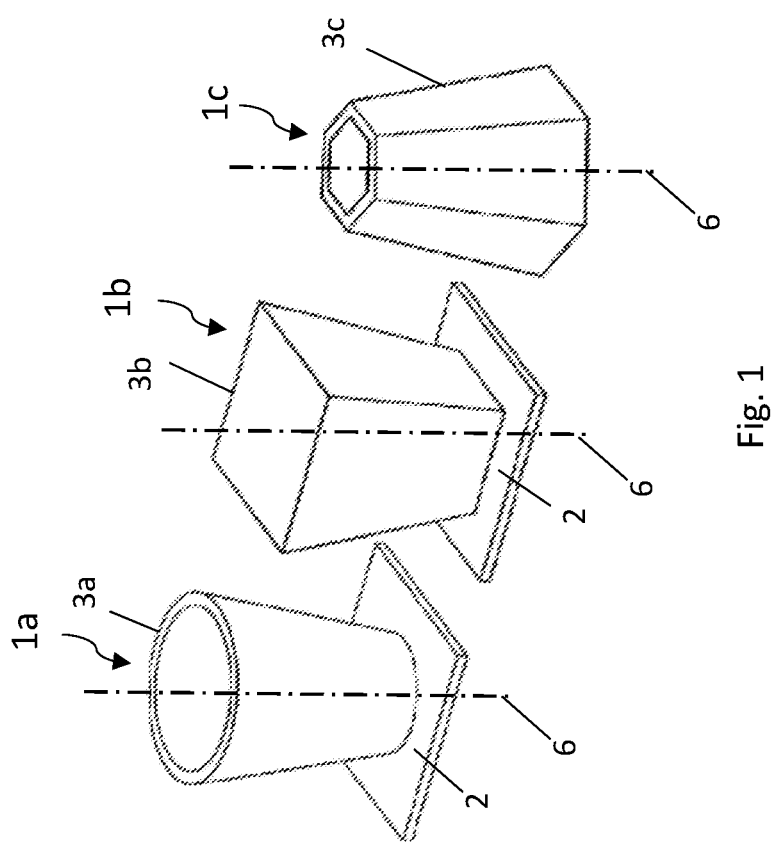
FIG. 1 shows isometric views of three examples of cells with a re-entrant geometry according to embodiments of the invention.

Embodiments of the present invention comprise flexible energy absorbing systems and methods of manufacturing flexible energy absorbing systems.

Some embodiments of the present invention relate to energy absorbing systems which comprise at least some "strain rate sensitive material". A strain rate sensitive material can be defined as a material whose properties change with increasing strain rate. In some embodiments, the strain rate sensitive material comprises chopped fibres.

Typical materials, such as, polyurethane (PU), expanded polystyrene (EPS), vinyl nitrile rubber (VNR) and epoxy resin or polymers such as nylon, display very little variation in loading rate for different strain rates. Typically, the difference ranges by only a few percent, typically less than 10%. In contrast, strain rate sensitive materials can exhibit a change in loading rate of above 100% and can be as high as 3000%. The properties of a strain rate sensitive material may for example change more than 20% when doubling the strain rate, and can change over 50% with increasing strain rate. An increase of 100% in loading rate means that the Young's modulus of the strain rate sensitive material has doubled.

In embodiments, the strain rate sensitive material comprises an active compound whose mechanical characteristics change upon impact. In some embodiment this is a dilatant compound. In some embodiments, the dilatant compound comprises a chemical dilatant. In some embodiments, the dilatant compound comprises a silicone dilatant. In some embodiments, the dilatant material includes at least one of the following: silicone-based substance; or boric acid; polyvinyl alcohol, water, and borax or boric acid; starch and water; starch, water, and borax (or boric acid); silica nanoparticles in ethylene glycol (or another liquid); copolymer dispersions; and oil/water/polymer emulsions.

In some embodiments, the strain rate sensitive material comprises a mechanical dilatant, usually colloidal suspension in liquid. In some embodiments, the strain rate sensitive material comprises a chemical dilatant, active via spontaneous phase separation. In some embodiments, the dilatant comprises a mixture of chemical and mechanical dilatants.

In some embodiments, the strain rate sensitive material comprises a dilatant material within, or combined with a polymer material, curable material or vulcanisable material.

In embodiments where the energy absorbing system partially comprises strain rate sensitive material, a mix of material can be achieved either chemically or mechanically. If chemically, this can include: hydrogen cross links, material cross links, or both. An example of a hydrogen cross link is polyborodimethylsiloxane. The dilatant strain rate sensitive material could be any silicone containing borated Polydimethylsiloxane (PDMS). Other more permanent cross links are beneficial to the molding process; indeed, the strain rate sensitive material can be blended or reacted with other materials to form a stable blend of cross linked material. The blending materials may for example include thermoplastic elastomer (TPE), high consistency rubber, liquid silicone rubbers, thermoplastic, urethanes, polyurethanes and Polyethylene (PE). Permanent cross links can be added to the strain rate sensitive material by reacting with cross linking agents. Any additions of fillers, fibers, lubricants or thickeners may be used. Typically, these can be high damping polymers, Thermoplastic Elastomers, or Thermoplastic Urethanes, usually with an active component. The Thermoplastic component can be blends of HybrarTM, HytrelTM, SeptonTM, SibstarTM, and TPsivTM.

Embodiments of the present invention relate to a flexible energy absorbing system comprising strain rate sensitive materials and structures with a re-entrant geometry. In some embodiments, the system comprises a mixture of re-entrant and non-re-entrant structures. In some embodiments, the system comprises a re-entrant structure which mates with another structure. In some embodiments, the other structure is also re-entrant.

According to an embodiment of the present invention, the energy absorbing system comprises a plurality of layers, and each layer comprises one or more cells. At least one of the one or more cells in the first layer in the plurality of cells has a re-entrant geometry. In some embodiments, each of the one or more cells in the first layer has a re-entrant geometry. In some embodiments, the one or more cells in other layers in the plurality of layers may have re-entrant geometry. In some embodiments, the one or more cells in the first layer and the one or more cells in a second layer in the plurality of cells have the same geometry. In some embodiments, each layer comprises a mixture of re-entrant and non-re-entrant cells.

For clarity, each of the figures used to depict the invention displays a system comprising one or two layers, each layer comprising one cell. It is to be understood that each embodiment may comprise a plurality of layers, each layer comprising more than one cell. For example, more than 10 cells or more than 110 cells. It is also to be understood that each embodiment may comprise more than two layers in the plurality of layers.

Providing a plurality of layers in the energy absorbing system results in a further unexpected and substantial improvement in energy absorbency. This is due to additional mechanisms of absorbing energy, typically between the layers, absorbing more energy than would be expected. This significant extra energy absorbing mechanism comprises a frictional component between the two re-entrant parts. The performance improvement is more than would be expected by using more material alone and leads to an unexpected performance improvement, while allowing the energy absorbing system to also be flexible and breathable.

FIG. 1 shows isometric views of three examples of cells with a re-entrant geometry according to embodiments of the invention. The embodiments of FIG. 1 show three examples of energy absorbing systems 1a, 1b, 1c comprising cells 3a, 3b, 3c with a re-entrant geometry. The re-entrant geometry extends along an axis, shown in FIG. 1 as a vertical axis 6.

The cells 3a, 3b, 3c shown in FIG. 1 comprise extruded thin wall parts, tapering from a circle, a square and a hexagon, with or without a base element 2. The base element 2 extends in a plane normal to the axis 6 of the re-entrant geometry. In some embodiments, the base element 2 is configured to attach the cell 3a, 3b, 3c to other cells 3a, 3b, 3c to form a part of a layer. In other embodiments, all of the cells 3a, 3b, 3c in a layer are attached to the same base element 2. In other embodiments, the base element 2 is configured to attach the energy absorbing system 1a, 1b, 1c to a surface of an object (not shown). In some embodiments, the base element 2 is used to attach the cells 3a, 3b, 3c to the inside of a helmet so that the energy absorbing system 1a, 1b, 1c may increase the energy absorbing performance of the helmet.

In some embodiments of FIG. 1, each cell 3a, 3b, 3c can be considered re-entrant. In other embodiments, cells 3a, 3b, 3c have other re-entrant structures to those shown in FIG. 1. In some embodiments, the cells 3a, 3b, 3c have an anisotropic re-entrant geometry, such that the properties of the cell 3a, 3b, 3c are different when measured along different axes.

Figure 2C:
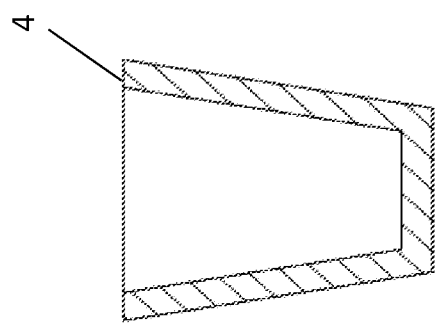
FIGS. 2a-c show an isometric view, front view and cross-section view of a cell according to embodiments of the invention, respectively.
Figure 2B:
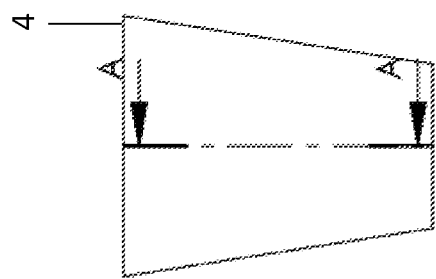
Figure 2A:
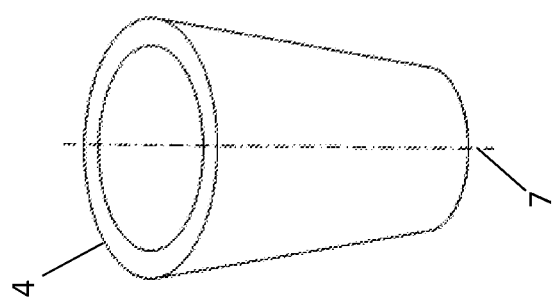

FIG. 2a shows an isometric view of a cell according to embodiments of the invention. FIG. 2b shows a front view of the cell and FIG. 2c shows a cross-section view of the cell. In embodiments of FIGS. 2a-c, the cell 4 has a re-entrant geometry which extends along an axis, shown in FIGS. 2a-c, by way of example, as a vertical axis 7.

Figure 3E:
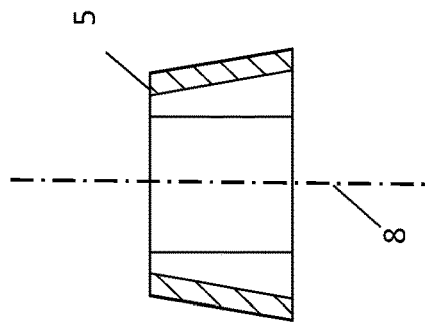
FIGS. 3a-e show an isometric view, front view, side view and two cross-sectional views of a cell according to embodiments of the invention, respectively.
Figure 3D:
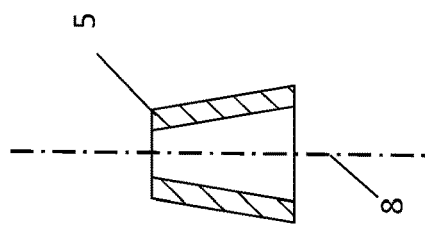
Figure 3C:
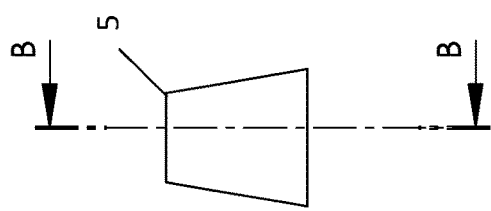
Figure 3B:
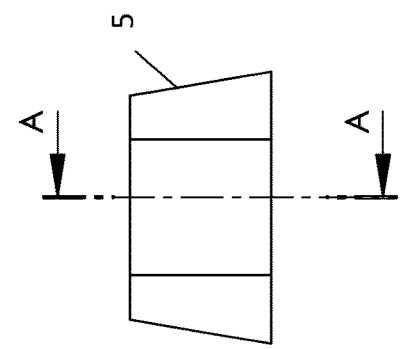
Figure 3A:
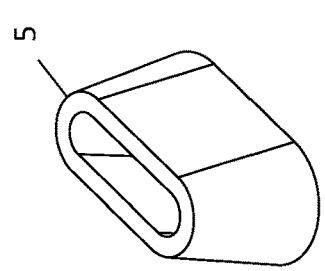

FIG. 3a shows an isometric view of a cell according to embodiments of the invention. FIG. 3b shows a front view of the cell and FIG. 3c shows a side view of the cell. FIG. 3d shows a cross-section view of section A-A shown in FIG. 3b. FIG. 3e shows a cross-section view of section B-B shown in FIG. 3c. In embodiments of FIGS. 3a-e, the cell 5 has a tapering anisotropic re-entrant geometry which extends along an axis, shown in FIGS. 3a-e, by way of example, as a vertical axis 8. Other embodiments of FIGS. 3a-e may comprise any other anisotropic re-entrant geometry. Embodiments of FIGS. 3a-e have different properties in different directions. In the primary impact direction, along axis 8, the cell 5 can be tuned to have a certain response to an impact. For oblique impacts, the cell can be tuned to create different impact responses from different directions.

Figure 4C:
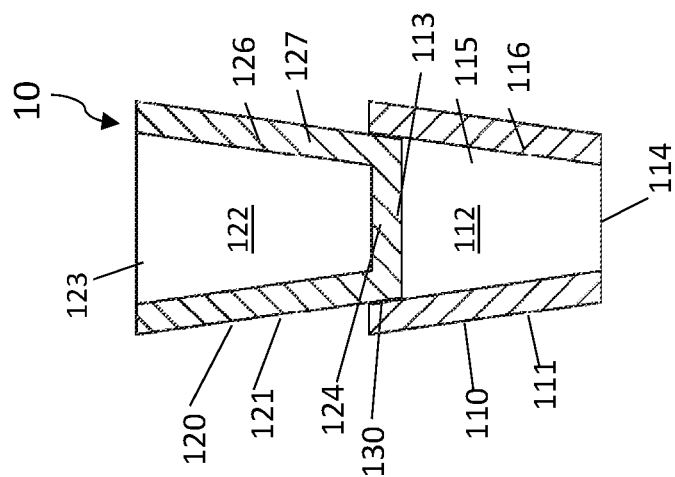
FIGS. 4a-c show an isometric view, front view and cross-section view according to embodiments of the present invention, respectively.
Figure 4B:
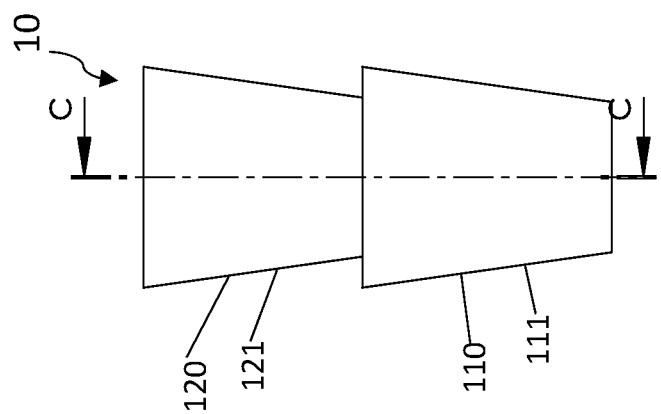
Figure 4A:
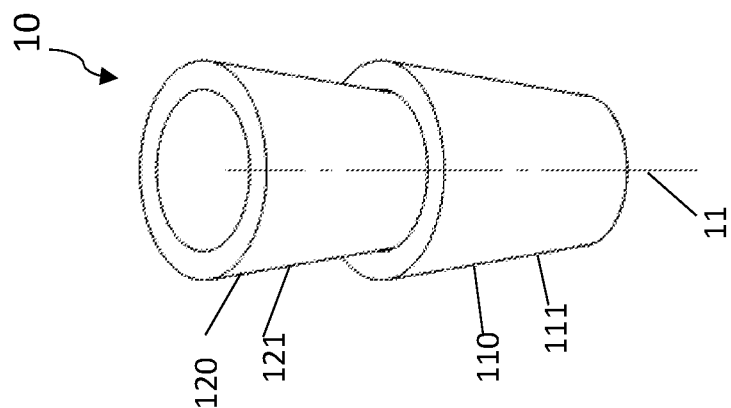

FIG. 4a shows an isometric view of an energy absorbing system 10 according to embodiments of the present invention. FIG. 4b shows a front view of the embodiment of FIG. 4a. FIG. 4c shows a cross-section view of section C-C of FIG. 4b. In the embodiments of FIGS. 4a-c, the cell 111 in the first layer 110 and the cell 121 in the second layer 120 have the same geometry, which is re-entrant along an axis, shown in FIG. 4a-c by way of example as the vertical axis 11. In other embodiments, the first layer 110 and the second layer 120 each comprise a plurality of cells 111, 121. In other embodiments, the re-entrant geometry is along any other axis. In other embodiments, the cell 121 in the second layer 120 does not have a re-entrant geometry, or has a different re-entrant geometry to the cell 111 in the first layer 110. In some embodiments, when cell 121 in the second layer 120 has a re-entrant geometry, it is not along the same axis 11 as the re-entrant geometry of the cell 111 in the first layer 110.

In the embodiments of FIGS. 4a-c, the cell 111 in the first layer 110 comprises a re-entrant recess 112 having an opening 113. In other embodiments, the cell 121 in the second layer 120 comprise a re-entrant recess 122 having an opening 123. In embodiments, the recesses 112, 122 extend along the direction of the re-entrant geometry of the cells 111, 121 in the system, shown in FIGS. 4a-c as vertical axis 11. In other embodiments, the cells 111, 121 have a recess 112, 122 which is not re-entrant, for example the recess 112, 122 may have vertical sides rather than having a negative draft angle.

In the embodiments of FIGS. 4a-c, the cell 111 in the first layer 110 and the cell 121 in the second layer 120 comprise respective base elements 114, 124 at the opposite ends of the re-entrant recesses 112, 122 to the openings 113, 123. In some embodiments, the base elements 114, 124 extend in a direction normal to the axis 11 of the re-entrant geometry of the respective cells 111, 121. In other embodiments, the one or more cells 111 (or 121) in one layer 110 (or 120) in the plurality of layers comprise a base element 114 (or 124). In other embodiments, at least one of the one or more cells 111 (or 121) in a layer 110 (or 120) in the plurality of layers comprises a base element 114 (or 124). In other embodiments, the system comprises cells 111, 121 with no respective base element 114, 124, and therefore each comprising a first opening 113 (or 123) and a second opening (not shown) at opposite ends of the re-entrant recess 112 (or 122). Such embodiments result in a more breathable system, which may be more comfortable for a user.

In the embodiments of FIGS. 4a-c, the cell 121 in the second layer 120 overlaps along the vertical axis 11 with the cell 111 in the first layer 110. In some embodiments, the overlapping region 130 comprises the opening 113 of the re-entrant recess 112 in the cell 111 in the first layer 110. In other embodiments, the cell 121 in the second layer 120 vertically overlaps with the cell 111 in the first layer 110 without the overlapping region 130 comprising the opening 113 of the re-entrant recess 112 in the cell 111 in the first layer 110. For example, the cell 121 in the second layer 120 is not vertically aligned with a respective cell 111 in the first layer 110.

In the embodiments of FIGS. 4a-c, the one of more cells 121 in the second layer 120 are held in position in relation to respective one or more cells 111 in the first layer 110 by the frictional force between the respective cells 111, 121 at the overlapping region 130.

In the embodiments of FIGS. 4a-c, upon impact, the second layer 120 moves along the vertical axis 11 toward the first layer 110, resulting in the overlapping region 130 increasing in size. In some embodiments, upon impact, the cell 121 in the second layer 120 moves further in to the re-entrant recess 112 of the cell 111 in the first layer 110. In other embodiments (not shown), one or more cells 121 in the second layer 120 move further in to a gap between one or more cells 111 in the first layer 110. In some embodiments, an additional mechanism for absorbing energy comprises friction between the touching surfaces 115, 127 of the first layer 110 and the second layer 120 as they move together. In some embodiments, the one or more cells 111 in the first layer 110 are expanded and the one or more cells 121 in the second layer 120 are contracted, as they move together. Once the first and second layers 110, 120 have moved as close together as geometrically possible, other energy absorbing properties become the dominant force which resists the impact, for example, plastic deformation, and crushing the one or more cells 111, 121 in the layers 110, 120 in buckling.

In the embodiments of FIGS. 4*a-c*, where the cell 111 in the first layer 110 and the cell 121 in the second layer 120 comprise a respective base element 114, 124, there is a secondary benefit to the energy absorbing properties of the system 10. In embodiments, this secondary benefit is that a fluid, such as air, in the volume trapped between the base element 124 of the cell 121 in the second layer 120 and the cell 111 in the first layer 120 is compressed. This can lead to the air escaping and being pumped out. This also helps to reduce rebound.

In the embodiments of FIGS. 4*a-c*, the movement of fluid between the layers 110, 120 in the system is controlled by the configuration of the, or each, cell 111, 121 comprising a respective base element 114, 124. In some embodiments, the respective base element 114, 124 in the cells 111, 121 in one, or both, of the layers 110, 120 comprises a molded valve (not shown) which, upon impact to the system, limits the flow rate of fluid which can pass through it, or which only allows the fluid to move when a certain pressure is reached. In some embodiments, the base elements 114, 124 are configured to fracture at a predetermined pressure. For example, the base elements 114, 124 may be less thick than the walls 116, 126 of their respective cell 111, 121, or have different material properties to the rest of their respective cell 111, 121. Such embodiments result in a more breathable system 10, which may be more comfortable for a user. In some embodiments where the system 10 comprises a plurality of cells 111, 121 comprising base elements 120, 124, the base elements 114, 124 each have the same properties. In other embodiments, the base elements 114, 124 have different properties from one another.

Energy absorbing systems 10 according to embodiments of FIGS. 4*a-c* comprise a tensile layer (not shown). In some embodiments, the tensile layer is adhered to the cell(s) 111 (or 121) in a layer 110 (or 120), for example by a hook and loop system or an adhesive. In other embodiments, the tensile layer comprises a textile. In manufacture, the textile is placed in the molding tool used to mold the cells 111, 121, such that the material of the cell(s) 111 (or 121) is forced through the open weave structure of the textile and the textile is therefore integral to the cell(s) 111 (or 121).

Systems 10 according to embodiments of FIGS. 4*a-c* show an improvement over the equivalent thickness and density of a single layer, of approximately 30%. This performance improvement is attributed to the increase in friction as the layers 110, 120 get pushed together. The friction acts as a component of a resistive force that resists an impact to the system 10.

An additional or alternative resistive force is generated by providing an alternative interface between the layers in an energy absorbing system according to embodiments of the present invention, as will be described herein below.

Figure 5D:
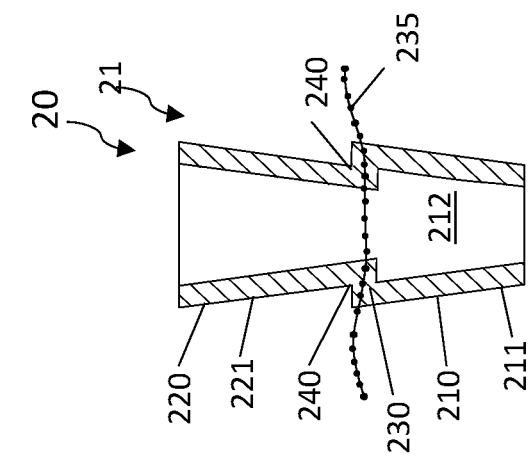
FIGS. 5a-d show an isometric view, front view and two cross-section views according to embodiments of the present invention, respectively.
Figure 5C:
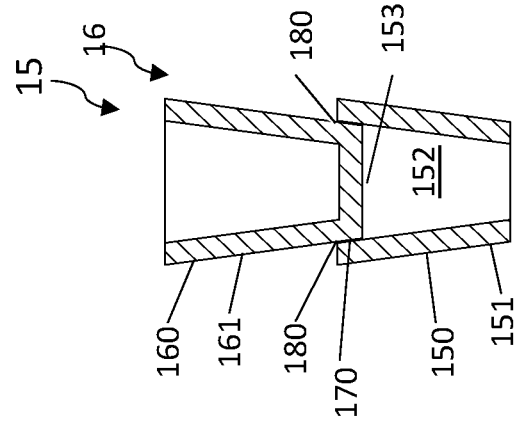
Figure 5B:
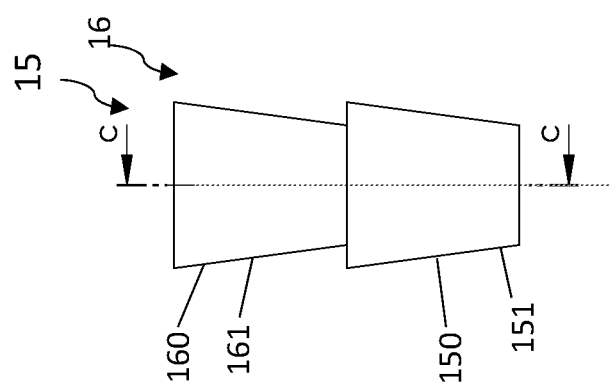
Figure 5A:
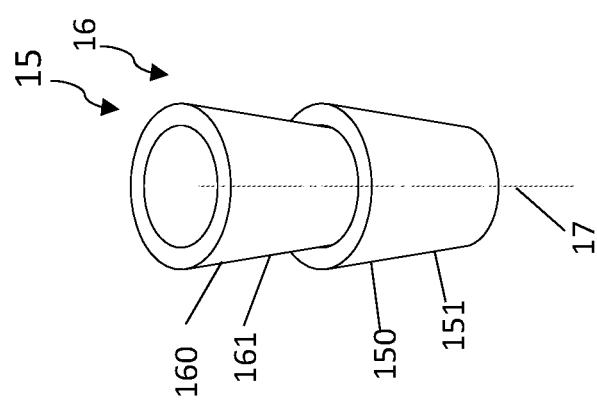

FIG. 5*a* shows an isometric view of an energy absorbing system 15, 20 according to embodiments of the present invention. FIG. 5*b* shows a front view of the embodiment of FIG. 5*a*. FIG. 5*c* shows a cross-sectional view of an embodiment of FIGS. 5*a-b*. FIG. 5*d* shows a cross-sectional view of an embodiment of FIGS. 5*a-b*. The architecture of the embodiments of FIGS. 5*a-d* is similar to those described in reference to FIGS. 4*a-c*, except that, in these embodiments, the cell 151 (or 211) in the first layer 150 (or 210) and the cell 161 (or 221) in the second layer 160 (or 220) are manufactured as a single part 16 (or 21). In embodiments, the single part 16 (or 21) is manufactured such that the cell 161 (or 221) in the second layer 160 (or 220) at least partially overlaps with the cell 151 (or 211) in the first layer 150 (or 210). These single parts 16 (or 21) can be used in any combination, in multiple layers, and also configured in any array of repeat single parts 16 (or 21). A plurality of single parts 16 (or 21) can be in the same orientation or mirrored, tapering outwards or inwards. In other embodiments, the single parts 16 (or 21) are molded in individual units and joined, or molded as sheets of single parts 16 (or 21). In other embodiments (not shown), a cell in each of a first, second and third layer is manufactured as a single part. In other embodiments, more than three layers may form a single part.

Manufacturing the cell 151, 211 in the first layer 150, 210 and the cell 161, 221 in the second layer 160, 220 as a single part 16, 21 reduces the number of steps required during manufacture. In this embodiment, one part is manufactured, whereas in earlier embodiments, a plurality of parts are manufactured and subsequently layered on top of one another.

In some embodiments of FIGS. 5*a-d*, the single part 16 (or 21) comprising one or more cells 151, 161 (or 211, 221) in at least the first layer 150 (or 210) and the second layer 160 (or 220) is manufactured by injection molding. In some embodiments, the split line of the molding tool is level with the overlapping region 170 (or 230), whereas in other embodiments, it is somewhere else along the height of the single part 16 (or 21).

The embodiments of FIGS. 5*a-d* provide an additional energy absorbing mechanism as compared to those embodiments discussed in reference to FIGS. 4*a-c*. In some such embodiments, upon impact to the system 15 (or 20), a fracture occurs at the overlapping region 170 (or 230) prior to the cell(s) 161 (or 221) in the second layer 160 (or 220) being moved into the re-entrant recess 152 (or 212) in the respective cell 151 (or 211) in the first layer 150 (or 210). The point of fracture 180 (or 240) is shown in FIG. 5*c* (or 5*d*). After fracture, the layers 150, 160 (or 210, 220) move together in a similar fashion to that described for the embodiments shown in FIGS. 4*a-c*. In embodiments, as the layers 150, 160 (or 210, 220) move together, the overlapping region 170 (or 230) increases in size, and therefore the resistive frictional force increases. In embodiments, once the first and second layers 150, 160 (or 210, 220) have moved as close together as geometrically possible, other energy absorbing properties become the dominant force which resists the impact, for example, plastic deformation, and crushing the one or more cells 151, 161 (or 211, 221) in the layers 150, 160 (or 210, 220) in buckling. In some embodiments, there is also benefit from using fluid contained in the system to help control damping and rebound, as previously explained.

In the embodiments of FIGS. 5*a-d*, the single part 16 (or 21) is manufactured to have predetermined properties, for example, so that the fracture occurs at a predetermined force. A stiffer material will result in a higher static load being withstood before fracture.

In some embodiments of FIG. 5*d*, the single part 21 is manufactured with a tensile layer 235, an example of such a configuration is shown in FIG. 5*d*. Energy absorbing materials with a tensile backing according to embodiments have been shown to reduce transmitted force from an impact event by more than 50%. In embodiments, a tensile layer 235 improves the stability of the energy absorbing system 20 and/or helps with integration of the energy absorbing system 20 into a wearable garment and/or to be used to attach the energy absorbing system 20 to a surface, for example by using a hook and loop system for attachment to the inside of a helmet skin. In some embodiments, the tensile layer 235 comprises a hook and loop system, which is placed in the molding tool as the single part 21 is manufactured.

In some embodiments of FIG. 5d, the tensile layer 235 comprises a textile and the single part 21 is manufactured via injection molding, with the textile placed at the split line for the molding tool. In other embodiments, the tensile layer 235 is at the top, bottom, or anywhere else that suits the design of the single part 21. In some embodiments, the tensile layer 235 passes through the point of fracture 240, giving a higher resistance to fracture and restraining the energy absorbing material of the cells 211, 221 in the system 20 from moving away from the impact site.

Figure 6C:
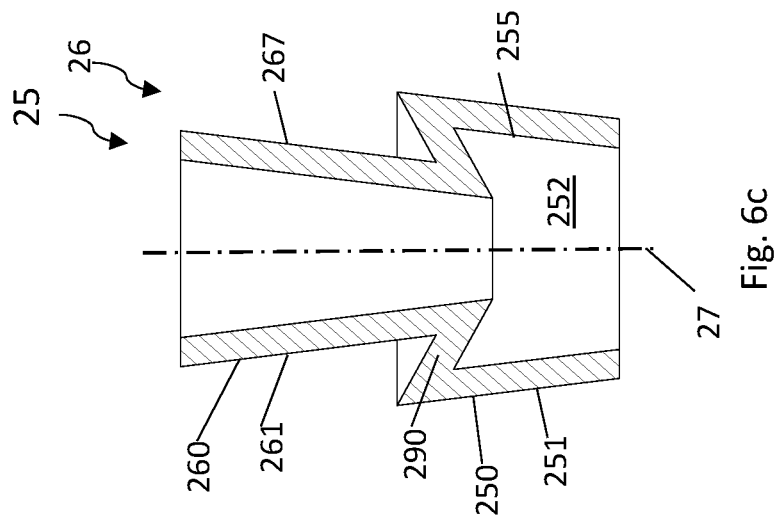
FIGS. 6a-c show an isometric view, front view and cross-section view according to embodiments of the present invention, respectively.
Figure 6B:
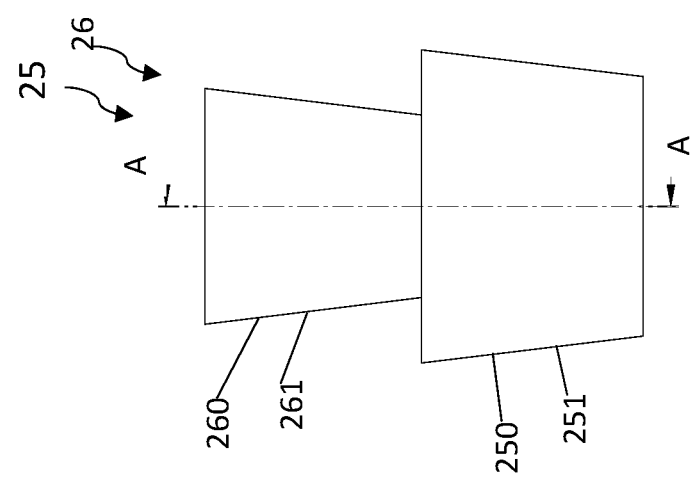
Figure 6A:
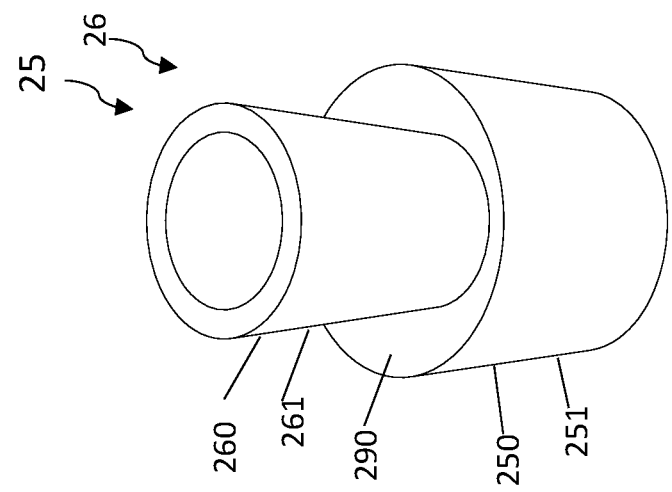

FIG. 6a shows an isometric view of an energy absorbing system 25 according to embodiments of the present invention. FIG. 6b shows a front view of the embodiment shown in FIG. 6a. FIG. 6c shows a cross-section view of section A-A in FIG. 6b. These embodiments are similar to the embodiments of the single part described with reference to FIGS. 5a-d, except that the cell 261 in the second layer 260 has a smaller width than the cell 251 in the first layer 250, such that the second layer 260 is configured to move further in to the re-entrant recess 252 of the cell 251 in the first layer 250 before the cell 261 in the second layer 260 comes in to contact with the cell 251 in the first layer 250. In this embodiment, a single part 26 comprises a retaining structure 290 which holds the cell 261 in the second layer 260 in a position vertically above the cell 251 in the first layer 250 such that the outer surface 267 of the cell 261 in the second layer 260 is not touching the 255 surface of the re-entrant recess 252 of the cell 251 in the first layer 250.

In the embodiments of FIGS. 6a-c, the retaining structure 290 is tapered so that it extends in to the re-entrant recess 252 of the cell 251 in the first layer 250. In other embodiments, the retaining structure 290 extends in a plane normal to a re-entrant axis 27 of the cell 251 in the first layer 250. In other embodiments, the retaining structure 290 is tapered so that it extends away from the re-entrant recess 252 of the cell 251 in the first layer 250.

The embodiments of FIGS. 6a-c provide an additional benefit of improved 'soft' performance over the embodiments discussed in reference to FIGS. 5a-d. Embodiments of FIGS. 6a-c provide a softer response to compression force for the first approximately 20% compression, increasing comfort for a user. In embodiments, if the force of an impact results in more than approximately 20% compression, a harder response is provided because the cell 261 in the second layer 260 is compressed such that its outer surface 267 contacts the surface 255 of the re-entrant recess 112 of the cell 251 in the first layer 250, resulting in a frictional resistive force being generated as the cell 261 in the second layer 260 moves further in to the re-entrant recess 252 of the cell 251 in the first layer 250. In embodiments, once the layers 250, 260 have moved as close together as geometrically possible, other energy absorbing properties become the dominant force which resists the impact, for example, plastic deformation, and crushing the one or more cells 251, 261 in the layers 250, 260 in buckling.

The embodiments of FIGS. 6a-c can be tuned to provide a relatively soft initial response, for say 20% strain, and then to load up to a harder response to absorb a greater impact. In some embodiments, the initial compression is elastic, allowing the energy absorbing system to be used for multiple smaller impacts without a reduction in energy absorbing performance.

In the embodiments of FIGS. 6a-c, the retaining structure 290, the cell 251 in the first layer 250 and the cell 261 in the second layer 260 are manufactured as a single part 26, using the same strain rate sensitive material. In other embodiments, the retaining structure 290 comprises a tensile layer (not shown) of a different material to the cell 251 in the first layer 250 and the cell 261 in the second layer 260. In embodiments, a tensile layer helps with integration of the energy absorbing system 25 into a wearable garment and gives the energy absorbing system 25 different response properties compared to a retaining structure 290 comprised of strain rate sensitive material being used alone. In some embodiments, the retaining structure 290 comprises strain rate sensitive material and a tensile layer. In some embodiments, the tensile layer comprises a textile. In some embodiments, the textile layer is placed in the molding tool when the cell 251 in the first layer 250 and the cell 261 in the second layer 260 are manufactured, so that the strain rate sensitive material is forced through the weave structure of the textile, resulting in the textile being integral to at least one of the cell 251 in the first layer 250 and the cell 261 in the second layer 260. In some embodiments, the single part 26 comprises a plurality of tensile layers. In embodiments, the tensile layers are manufactured integrally with single part 26, whereas in other embodiments, the tensile layers are adhered to the single part 26 after it has been manufactured.

In other embodiments of FIGS. 4a-c, 5a-d and 6a-c, the cells in the energy absorbing system are of an anisotropic re-entrant geometry, for example, as shown in FIGS. 3a-e. In other embodiments, anisotropy is achieved by varying the thickness of the walls of the cells. In some embodiments, the global geometry of the cell is anisotropic. In some embodiments, the thicknesses of the walls of the cells are anisotropic.

Figure 7B:
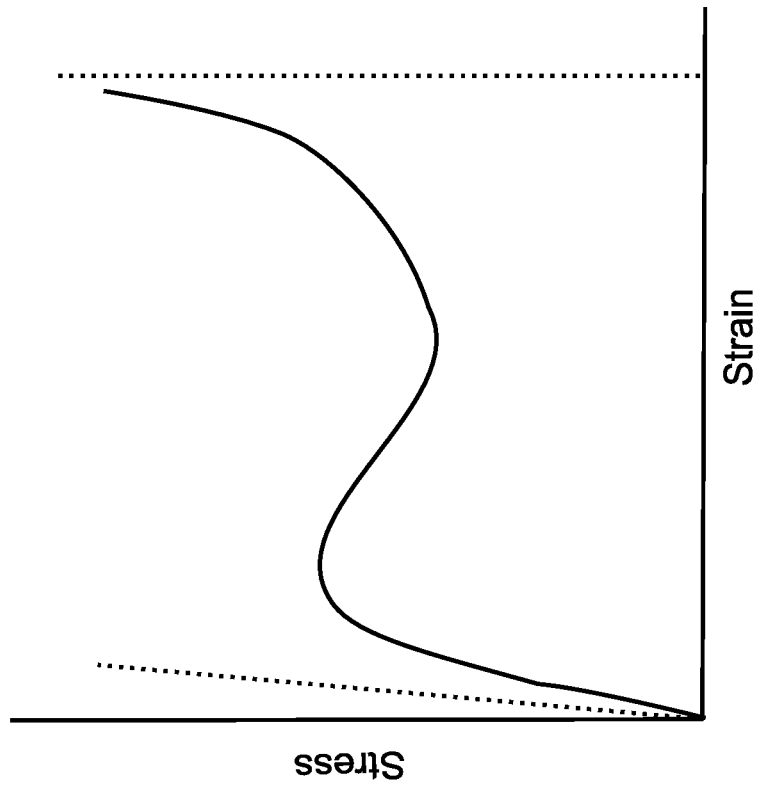
FIGS. 7a-b show a stress-strain curve of a typical cellular material and a stress-strain curve according to embodiments of the present invention, respectively.
Figure 7A:
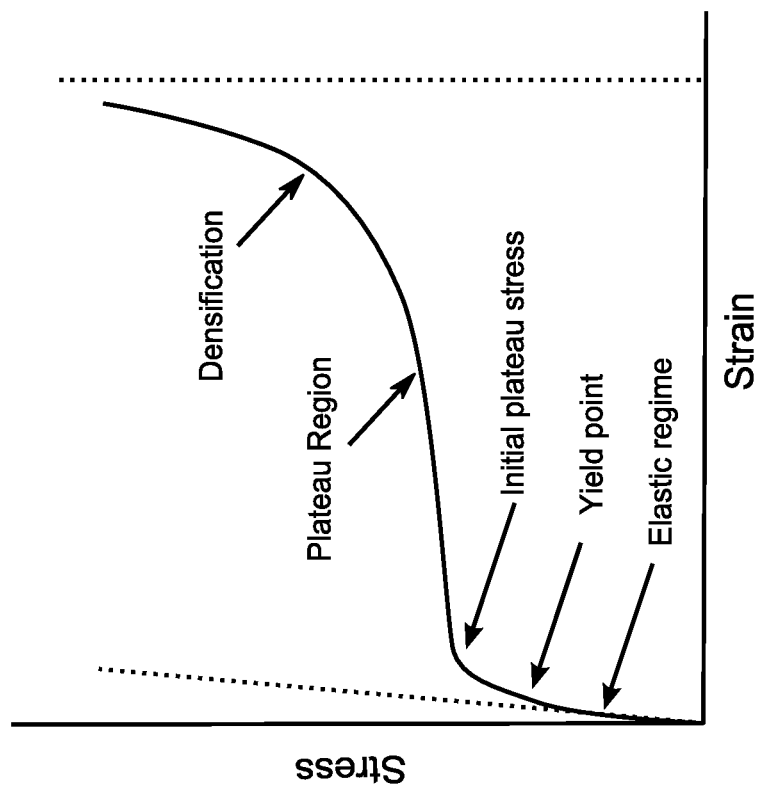

FIG. 7a shows a stress-strain curve of a typical cellular or foam material and FIG. 7b shows an example stress-strain curve according to embodiments of the present invention, as described with reference to FIGS. 4a-c, 5a-d and 6a-c. Elastomeric foam polymers are currently the most common energy absorbing materials used in flexible body-worn sporting applications. Such polymers are typically homogeneous. Under impact loading, the foam initially compresses through an elastic region and then follows a plateau to final densification, as shown in FIG. 7a. Catastrophic failure ultimately occurs in the cell walls, and the material fractures. When the cell walls fail, the elastomeric foam is free to move out of the impact zone, leaving little or no material in the area where it is most needed. The material fails and moves away from the impact site, ultimately giving poor high load performance. A method of improving load performance of elastomeric foam polymers is to use thicker layers of material, but there are practical limitations. Other methods of increasing performance of elastomeric foam materials are to make the cell walls thicker (reticulation), add more cell walls or increase density. There is also a practical limitation to this methodology as it increases mass and also reduces flexibility. An increase in performance can be obtained by changing the polymer composition, but the same trends are still observed for densification and cell wall strength.

Any of the embodiments of the present invention, as described with reference to FIGS. 4a-c, 5a-d and 6a-c, can be engineered to give a stress-strain curve similar to the one shown in FIG. 7b. For embodiments according to FIGS.

5*a-d* and 6*a-c*, the energy absorbing systems 15, 20, 25 are relatively 'stiff' for the first part of the compression, causing the respective single parts 16, 21, 26 to fracture at the fracture point 180, 240. Upon fracture, the stress drops on the stress-strain curve, before increasing again following the densification region. It is unusual for a normal cellular structure or elastomeric foams to have a stress strain curve that has a peak and then drops, especially when tested in compression.

Structures engineered to give stress stain curves using the methods of embodiments of the invention are particularly useful for blast floor matting or convoy matting, where the parts may need to withstand low speed static loads, for example being walked upon, but then fracture at a certain point/strain rate, for example in the event of an under floor blast to absorb energy as they start to get crushed together. This could allow the peak force for fracture to be below that of fracture of the tibia, and then the transmitted load would actually reduce while absorbing energy. The area under the curve is higher on the curve on the right, when compared to the left. These structures can also be applied in helmets according to embodiments.

Embodiments according to FIGS. 4*a-c*, 5*a-d* and 6*a-c* comprise methods for manufacturing a flexible energy absorbing system. In some embodiments, manufacturing a flexible energy absorbing system comprises forming a plurality of layers comprising a strain rate sensitive material, forming one or more cells in each layer in the plurality of layers, forming one or more cells comprising a re-entrant geometry along an axis in at least a first layer in the plurality of layers and overlapping, at least partially, the one or more cells in a second layer in the plurality of layers with a respective one or more cells in at least the first layer.

In embodiments, the forming comprises one or more of: molding, additive manufacturing, and the like. In some embodiments, the forming comprises injection molding.

In some embodiments, the method comprises forming a re-entrant recess extending along the axis in the one or more cells in at least the first layer. In some embodiments, the re-entrant recess is formed at the same time as the one or more cells in at least the first layer are formed, whereas in other embodiments, the re-entrant recess is machined after the one or more cells in at least the first layer are formed.

In some embodiments, the method comprises configuring the one of more cells in the second layer in the plurality of layers to at least partially overlap with an opening of the re-entrant recess of the respective one or more cells in at least the first layer. In some embodiments, a cell in the first layer and a cell in the second layer are manufactured as a single part, such that the cell in the second layer at least partially overlaps with an opening of the re-entrant recess of the cell in the first layer. In other embodiments, the one or more cells in the second layer are configured to at least partially overlap with one or more cells in at least the first layer.

In some embodiments, the method comprises forming one or more cells of a layer in the plurality of layers with a tensile layer. In some embodiments, the tensile layer is formed with all of the cells in a layer. In some embodiments, the tensile layer is formed with at least one cell in a first layer and at least one cell in a second layer. In some embodiments, the system is formed with a plurality of tensile layers.

In some embodiments, the tensile layer is adhered to at least one cell in the energy absorbing system after the cell has been manufactured. In some embodiments, the tensile layer comprises a hook and loop system. In some embodiments, the tensile layer comprises a textile. In some embodiments, the textile comprises an open weave structure; in some such embodiments, manufacturing a flexible energy absorbing system comprises forming one or more cells of a layer in the plurality of layers with the textile by placing the textile in the molding tool and using pressure to force the material of the one or more cells through the open weave structure of the textile.

Embodiments of the invention comprise different re-entrant geometry to those embodiments described above in relation to FIGS. 1 to 7*b*.

FIG. 8*a* shows a top view of a first layer 310 of an embodiment according to the present invention. FIG. 8*b* shows a top view of a second layer 320 of an embodiment according to the present invention. FIG. 8*c* shows a cross-section view of section A-A of FIG. 8*a*. FIG. 8*d* shows a cross-section view of section C-C of FIG. 8*b*. FIG. 8*e* shows a cross-section view as assembly of first layer 310 of FIG. 8*a* and second layer 320 of FIG. 8*b*. The shape of the structures of FIGS. 8*a-e* is shown as an example only. The energy absorbing systems according to these embodiments comprise a first layer 310 and a second layer 320. At least one of the first layer 310 and the second layer 320 comprises a strain rate sensitive material. The first layer 310 comprises one or more cells 311. Each of the one or more cells 311 has a re-entrant geometry. The second layer 320 comprises one or more protrusions 321, each of the one or more protrusions 321 are configured to interlock with respective one or more cells 311 in the first layer 310. FIG. 8*e* shows how the first and second layers 310, 320 interlock.

In embodiments of FIGS. 8*a-e*, the first layer 310 and the second layer 320 are manufactured separately and then pushed together to that they are interlocked. In other embodiments of FIGS. 8*a-e*, the first layer 310 and the second layer 320 are manufactured separately and, in use, are positioned so that they abut one another (not shown) such that, upon impact to the system, the first layer 310 and second layer 320 are pushed together so that they partially or fully interlock.

In embodiments of FIGS. 8*a-e*, the first layer 310 comprises a plurality of cells 311 in a regular pattern. In other embodiments, the cells 311 in the first layer 310 are arranged in other patterns. In embodiments of FIGS. 8*a-e*, the one or more protrusions 321 in the second layer 320 are aligned with cells 311 in the first layer 310 so that the protrusions 321 interlock with the cells 311 in the first layer 320. In some embodiments, the one or more protrusions 321 in the second layer 320 extend from a surface 325 of the second layer 320 along an axis that is normal to the surface 325 of the second layer 320.

In embodiments of FIGS. 8*a-e*, the re-entrant geometry of the one or more cells 311 in the first layer 310 is formed from one of corrugations and folds in the first layer 311, the walls 317 of each corrugation or fold being inwardly angled towards each other to form a re-entrant angle.

In embodiments of FIGS. 8*a-e*, each of the one or more protrusions 321 in the second layer 320 comprises a recess 322. The recess 322 in each protrusion 321 extends from an opening 323 in a base 324 of the protrusion.

In embodiments of FIGS. 8*a-e*, at least one of the one or more protrusions 321 in the second layer 320 has a re-entrant geometry. In some embodiments, all of the protrusions 321 in the second layer 320 have a re-entrant geometry. In some embodiments, the re-entrant geometry of the protrusions 321 in the second layer 320 corresponds with the re-entrant geometry of the one or more cells 311 in the first layer 310, such that when the protrusions 321 and the respective cells 311 are interlocked, there are no gaps between a protrusion 321 and the cell 311 with which it is interlocked.

In embodiments of FIGS. 8a-e, the re-entrant geometry of each of the one or more cells 311 in the first layer 310 comprises a recess 312 with a respective first opening 313. In some embodiments, the recess 312 extends through the first layer 310 to a respective second opening 314. A second opening 314 allows the system to be more breathable, as fluid in the system can flow out of the second opening 314 in the one or more cells 311 in the first layer 310 when the first opening 313 is blocked by the interlocking protrusion 321 in the second layer 320. In some embodiments, the re-entrant geometry of each of the one or more cells 311 in the first layer 310 is along a respective axis. In some embodiments, the edges of the first openings 313 form a surface 316 of the first layer 310. The respective axis of each of the one or more cells 311 in the first layer 310 is normal to the surface 316 of the first layer 310.

In embodiments of FIGS. 8a-c, the first layer 310 comprises a sheet of two or more cells 311. The sheet comprises a base element 315 between the two or more cells 311. In some embodiments, the first layer 310 comprises a plurality of sheets of two or more cells 311. In some embodiments, a first cell 311a in a sheet of two or more cells 311 in the first layer 310 is orientated in an opposite direction to a second cell 311b in the sheet of two or more cells 311, for example, as shown in FIGS. 8a, 8c and 8e.

In embodiments of FIGS. 8a-e, the second layer 320 comprises a sheet of two or more protrusions 321. The sheet comprises a base element 326 between the two or more protrusions 321, as shown in FIGS. 8b, 8c and 8e. In some embodiments, the second layer 320 comprises a plurality of sheets of two or more protrusions 321.

In embodiments of FIGS. 8a-e, the first layer 310 and the second layer 320 comprise material with the same properties. In other embodiments, the first layer 310 and the second layer 320 comprise materials of different properties so that the response to an impact to the system 30 can be changed, tuned and optimized. In some embodiments, the materials in the first layer 310 and second layer 320 have different properties at different temperatures to help change the global impact at different temperatures. In some embodiments, the one or more protrusions 321 in the second layer 320 are manufactured from a harder material than the one or more cells 311 in the first layer 310, meaning that the cells 311 in the first layer 310 could be molded over the protrusions 321 of the second layer 320, thereby enabling attainment of larger re-entrant angles. In other embodiments, the surface finish of the one or more cells 311 in the first layer 310 and/or the one or more protrusions 321 in the second layer 320 are different. The surface finish will change the damping properties of the system 30 and the energy absorbing properties of the system 30. The interface between the first layer 310 and the second layer 320 could alternatively be smooth or even lubricated to tune the system 30, for example optimizing for a different set of high damping parameters.

In embodiments of FIGS. 8a-e, the system comprises a third layer (not shown). The third layer comprises one or more protrusions and is substantially similar to the second layer 320. The third layer comprises strain rate sensitive material. In some embodiments, the third layer is located on the opposite side of the first layer 310 to the second layer 320. In these embodiments, the first layer 310 comprises two or more cells 311. In such embodiments, at least a first cell 311a is oriented in an opposite direction to a second cell 311b, as shown in FIGS. 8a, 8d and 8e. In some embodiments, at least one of the one or more protrusions 321 of the second layer 320 and at least one of the one or more protrusions of the third layer interlock with respective one or more cells 311 in the first layer 310. In some embodiments, at least one of the one or more protrusions 321 of the second layer 320 and at least one of the one or more protrusions of the third layer, are positioned so that they abut a cell 311 in the first layer 310 such that, upon impact to the system, the first layer 310, second layer 320 and third layer are pushed together so that they interlock.

In embodiments of FIGS. 8a-e, the layers in the energy absorbing system 30 are configured such that, upon impact to the system 30, a resistive force is created between the layers 310, 320 which are configured to interlock. The resistive force absorbs energy from the impact. In some embodiments, the resistive force comprises friction. In some embodiments, the friction is generated where two surfaces in the system 30 are forced to slide relative to each other when in contact with one another.

Figure 9D:
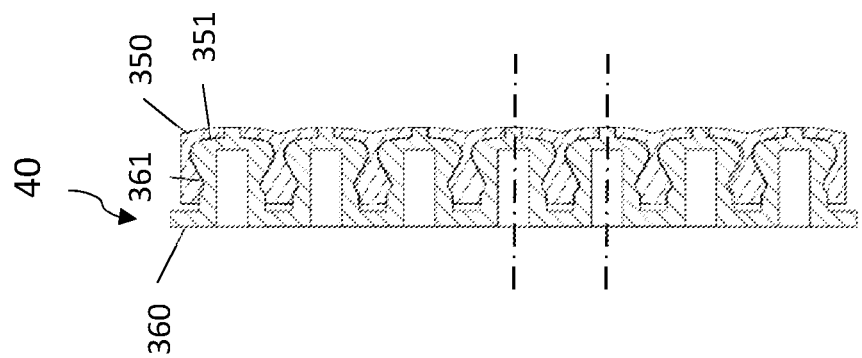
FIGS. 9a-d show cross-sectional views of embodiments of the present invention.
Figure 9C:
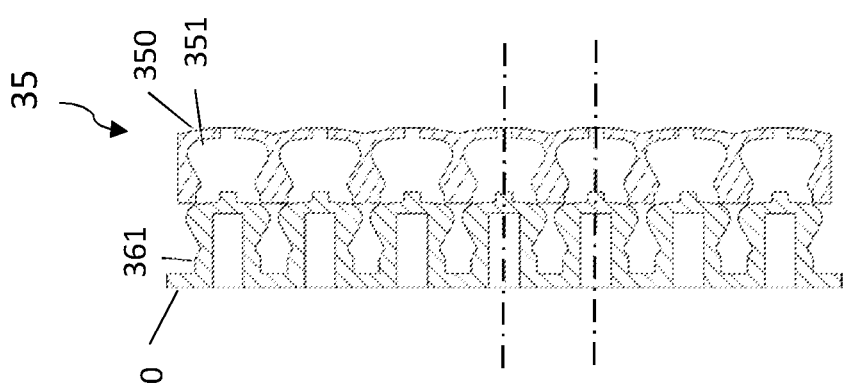
Figure 9B:
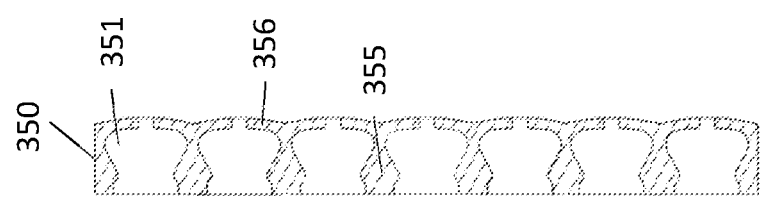
Figure 9A:
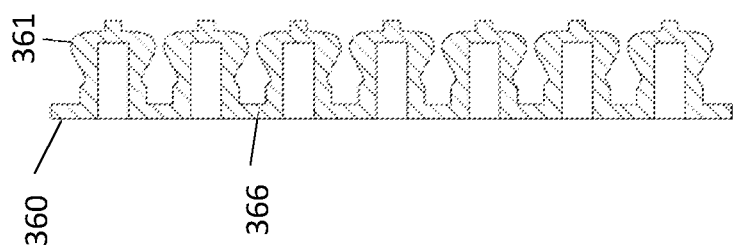

FIG. 9a shows a cross-section view of a second layer 360 of an embodiment according to the present invention. FIG. 9b shows a cross-section view of a first layer 350 of an embodiment according to the present invention. FIG. 9c shows a cross-section view of an energy absorbing system 35 according to embodiments of the present invention. FIG. 9d shows a cross-section view of an energy absorbing system 40 according to embodiments of the present invention. In embodiments of FIGS. 9a-d, a first layer 350 comprises two or more cells 351 and each of the two or more cells 351 are oriented in the same direction. In embodiments of FIGS. 9a-d, a second layer 360 comprises one or more protrusions 361. In embodiments of FIG. 9d, the protrusions 361 in the second layer 360 are interlocked with respective cells 351 in the first layer 350. In embodiments of FIG. 9c, the protrusions 361 in the second layer 360 abut respective cells 351 in the first layer 350, such that, upon impact, the protrusions 361 move in to respective cells 351. In embodiments of FIGS. 9a-d, each of the protrusions 361 in the second layer 360 is joined by a base element 366 to form a sheet of protrusions 361.

In embodiments of FIGS. 9c-d, the first and second layers in the energy absorbing system are configured such that, upon impact to the system 35 (or 40), a resistive force is created between the layers 350, 360. The resistive force absorbs energy from the impact. In some embodiments, the resistive force comprises friction. In some embodiments, the friction is generated at any points where two surfaces in the system 35 (or 40) are forced to slide relative to each other when in contact with one another.

Some embodiments of FIGS. 8a-e and 9a-d have been tested on a drop tower apparatus. A curved anvil was used as the top impactor, in the shape of a headform, as used for helmet testing. The tests were performed in the crown area; this area of the headform has a sphere of approximately 73 mm radius. A flat lower anvil was used for the tests. Acceleration was measured in line with the center line of the headform anvil. The transmitted force was measured with a load cell at the base of the flat anvil. The peak numbers were digitally extracted from the acceleration and force traces. The traces were also filtered in accordance with British Standards Institution (BSI) sporting goods standards and the peak accelerations and forces recorded. The falling mass was 5 KG and the drop height set so the energy was 50 Joules, as is commonly used in sporting goods tests. This is slightly higher than the usual 4.7 kg typically used in medium sized helmet tests. The target stand of distance was 12.7 mm and the target peak acceleration below 250 g. This is the approximate level that exiting helmets attain using EPS or Expanded Polypropylene (EPP).

FIG. 10, shows energy absorbing performance results for examples of embodiments of FIGS. 8a-e and 9a-d. Each of the samples tested comprised a strain rate sensitive material.

Sample 1 was a first layer 350 of an example embodiment of FIG. 9b, with a thickness of 12 mm. Sample 2 was an example embodiment of FIG. 8e, with each of the layers 310, 320 having a thickness of 10 mm and the overall system 30 having a thickness of 12 mm. Sample 3 was an example embodiment of FIG. 9d, wherein the first layer 350 and the second layer 360 were interlocked, with each of the layers 350, 360 having a thickness of 10 mm and the overall system 40 having a thickness of 12 mm. Samples 2 and 3 gave similar energy absorbing performance results, which were significantly better than Sample 1. Transmitted force and acceleration were reduced by around 30%, with an increase in mass of around only 6%, showing the unexpected benefit of providing two layers configured to interlock with one another.

Samples 4-6 were identical to respective samples 1-3, except that a softer grade material was used. Again, samples 5 and 6 were approximately 6% heavier than sample 4, but transmitted force and acceleration were reduced by around 34%.

Sample 7 was an example embodiment of FIG. 9d, wherein the first layer 350 and the second layer 360 were interlocked, with each of the layers 350, 360 having a thickness of 10 mm and the overall system 40 having a thickness of 12 mm. Sample 8 was an example embodiment of FIG. 8d, with a thickness of 16 mm. Samples 7 and 8 gave similar energy absorbing results, however Sample 8 needed to be 4 mm thicker and 34% heavier to achieve similar results to Sample 7.

Sample 9 was a solid layer of 12 mm thick strain rate sensitive material. Sample 10 was identical to Sample 3. Samples 9 and 10 were made from the same material. Sample 10 gave a transmitted force and acceleration of around 13% lower than Sample 9, while being around 38% lighter than Sample 9.

The results shown in FIG. 10 show that when two layers comprising re-entrant geometry are used together, in such a way that they interlock, there is an unexpected performance improvement of typically over 30%, while only being about 5% more mass.

This performance improvement is attributed to the addition of a friction component to the system, upon impact.

Some embodiments of FIGS. 8a-e and 9a-d have been tested in repetition. There was no reduction in impact performance, showing that the embodiments can withstand repeat impacts. Typical materials used in helmets, for example, can usually withstand a single impact only. This is applicable to military helmets, where the hard ballistic shell is very damage tolerant and newer requirements are for repeat impact. Embodiments of FIGS. 8a-e and 9a-d can also be tuned to give a similar performance to typical helmet liner materials, such as EPS and EPP, but can be considerably softer and more comfortable, negating the need for additional soft comfort foam. They can also be breathable to help comfort. These materials would allow for a foldable helmet as they are very flexible and can pass a 250 g test in a flexible system at a thickness of 12 mm.

Embodiments gain this effect by using the components of 9b and 8a and surrounding them in other materials. These could be any materials, in some embodiments, they are cast in PU foam and provide a performance improvement higher than the constituent parts. Similar effects may apply for other energy absorbing materials, especially EPS in helmets, where the parts of 9b and 8a could be placed in the tools as the EPS is manufactured.

Figure 11:
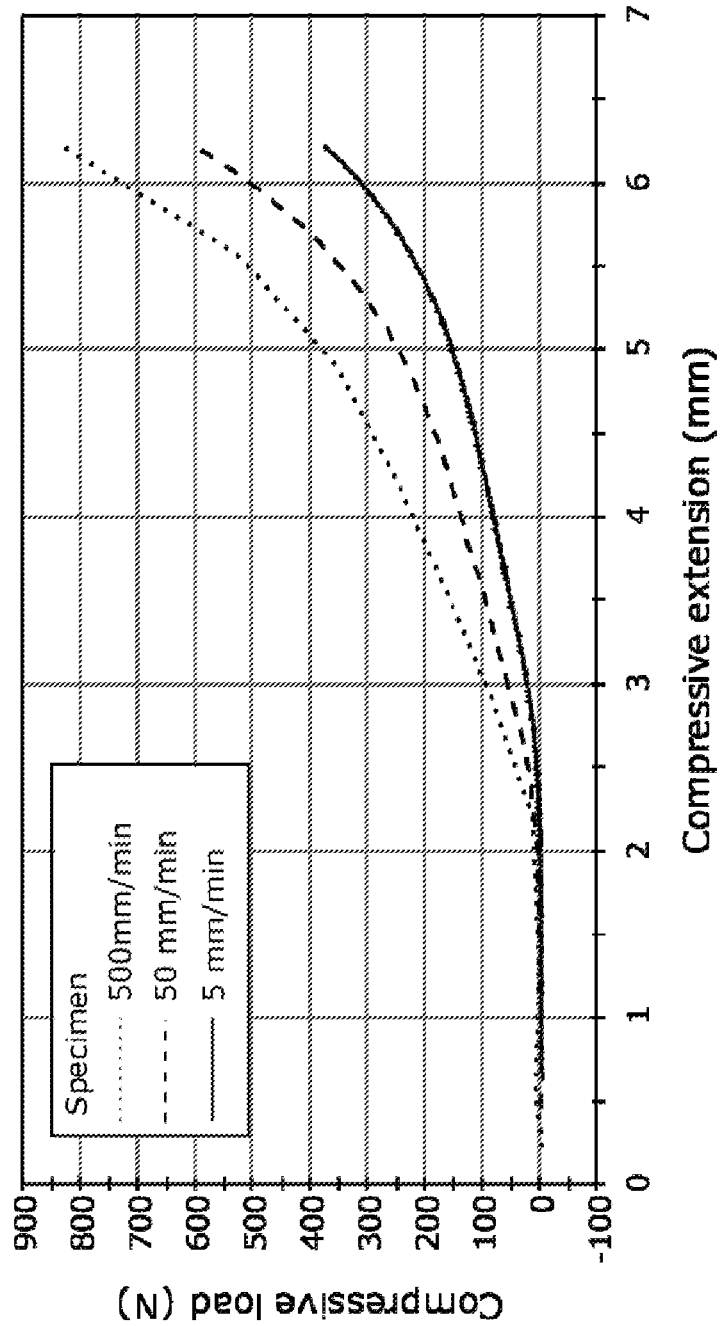
FIG. 11 shows force vs load results for examples of embodiments according to the present invention.

Some embodiments of FIGS. 8a-e and 9a-d have been tested on a 250 kN InstronTM frame, with flat patterns. Samples comprising strain rate sensitive material were tested at three different frame speeds, 500, 50, 5 mm per minute. FIG. 11 shows energy absorbing performance results for these tests. In FIG. 11, compressive load is plotted against compressive extension for each frame speed. The results of the tests strain rates of approximately 8.3, 0.83, and 0.083 s-1 for the respective frame speeds, which are as a result of the material being strain rate sensitive. The compressive load in FIG. 11 is relatively low for the first 2 mm of travel. This feature is as a result of the re-entrant geometry of the soft 'dome' shape of the cells 311 (or 351). This engineered feature gives the embodiments of the present invention a soft touch, making them more comfortable to wear and it allows for the absorption of small knocks and impacts. To gain a similar performance, alternative energy absorbing materials, such as EPS or VNR would have to be considerably harder. In the case of EPS this is almost rigid, and VNR would be very hard.

Typically body armor and helmets are tested on drop apparatus, with speeds between 4.3 and 7.5 m/s, usually accomplished by free fall drop between 1 and 2 meters.

These drop tests for Conformité Européenne (CE) type approval can give strain rates in the materials of up to 140 s-1. The tests above on the InstronTM frame are limited to lower speed as the cross head cannot be moved faster than 500 mm per minute. However, as shown in FIG. 11, a change in measured compressive load can be seen between material strain rates of 8.3, 0.83, and 0.083 s-1, which are equivalent to the machine rates of 500 mm/min, 50 mm/min and 5 mm/min shown in FIG. 11.

Compared to the impact speeds and strain rates that happen in the CE type approval, as conducted for the tests in FIG. 10, which are over 140 s-1, these are considerably lower. However, due to the thickness of the sample being tested, at only 10 mm, the velocity of the machine is changed to give two magnitudes change in strain rate, however this is at the lower end of the strain rate that is typical for these devices.

Figure 12:
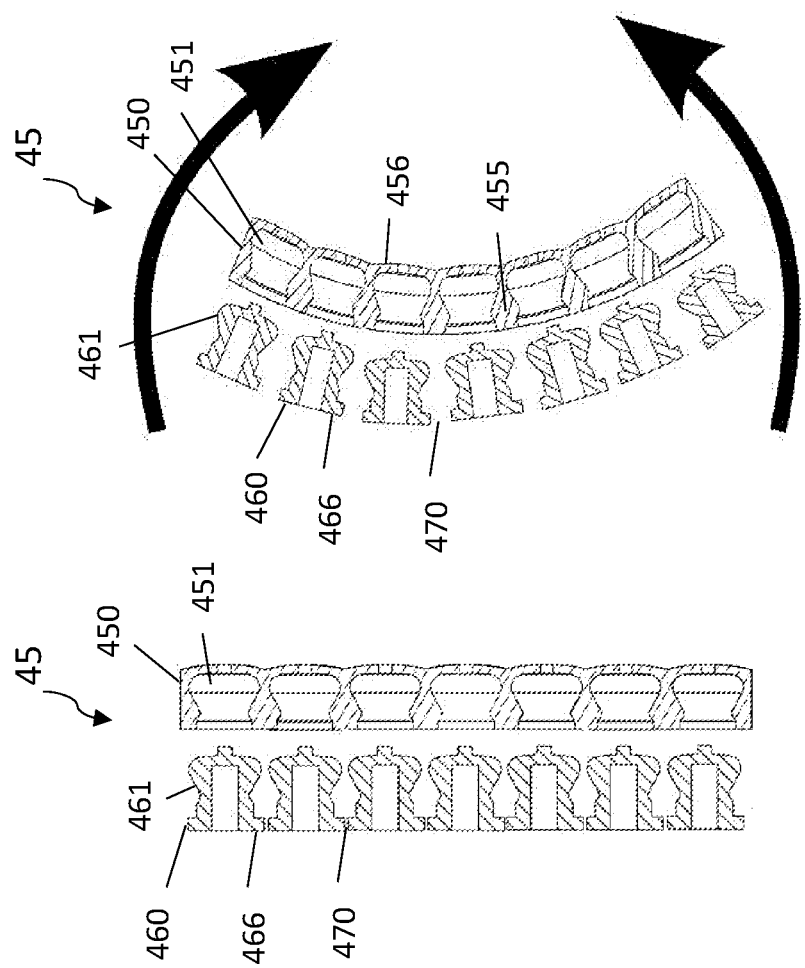
FIGS. 12a-b show cross-sectional views of an embodiment according to embodiments according to the present invention.

FIG. 12a shows a cross-section view of embodiments of the present invention. FIG. 12b shows cross-section view of embodiments of FIG. 12a. Embodiments of FIGS. 12a-b could be any variation of the geometries discussed herein with reference to FIGS. 8a-e and 9a-d. In embodiments of FIGS. 12a-b, the first layer 450 comprises two or more cells 451 and the second layer 460 comprises two or more protrusions 461. The two or more protrusions 461 in the second layer 460 are interlocked with respective two or more cells 451 in the first layer 461. In FIGS. 12a-b, for the sake of clarity, the protrusions 461 in the second layer 460 are not pressed home into their respective cells 451 in the first layer 450.

In embodiments of FIGS. 12a-b, not all of the protrusions 461 in the second layer 460 are joined by a base element. In some embodiments, each protrusion 461 in the second layer 460 is an individual part in the energy absorbing system 45. In other embodiments, a line or a group of protrusions 461 are joined by a base element (not shown). When embodiments of FIGS. 12a-b are folded in the direction of the arrows, the bases 466 of the protrusions 461 in the second layer 460 are moved further apart, and when folded in the opposite direction, any gap 470 between the bases 466 of the protrusions 461 in the second layer 460 closes until there are no gaps. In these embodiments, the system 45 can fold in the directions of the arrows shown in FIG. 12*b*, but flexibility is restricted in the opposite direction. Such a configuration could be beneficial for a back protector, following the curvature of the spine when bending forwards, but restricting flexion in the opposite direction.

The flexibility of embodiments of FIGS. 12*a-b* can be tuned by altering which protrusions 461 in the second layer 460 are joined by a base element (not shown). An embodiment wherein each of the protrusions 461 in the second layer 460 are individual parts provides the greatest degree of flexibility, and provides flexibility in more directions than other embodiments. Additional flexibility in the energy absorbing system 45 allows for a more bio-anatomical curvature, as the protrusions 461 in the second layer 460 can be curved out from body parts.

In some embodiments of FIGS. 12*a-b*, there are fewer protrusions 461 in the second layer 460 than there are cells 451 in the first layer 450. In some embodiments, the position of the protrusions 461 in the second layer 460 is tuned to a particular impact threat. The protrusions 461 in the second layer 460 can be added to the necessary cells 451 in the first layer 450. In some embodiments, the location of the protrusions 461 in the second layer 460 can be tuned by the wearer. Addition of protrusions 461 in the second layer 460 improves the impact performance of the system 45 and does not add any hard parts.

Embodiments of FIGS. 12*a-b* can control the flex or hyperextension of any particular body part, but can be envisaged particularly for the spine, knee, elbow and neck. This could be used at the base of helmets, to extend the protection area below current stiff shells, to help prevent neck injuries. Especially adding some protection below what is currently attainable in a hard shell helmets for hard ball sports, such as cricket and baseball, where there are likelihood of injury or death from ball to head impacts below the helmet line. The hardness of the protrusions 461 in the second layer 460 can be different to the first layer 450, so as to tune the amount of flexure to a predetermined amount.

In embodiments of FIGS. 12*a-b*, the protrusions 461 in the second layer 460 are joined or molded onto a thin material (not shown) that has a high compressive strength. Some embodiments of FIGS. 12*a-b* comprise a tensile layer (not shown) on surface 456 of the first layer 450. Either or a combination of these embodiments would further prevent flexure in the direction opposite to the arrows of FIG. 12*a-b*.

Some embodiments of FIGS. 9*a-d* and FIGS. 12*a-b* comprise a tensile layer (not shown). In some embodiments, the first layer 350 (or 450) comprises a tensile layer. In some embodiments, the tensile layer comprised in the first layer 350 (or 450) is positioned on surface 356 (or 456) of the first layer 350 (or 450). In some embodiments, the tensile layer comprises a textile. In some embodiments, the textile is placed in to the molding tool during manufacture of the first layer 350 (or 450), such that the strain rate sensitive material is forced through the weave of the textile. In other embodiments, a tensile layer may be adhered to any other surface of the energy absorbing system 35 (or 40, or 45).

Embodiments according to FIGS. 8*a-e*, 9*a-d* and 12*a-b* comprise at least a first layer 310 (or 350, or 450) and a second layer 320 (or 360, or 460), wherein the first and second layers comprise a plurality of sheets. Each of the plurality of sheets of the first layer 310 (or 350, or 450) comprises two or more cells 311 (or 351, or 451) joined by a base element 315 (or 355, or 455). Each of the plurality of sheets in the second layer 320 (or 360, or 460) comprise a plurality of protrusions 321 (or 361, or 461) joined by a base element 326 (or 366, or 466). A cell 311 (or 351, or 451) in a first sheet in the first layer 310 (or 350, or 450) is interlocked with a first protrusion 321 (or 361, or 461) in a first sheet in the second layer 320 (or 360, or 460), and a second protrusion 321 (or 361, or 461) in the first sheet in the second layer 320 (or 360, or 460) is interlocked with a cell 311 (or 351, or 451) in a second sheet in the first layer 310 (or 350, or 450). Such a configuration results in an energy absorbing system 35 (or 40, or 45) comprised of a plurality of sheets, creating a modular energy absorbing system that can be easily tailored for a particular implementation without weak points or hard points. In addition, manufacturing a sheet of cells 311 (or 351, or 451) or protrusions 321 (or 361, or 461) is simpler than manufacturing a plurality of individual cells 311 (or 351, or 451) or protrusions 321 (or 361, or 461).

In some embodiments of FIGS. 8*a-e*, 9*a-d* and 12*a-b*, the system is tailored for maximum flexibility or movement. In other embodiments, the system is tailored to flex only in a particular direction. In other embodiments, the system is tailored to permit flexion to a predetermined limit. For example, the system could comprise a multi-plate back protector.

In some embodiments of FIGS. 8*a-e*, 9*a-d* and 12*a-b*, the first and second layers in the system are not planar. In some embodiments, the first layers 310 (or 350, or 450) and second layers approximate a sphere 320 (or 360, or 460). Here the architecture would flex one way and fold. It could be flexed the opposite way through a point of inflection and then lock into place to give a folding helmet. In one embodiment, a tensile layer is on the outside of the sphere and the protrusions in the second layer 320 (or 360, or 460 are on the inside (head side) to control the shape and help it have some rigidity, keeping the helmet in shape. This type of foldable helmet could then be folded flat by pushing it back through the inflection point.

In some embodiments of FIGS. 8*a-e*, 9*a-d* and 12*a-b*, the system in configured such that, after impact to the system, each of the layers in the system return to their original geometry. This feature allows the system to withstand multiple impacts without loss in performance.

Figure 13:
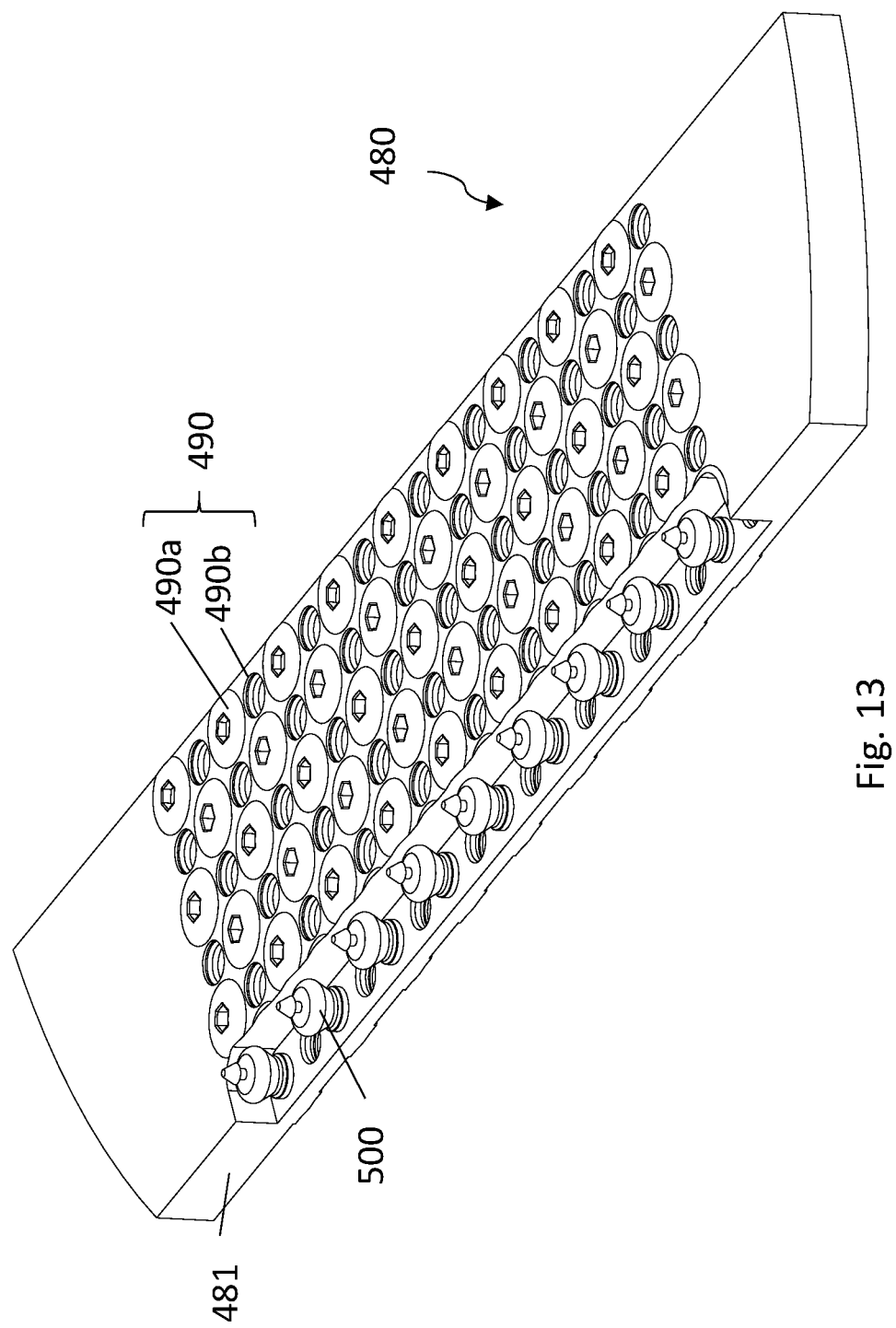
FIG. 13 shows an isometric view of an embodiment according to embodiments according to the present invention.

FIG. 13 shows a perspective view of an embodiment of the present invention. Embodiments of FIG. 13 comprise a sheet 480 comprising a plurality of cells 490 comprising re-entrant geometry, and a plurality of protrusions 500 along one edge 481. Embodiments according to FIG. 13 provide a way to join a plurality of sheets 480 of cells 490 or protrusions 500 in an energy absorbing system together without the need to manufacture additional components and without creating weakness at the joints between the sheets. Embodiments of FIG. 13 are applicable for joining sections of multi-section back protectors together, pieces of helmet together, or tiles of convoy matting together.

FIG. 13 shows cell 490*a* oriented in the opposite direction to cell 490*b*. In other embodiments, the cells 490 are arranged in any other pattern. In some embodiments, all of the cells 490 in sheet 480 are oriented in the same direction.

In some embodiments, sheets 480 according to FIG. 13 are manufactured as a single part. In some embodiments, sheet 480 is manufactured by molding.

In embodiments of FIGS. 8*a-e*, 9*a-d* and 12*a-b*, where the first layer 310 (or 350, or 450) and the second layer 320 (or 360, or 460) comprise strain rate sensitive material, the protrusion 321 (or 361, or 461) can easily be pushed in to the cells 311 (or 351, or 451). It is common for strain rate sensitive materials to re-heal, and thus, over time, the protrusions 321 (or 361, or 461) that are interlocked with a cell 311 (or 351, or 451) form a better bond with the respective cells 311 (or 351, or 451), making taking the layers 310, 320 (or 350, 360, or 450, 460) apart more difficult. Thus, there is provided a system for joining geometries together that improves the performance and does not reduce flexibility, comfort, or add any hard parts, and once joined together, the layers 310, 320 (or 350, 360, or 450, 460) are harder to take apart. The joint can be considered semi-permanent and does not come apart when tested under repeat impact. Furthermore, these interlocking pins and cells, would not be a weak area for impact performance as they would benefit from the friction component described with reference to FIG. 9c.

FIG. 14a shows an isometric view of an energy absorbing system according to embodiments of the invention. FIG. 14b shows a top view of the embodiment of FIG. 14a. FIG. 14c shows a cross-section view of section A-A in FIG. 14b. FIG. 14d shows a cross-section view of section C-C in FIG. 14b. The energy absorbing system 50 of the embodiment shown comprises a first layer 510 and a second layer 520. In other embodiments, the system 50 comprises more than two layers. Each of the layers 510, 520 comprises at least one cell 511 (or 521, respectively). The cells 511, 521 have an anisotropic re-entrant geometry.

In embodiments of FIGS. 14a-c, the cells 511, 521 are a re-entrant dome structure comprising an opening 512 (or 522) at the top of the dome. In other embodiments, the cells 511, 521 have the same geometry as that shown in FIGS. 3e-e. An opening 512 (or 522) increases the breathability and flexibility of the system 50.

In embodiments of FIGS. 14a-d, each cell 511 (or 521) in a layer 510 (or 520) is joined to at least one other cell by a base element 515 (or 525), and configured such that the cells 511 (or 521) in a layer 510 (or 520) are spaced apart so that a cell 511 (or 521) of an adjacent layer can fit in to the gap 530 between the cells 511 (or 521). FIGS. 14a-d show the cells 511, 521 in the layers 510, 520 arranged in a grid. In other embodiments, the cells 511, 521 are arranged in a radial pattern. In other embodiments, the cells 511, 521 are in any other pattern.

In embodiments of FIGS. 14a-d, the first layer 510 and the second layer 520 are oriented in opposite directions, such that the cells 511 in the first layer 510 protrude towards the second layer 520, and the cells 521 in the second layer 520 protrude towards the first layer 510. The layers 510, 520 are pressed together so that the cells 511 in the first layer 510 overlap with the cells 521 in the second layer 520. In embodiments according to FIGS. 14a-c, the gap 530 between the cells 511, 521 is smaller than the cells 511, 521 so that when the layers 510, 520 are pressed together, the cells 511 in the first layer 510 are touching the cells 521 in the second layer 520. Upon impact to the system 50, cells 511, 521 that are touching each other are forced together, resulting in friction, which is an additional energy absorbing mechanism, as per embodiments of the invention described above. In some embodiments, the layers 510, 520 are stitched together. In other embodiments, the layers 510, 520 are fused together.

Because the cells 511, 521 in systems 50 according to FIGS. 14a-d are anisotropic, the energy absorbing system 50 has a different cross-section in different directions, as demonstrated by FIGS. 14c-d. This results in a system 50 that has a different response to an impact in different directions (for example, normal impact compared to shear impact).

In embodiments of FIGS. 14a-d, the layers 510, 520 have a relatively low specific gravity. In some embodiments, the specific gravity is 0.1. Embodiments are particularly suitable for lightweight sports protection, for integration in clothing and for medical impact devices. As an example of a medical impact device; the layers 510, 520 have a hole in the center which is void of cells 511, 521. The hole is placed above the femur on a medical hip protector, so that the system 50 may absorb femur loads. A prototype of such a configuration, with a system 50 thickness of 11 mm has been tested to the draft BSI 8575 Medical hip protector standard. The system 50 attained a femur load of 1.63 kN. The estimated pass for the standard is expected to be 1.9 kN. The nominal thickness for alternative technology to reach 1.9 kN is above 18 mm.

In some embodiments of FIGS. 14a-c, the base element 515 (or 525) is a tensile layer (not shown). In some embodiments, only one layer 510 (or 520) comprises a tensile layer. In other embodiments each of the layers 510, 520 in the system 50 comprise a tensile layer. In some embodiments, the tensile layer in each layer 510, 520 is the same and in other embodiments, the tensile layer in each layer 510, 520 has different properties. In some embodiments, the tensile layer in a textile. In some embodiments the textile joins the cells 511 (or 521) at the bottom of the cells 511 (or 521). In some embodiments, the textile is formed into the cell shape during manufacture, via an open and shut tool. This results in the textile following the shape of the cell. In other embodiments, the textile is a flat surface.

Embodiments according to FIGS. 8a-e, 9a-d, 12a-b, 13 and 14a-d are flexible and breathable. Embodiments can be formed on to a shaped surface even if the layers in the system are molded flat. Embodiments can bend in more than one direction simultaneously, which can be very difficult to achieve with typical soft cellular materials.

Embodiments according to FIGS. 8a-e, 9a-d and 12a-b comprise methods for manufacturing systems 30 (or 35, or 40, or 45). In embodiments, the manufacturing method comprises forming a first layer, forming one or more cells in the first layer, each cell having a re-entrant geometry, forming a second layer and forming one or more protrusions in the second layer; in such embodiments, at least one of the first and second layers comprise strain rate sensitive material.

In embodiments, the forming comprises one or more of: molding, additive manufacturing, and the like. In some embodiments, the forming comprises injection molding.

In some embodiments, the method of manufacture comprises interlocking the one or more cells in the first layer with respective one or more protrusions in the second layer. In other embodiments, the method comprises abutting the one or more cells in the first layer with respective one or more protrusions in the second layer.

In methods according to embodiments of FIGS. 8a-e, 9a-d and 12a-b, the method comprises configuring one or more properties in the system in order to provide a tuned response to an impact to the system. In some embodiments, the method comprises providing a tuned flexure in at least two different directions. The properties of the system that can be configured include, but are not limited to: the relative positioning of one or more protrusions in the second layer, the relative positioning of one or more cells in the first layer, the thickness of the layers in the system, the composition of material of the layers in the system, the size of the one or more protrusions in the second layer, the size of the one or more cells in the first layer, the degree of abutment between the layers and the interlocking between the layers.

Embodiments of the present invention comprise a flexible energy absorbing system comprising a body, the body comprising: an inner cell and an outer cell, wherein the inner cell is within the outer cell, wherein the inner cell is retained within the outer cell by a web, and wherein at least one of the inner cell and the outer cell comprise a re-entrant geometry, wherein the body comprises a strain rate sensitive material, and wherein the inner cell and the outer cell are orientated in the same direction. In some embodiments, at least one wall of the outer cell has a height along the direction of a central axis of the body which is greater than the height of the inner cell along the direction of the central axis of the body.

Figure 15D:
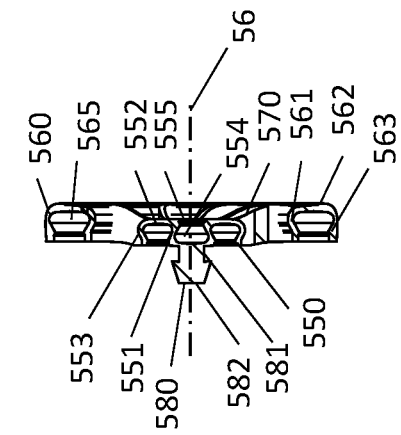
FIGS. 15a-d show an isometric view, front view, side view and cross-section view of a body according to embodiments of the invention, respectively.
Figure 15C:
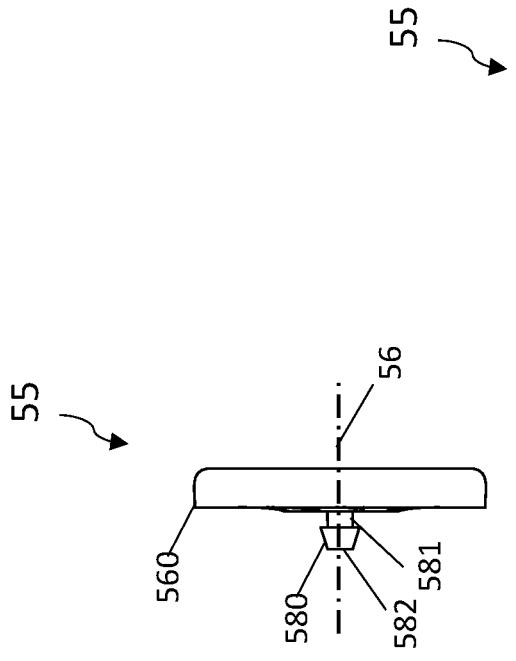
Figure 15B:
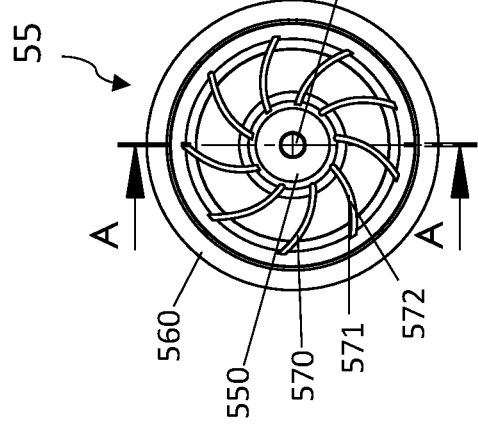
Figure 15A:
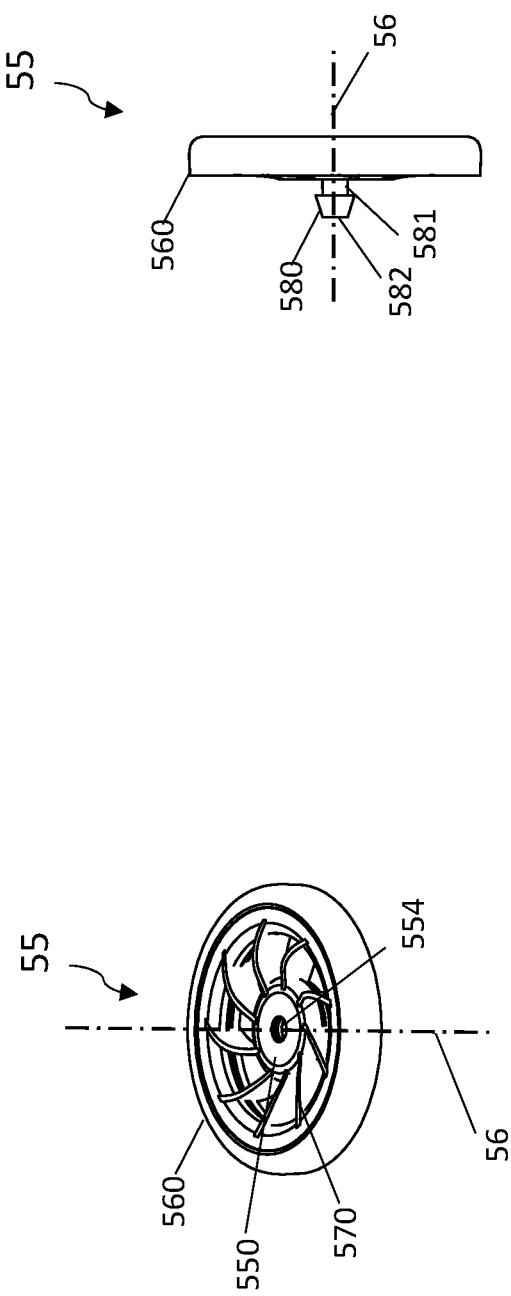

FIG. 15a shows an isometric view of a body according to embodiments of the invention. FIG. 15b shows a front view of the body of FIG. 15a. FIG. 15c shows a side view of the body of FIG. 15a. FIG. 15d shows a cross-section view of section A-A of FIG. 15b. In embodiments of FIGS. 15a-d, the body 55 comprises strain rate sensitive material. The body 55 has re-entrant geometry. In some embodiments, at least some of the re-entrant geometry is parallel to the direction of the central axis 56 of the body 55.

Embodiments of FIGS. 15a-d comprise an inner cell 550 within an outer cell 560. In some embodiments, one of the inner cell 550 and the outer cell 560 have re-entrant geometry in a direction parallel to the central axis of the body 55. In other embodiments, the inner cell 550 and the outer cell 560 have re-entrant geometry in a direction parallel to the central axis of the body 55. In embodiments, the inner cell 500 and the outer cell 560 comprise strain rate sensitive material.

In some embodiments of FIGS. 15a-d, the inner cell 550 has a re-entrant geometry that is substantially similar to the cells 311 described in reference to FIGS. 8a-e; in such embodiments, the re-entrant geometry is formed from one of corrugations and folds, and the walls of each corrugation or fold are inwardly angled towards each other to form a re-entrant angle. In some embodiments, the inner cell 550 comprises an inner wall 551, a top wall 552 and an outer wall 553. The inner wall 551, top wall 552 and outer wall 553 form a re-entrant channel 555 extending around the circumference of the inner cell 550. Other embodiments comprise an inner cell 550 comprising a re-entrant geometry as described with any other embodiment of the present invention described herein.

Embodiments of FIGS. 15a-d comprise an outer cell 560 comprising an inner wall 561, a top wall 562 and an outer wall 563. The inner wall 561, top wall 562 and outer wall 563 form a re-entrant channel 565 extending around the circumference of the outer cell 560. In some embodiments, outer cell 560 comprises an annulus.

In embodiments, the inner cell 550 and the outer cell 560 are orientated in the same direction. That is, the top walls 552, 562 are in the same orientation, perpendicular to the central axis 56 of the body, with the respective inner walls 551, 561 and outer walls 553, 563 extending from the top walls 552, 562 substantially parallel to one another and in substantially the same direction.

In some embodiments, at least one wall 561, 563 of the outer cell 560 has a height along the direction of the central axis 56 of the body 55, which is greater than the height of the inner cell 550 along the direction of the central axis 56 of the body 55.

In some embodiments of FIGS. 15a-d, the inner cell 550 and the outer cell 560 are circular. In some embodiments, the inner cell 550 and the outer cell 560 are anisotropic and comprise a major axis and a smaller minor axis (not shown), where the major axis and minor axis are normal to the central axis 56 of the body 55. In some embodiments, the inner cell 550 and the outer cell 560 are elliptical. In some embodiments, the inner cell 550 and the outer cell 560 are any other shape, for example, a polygon. In some embodiments, the inner cell 550 has a shape and the outer cell 560 has a different shape.

In embodiments of FIGS. 15a-d, the inner cell 550 is retained within the outer cell 560 by a web 570. In some embodiments, the web 570 retains the inner cell 550 so that it is concentric with the outer cell 560. In other embodiments, the inner cell 550 is retained at a different position within the outer cell 560.

In some embodiments of FIGS. 15a-d, the web 570 comprises a solid material that fills the area between the inner cell 550 and the outer cell 560. In some embodiments, the web 570 comprises one or more ribs 571 extending between the inner cell 550 and the outer cell 560. In some embodiments, the one or more ribs 571 are linear. In some embodiments, the ribs 571 extend radially outwards. In some embodiments, the one or more ribs 571 comprise one or more radial blades 572, as shown in FIGS. 15a-b. In some embodiments, the one or more ribs 571 are evenly spaced. In other embodiments, the one or more ribs 571 are positioned to tune the response of the body 55 to an impact to the body 55. In some embodiments, the body 55 is manufactured as a single part, such that the web 570, inner cell 550 and outer cell 560 are formed of the same material and in the same manufacturing process.

In some embodiments of FIGS. 15a-d, the inner cell 550 comprises a re-entrant recess 554 extending from a side of the inner cell 550 along the central axis 56 of the body 55. In some embodiments, the inner cell comprises a protrusion 580. In some embodiments, the protrusion 580 extends from an opposite side of the inner cell 550 to the re-entrant recess 554. In some embodiments, the protrusion 580 comprises a first part 581 with a first diameter, and a second part 582 with a second diameter which is larger than the diameter of the first part 581. The second part 582 is further from the inner cell 550 than the first part 581. In some embodiments, the protrusion 580 of a first body 55 is configured to fit in to the re-entrant recess 554 of a second body 55, so that the two bodies 55 are rotatably connected. The second part 582 of the protrusion 580 has a larger diameter than the opening 555 of the re-entrant recess 554, so that the two bodies 55 interlock when the protrusion 580 of the first body 55 is pushed in to the re-entrant recess 554 of the second body 55. This is a semi-permanent joint and, in some embodiments, the first and second bodies 55 can be pulled apart by hand. In other embodiments, more than two bodies 55 may be layered in this way.

In some embodiments of FIGS. 15a-d, the protrusion 580 rotatably connects the body 55 to a surface (not shown) comprising a hole with a smaller diameter than the second part 582 of the protrusion 580. The protrusion 580 is pushed in to the hole in the surface so that the second part 582 prevents the body 55 moving away from the surface. In some embodiments, the surface comprises the inside surface of a helmet. In other embodiments, the protrusion 580 is not circular. In such embodiments, the protrusion 580 prevents free rotation of the body 55 about the protrusion.

In some embodiments according to FIGS. 15a-d, the protrusion 580 is manufactured as a separate part to the body 60. In these embodiments, the protrusion 580 comprises a third part (not shown) with a larger diameter than the first part 581, at the opposite end of the first part 581 to the second part 582. In these embodiments, the re-entrant recess 554 of the inner cell 550 comprises a second opening (not shown) at the opposite end of the re-entrant recess 554 to the first opening 555. The third part of the protrusion 580 is forced in to the second opening of the re-entrant recess 554 so that it is removable and rotatably connected to the body 60.

Embodiments according to FIGS. 15a-d allow a controlled amount of rotation movement upon an oblique impact to the body 55. For example, when one or more bodies 55 are connected to the inside surface of a helmet, the bodies help to protect the wearer of the helmet against highly rotational loads that the helmet is subjected to.

Existing helmets comprise a hard shell and an EPS core. This core would follow the stress-strain curve of FIG. 7a. Thus, the helmets perform well under large impacts, for example over 250 g, but offer low protection if the stress caused by an impact is not high enough to allow the EPS to start to crush and therefore for the stress-strain curve to reach the "plateau region". An existing helmet with standard EPS construction was tested and compared to an identical helmet comprising a body 55 according to FIGS. 15a-d, with a thickness of 4 mm, on the inside surface of the helmet and to an identical helmet comprising a layer 310 according to FIGS. 8a-e, with a thickness of 4 mm, on the inside surface of the helmet. The body 55 and the layer 310 were positioned in the crown area of the helmet for their respective tests. Drop heights of 100 mm, 150 mm and 200 mm were tested.

FIG. 16 shows that a helmet comprising a 4 mm thick layer 310 or body 55 on its inside surface was able to reduce the peak acceleration recorded, g, in the helmet alone by around 50%. The improved performance is attributed to the strain rate sensitive material and the re-entrant geometry, among other aspects mentioned earlier in this description. The layer 310 and the body 55 were not damaged, and could be used for multiple impacts.

Embodiments of the present invention comprise a flexible energy absorbing system comprising a body, the body comprising: an inner cell and an outer cell, wherein the inner cell is within the outer cell, wherein the inner cell is retained within the outer cell by a web, wherein at least one of the inner cell and the outer cell comprise a re-entrant geometry, and wherein the body comprises a strain rate sensitive material, wherein the inner cell comprises an overhang at an opening of the inner cell, wherein the outer cell comprises an overhang at an opening of the outer cell, and wherein the overhang of the outer cell is different from the overhang of the inner cell. In some embodiments, the overhang of the outer cell is larger than the overhang of the inner cell. In other embodiments, the overhang of the inner cell is larger than the overhang of the outer cell.

FIG. 17a shows an isometric view of a body according to embodiments of the invention. FIG. 17b shows a front view of the body of FIG. 17a. FIG. 17c shows a cross-section view of section A-A of FIG. 17b. In embodiments of FIGS. 17a-d, the body 60 comprises strain rate sensitive material. The body 60 has re-entrant geometry. In some embodiments, at least some of the re-entrant geometry is parallel to the direction of the central axis 61 of the body 60.

Embodiments of FIGS. 17a-c comprise an inner cell 600 within an outer cell 610. In some embodiments, one of the inner cell 600 and the outer cell 610 have re-entrant geometry in a direction parallel to the central axis of the body 60. In other embodiments, the inner cell 600 and the outer cell 610 have re-entrant geometry in a direction parallel to the central axis of the body 60. In some embodiments, the inner cell 600 and the outer cell 610 comprise strain rate sensitive material.

In some embodiments of FIGS. 17a-c, the inner cell 600 and the outer cell 610 are circular. In some embodiments, the inner cell 600 and the outer cell 610 are any other shape, for example, a polygon. In some embodiments, the inner cell 600 and the outer cell 610 are anisotropic and comprise a major axis and a smaller minor axis, as shown in FIGS. 18a-d. In embodiments according to FIGS. 18a-d, the major axis 67 and minor axis 68 are normal to the central axis 66 of the body 65. In some embodiments, the inner cell 650 and the outer cell 660 are elliptical. In some embodiments of FIGS. 17a-c and 18a-d, the inner cell 600 (or 650) has a first shape and the outer cell 610 (or 660) has a second, different shape.

In some embodiments of FIGS. 17a-c and 18a-d, the inner cell 600 (or 650) has a re-entrant geometry that is substantially similar to the cells 311 described in reference to FIGS. 8a-e; in such embodiments, the re-entrant geometry is formed from one of corrugations and folds, and the walls of each corrugation or fold are inwardly angled towards each other to form a re-entrant angle. Other embodiments comprise an inner cell 600 (or 650) comprising a re-entrant geometry as described with any other embodiment of the present invention described herein. In some embodiments, the inner cell 600 (or 650) comprises a re-entrant recess 605 (or 655), having an opening 606 (or 656). In some embodiments, the re-entrant recess 605 (or 655) extends through the inner cell 600 (or 650) to a second opening 607 (or 657).

In some embodiments, the outer cell 610 (or 660) has a re-entrant geometry that is substantially similar to the cells 311 described in reference to FIGS. 8a-e. In some embodiments, outer cell 610 (or 660) comprises an annulus.

In embodiments of FIGS. 17a-c and 18a-d, the outer cell 610 (or 660) has an overhang 611 (or 661) at an opening of the outer cell 610 (or 660) and the inner cell 600 (or 650) has an overhang 601 (or 651) at an opening 606 (or 656) of the inner cell 600 (or 650). The overhang of the outer cell is different from the overhang of the inner cell. In some embodiments, the overhang 611 (or 661) of the outer cell 610 (or 660) is larger than the overhang 611 (or 661) of the inner cell 600 (or 650). In other embodiments, the overhang 611 (or 661) of the inner cell 600 (or 650) is larger than the overhang 611 (or 661) of the outer cell 610 (or 660). A larger overhang gives an improved rotational and shear performance over a smaller overhang. In some embodiments of FIGS. 17a-c and 18a-d, the thickness of the wall 612 (or 662) of the outer cell 610 (or 660) is varied around the circumference of the outer cell 610 (or 660). This allows for further tuning of the response of the body 60 (or 65) to an impact. For example, the geometry of the body 60 (or 65) depends on its position on the inside surface of a helmet so that the response to shear impact in the sagittal plane is different from the response to shear impact in the coronal plane. A helmet may comprise a plurality of bodies 60 (or 65) on its inside surface.

In embodiments of FIGS. 17a-c and 18a-d, the inner cell 600 (or 650) is retained within the outer cell 610 (or 660) by a web 620 (or 670). In some embodiments, the web 620 (or 670) retains the inner cell 600 (or 650) so that it is concentric with the outer cell 610 (or 660). In other embodiments, the inner cell 600 (or 650) is retained at a different position within the outer cell 610 (or 660).

In some embodiments of FIGS. 17a-c and 18a-d, the web 620 (or 670) is a solid material that fills the area between the inner cell 600 (or 650) and the outer cell 610 (or 660). In some embodiments, the web 620 (or 670) comprises one or more ribs 621 (or 671) extending between the inner cell 600 (or 650) and the outer cell 610 (o 660). In some embodiments, the one or more ribs 621 (or 671) define one or more holes 622 (or 672) in the web 620 (or 670). Providing one or more holes 622 (or 672) defined by the ribs 621 (or 671) in the web 620 (or 670) reduces the overall weight of the body 60 (or 65). In some embodiments, at least one surface 623 (or 673) formed by the one or more holes 622 (or 672) comprises a re-entrant geometry. Having holes 622 (or 672) with re-entrant geometry improves the energy absorbing system characteristics of the body 60 (or 65) through the mechanisms previously described in relation to re-entrant geometry. In some embodiments, the body 60 (or 65) is manufactured as a single part, such that the web 620 (or 670), inner cell 600 (or 650) and outer cell 610 (or 660) are formed of the same material and in the same manufacturing process.

In some embodiments of FIGS. 15*a-d*, 17*a-c* and 18*a-d*, the web 570 (or 620, or 670) comprises a tensile material (not shown). In some embodiments, the web 570 (or 620, or 670) comprises strain rate sensitive material. In some embodiments, the web 570 (or 620, or 670) comprises a textile. In some embodiments, the textile comprises an open weave textile; in such embodiments, the material that forms the body 55 (or 60, or 65) is forced through the open weave of the textile during molding so that the textile is integral to the body 55 (or 60, or 65). In some embodiments, the textile is configured to attach to a hook and loop system. This allows the body 55 (or 60, or 65) to be removably attached to a surface that is also configured to attach to a hook and loop system. In other embodiments, the textile is adhered to a surface.

FIG. 19*a* shows an isometric view of an embodiment according to the present invention. FIG. 19*b* shows a front view of the embodiment of FIG. 19*a*. FIG. 19*c* shows a side view of the embodiment of FIG. 19*a*. FIG. 19*d* shows a cross section view of section A-A of FIG. 19*b*. Energy absorbing systems 70, according to embodiments of FIGS. 19*a-d*, comprise two bodies 75, 80, which are according to embodiments described with reference to FIGS. 17*a-c* and 18*a-d*. The inner cell 750 and the outer cell 760 of the first body 75 are smaller than the respective inner cell 800 and outer cell 810 of the second body 80.

In embodiments of FIGS. 19*a-d*, the inner cell 750 of first body 75 is configured to interlock with the second body 80 along the central axis 71 of the bodies 75, 80. In embodiments of FIGS. 19*a-d*, the outer cell 810 of the second body 80 is large enough to surround the outer cell 760 of the first body 75. In some embodiments, the inner cell 800 of the second body 80 comprises a re-entrant recess 801 with an opening 802. In embodiments, the opening 802 has a smaller diameter than the widest diameter of the inner cell 750 of the first body 75. In some embodiments, the inner cell 750 of the first body 75 comprises a re-entrant recess 751 with an opening 752. In some embodiments, the inner cell 750 of the first body 75 is interlocked with the inner cell 800 of the second body 80. In some embodiments, the inner cell 750 of the first body 75 is forced through the opening 802 into the re-entrant recess 801 of the inner cell 800 of the second body 80. In some embodiments, the first body 75 and the second body 80 are in opposite orientations when interlocked.

Embodiments according to FIGS. 19*a-d* provide a plurality of re-entrant geometries, causing the bodies 75, 80 in the system 70 to fold in on themselves and each other upon impact. Thus, a greater proportion of material remains at the impact site to absorb energy, as compared to bodies 55 (or 60, or 65) alone.

Embodiments of the invention according to FIGS. 15*a-d*, 17*a-c* and 18*a-d* comprise a plurality of bodies 55 (or 60, or 65). The plurality of bodies 55 (or 60, or 65) define a layer of bodies. Each body 55 (or 60, or 65) in the layer of bodies is connected to a base element (not shown). In some embodiments, at least one of the bodies 55 (or 60, or 65) is removably connected to the base element. In some embodiments, at least one of the bodies 55 (or 60, or 65) is rotatably connected to the base element. In some embodiments, the base element comprises the web 570 (or 620, or 670) of at least one of the bodies 55 (or 60, or 65). In some embodiments, at least one of the bodies 55 (or 60, or 65) in the layer of bodies may be replaced by a system 70 comprising two bodies 75, 80. In some embodiments, the base element is a tensile layer. In some embodiments, the base element comprises strain rate sensitive material. In some embodiments, the base element is a textile. In some embodiments, the layer of bodies and the base element are manufactured as a single part.

Embodiments according to FIGS. 15*a-d*, 17*a-c*, 18*a-d* and 19*a-d* comprise methods for manufacturing a flexible energy absorbing system. In embodiments, the method comprises forming a body, wherein forming the body comprises forming an inner cell, forming an outer cell, wherein at least one of the inner cell and outer cell is formed with a re-entrant geometry, and forming a web to retain the inner cell within the outer cell. The method further comprises forming an overhang in the inner cell at an opening of the inner cell and forming a different overhang in the outer cell at an opening of the outer cell, wherein the body comprises strain rate sensitive material. In some embodiments, at least one of forming the inner cell, forming the outer cell and forming the web comprises molding. In some embodiments, the molding comprises injection molding. In some embodiments, at least one of forming the inner cell, forming the outer cell and forming the web comprises additive manufacturing (for example 3D printing).

In some embodiments, the methods for manufacturing embodiments according to FIGS. 15*a-d*, 17*a-c*, 18*a-d* and 19*a-d* comprise forming the inner cell, outer cell and web as a single part. In some embodiments, the method comprises forming a plurality of bodies, forming a base element and connecting each of the plurality of bodies to the base element. In some embodiments, the plurality of bodies and the base element are formed as a single part.

Embodiments of the present invention comprise a flexible energy absorbing system comprising a sheet of one or more cells, wherein at least one cell in the sheet comprises a re-entrant geometry, wherein the at least one cell comprises an anisotropic geometry, and wherein the sheet comprises an elastomeric material.

FIG. 20*a* shows an isometric view of an embodiment according to the present invention. FIG. 20*b* shows a front view of the embodiment of FIG. 20*a*. FIG. 20*c* shows a cross-section view of section A-A of FIG. 20*b*. FIG. 20*d* shows a cross section view of section B-B of FIG. 20*b*. Energy absorbing systems 85, according to embodiments of FIGS. 20*a-d*, comprise one or more re-entrant and anisotropic cells 850. In some embodiments, at least one of the one or more cells 850 comprises anisotropic geometry, wherein the, or each, cell 850 comprises a major and a smaller, minor axis (not shown). The major axis and minor axis are normal to the respective central axis 86 of the, or each, cell 850. In some embodiments, at least one of the one or more cells 850 comprises anisotropic geometry, wherein the, or each, cell 850 comprises a wall 851 with a non-uniform thickness.

In some embodiments, the system 85 comprises a plurality of cells 850. In some embodiments, each cell 850 in the system 85 is re-entrant and anisotropic.

In some embodiments, at least one of the one or more cells 850 comprise an elastomeric material. In some embodiments, at least one of the one or more cells 850 comprise a damping material. In some embodiments, at least one of the one or more cells 850 comprise strain rate sensitive material.

In embodiments according to FIGS. 20*a*-20*d*, the, or each, cell 850 comprises a wall 851 extending around the perimeter of the respective cell 850. The wall 851 comprises an overhang 852 at an opening 853 of the respective cell 850. The, or each, cell 850 comprises a cell base 854 at an opposite end of the wall 851 to the opening 853.

In some embodiments, the one or more cells 850 are joined by a base 860. In some embodiments, the base 860 comprises elastomeric material. In some embodiments, the base 860 comprises a damping material. In some embodiments, the base 860 comprises a polymer, for example polypropylene. In some embodiments, the base 860 comprises strain rate sensitive material. In some embodiments, the base 860 comprises a textile. In some embodiments, the base 860 is comprised of the same material as at least one of the one or more cells 850. In some embodiments, the one or more cells 850 are integral to the base 860.

In some embodiments, an additional layer (not shown) is adhered to the back surface 861 of the base 860. In some embodiments, the additional layer is an adhesive layer, and is used to adhere the energy absorbing system 85 to a surface. For example, the system 85 may be adhered to the inner surface of a helmet. The one or more cells 850 have a low height along the direction of the central axis 86, which increases comfort when the system 85 is placed on an inner surface of a helmet or other protective item.

The anisotropic geometry of the cells 850 increases the performance of the system 85 in absorbing impacts to the system 85 from different directions, in particular shear impacts.

Currently no motorcycle helmet test standards measure the rotational acceleration in an impact and as such there is no 'off the shelf' test equipment available to conduct these types of tests. Therefore a bespoke test rig has been employed to compare the energy absorbing performance of embodiments according to the present invention with helmets without any inserts according to the present invention.

The test rig employs a 5 meter drop test rig so as to be able to replicate a number of test set-ups which may or may not be included in new test standards. The rig uses a 16 channel data logger at 50 kHz to capture accelerations in the head, loads on the striker and loads and moment in the Hybrid III (crash test dummy) neck. In addition Phantom high speed cameras have recorded each test in video at 5,000 frames per second for reference and post-processing analysis. A typical 3,2,2,2 array of accelerometers was used to measure head form kinematics. Over 150 tests have been conducted on the helmet test rig and the majority of these have been captured on a high speed video camera to verify the results.

Linear acceleration has been measured in impacts of helmets with and without the advanced systems in this patent filing at 2 m/s, 4.3 m/s, 6.2 m/s and 7.5 m/s. The reduction of linear acceleration for test subjects employing embodiments of the present invention at these speeds was up to 37%, 35%, 43% and 22% respectively. The results achieved in testing with standard helmets with embodiments of the present invention have shown a considerable improvement in helmet performance, as described below.

Figure 21:
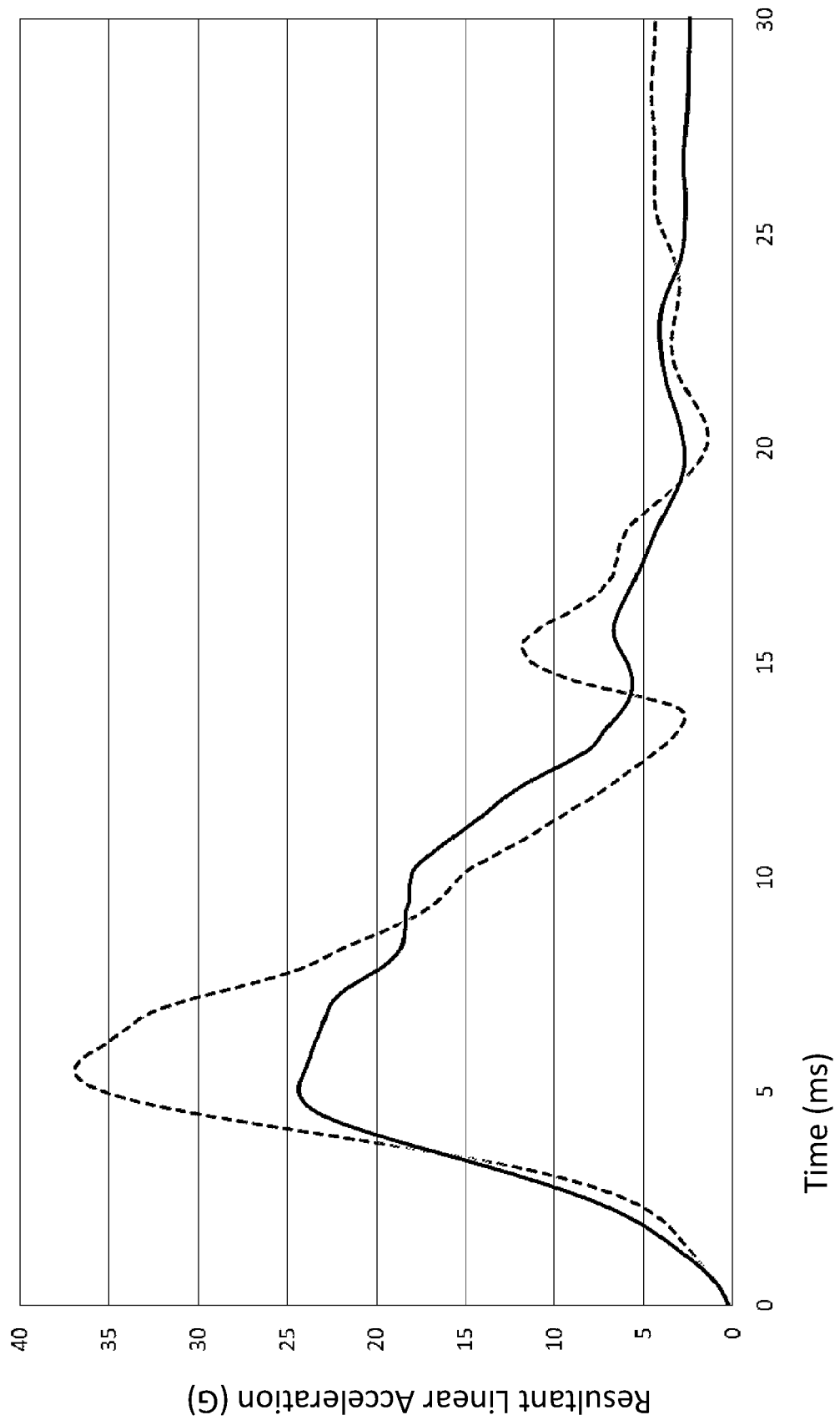
FIG. 21 shows time v linear acceleration results for examples of embodiments according to the present invention.

FIG. 21 shows the results of measuring linear acceleration for an oblique frontal impact at 30 degrees from vertical. An EPS motorcycle helmet was tested, and used as the reference, the results of which are shown in FIG. 21 as the dashed line. An identical helmet was then tested again, with inserts according to embodiments described herein with reference to FIGS. 19*a*-*d*, the results of which are shown in FIG. 21 as the solid line. FIG. 21 shows that the introduction of the energy absorbing systems according to the present invention resulted in a reduction in peak linear acceleration of over 12 G. Furthermore, the aftershocks of the impact were also attenuated by the introduction of the energy absorbing systems of the present invention.

Figure 22:
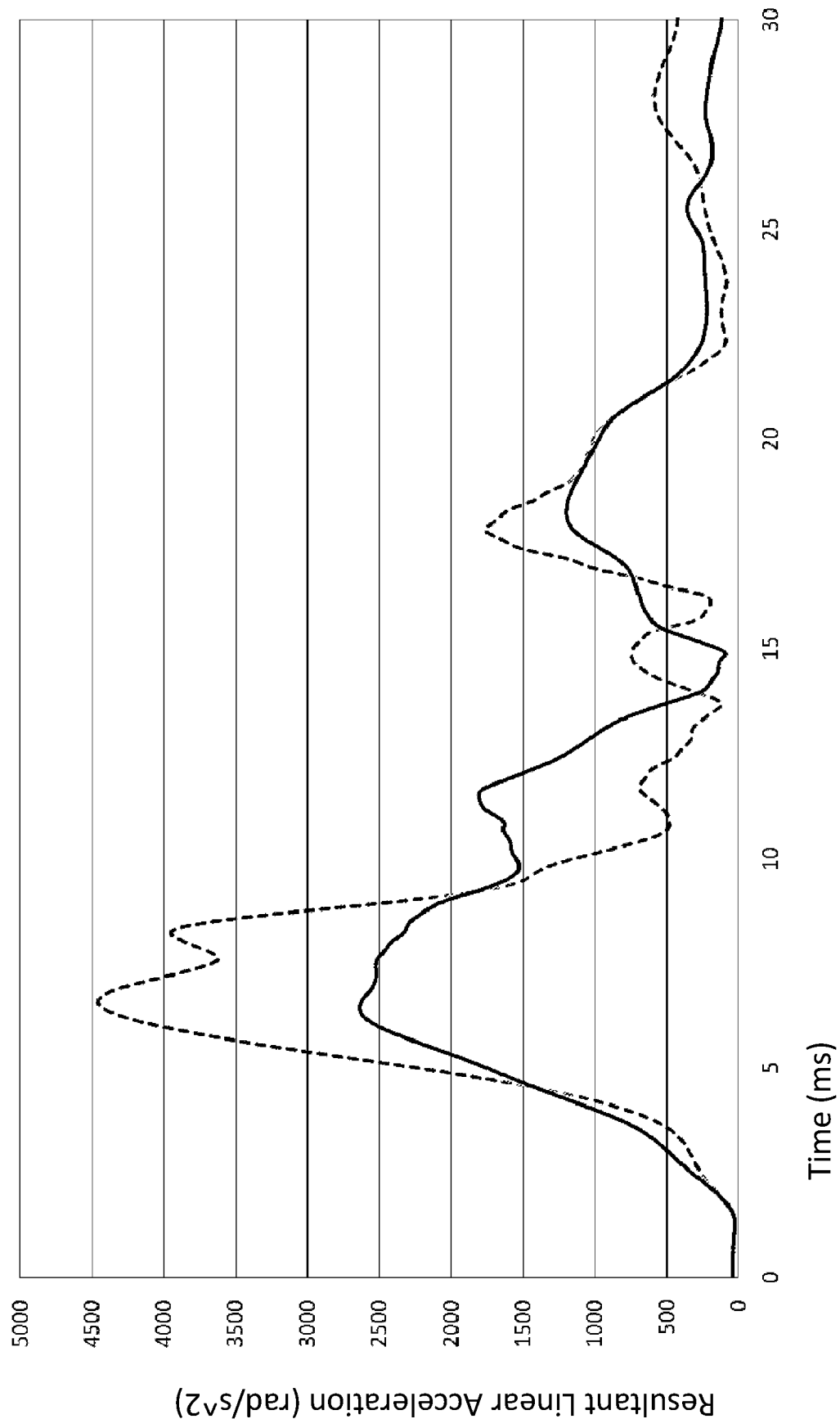
FIG. 22 shows time v rotational acceleration results for examples of embodiments according to the present invention.

Rotational acceleration was also measured in oblique impacts of the same motorcycle helmets, with and without the embodiments described herein with reference to FIGS. 19*a*-*d*. Tests were conducted at 4.3 m/s and 6.2 m/s. It is practically difficult to create an oblique impact at a low speed of 2 m/s, so the test regime was altered to include a higher speed. The reduction of rotational acceleration during tests at these speeds was up to 40%, 46% respectively. FIG. 22 shows the results of measurements of rotational acceleration for an oblique frontal impact at 30 degrees from vertical. Again, an EPS motorcycle helmet was tested, and used as the reference, the results of which are shown in FIG. 22 as the dashed line. An identical helmet was then tested again, with inserts according to embodiments described herein with reference to FIGS. 19*a*-*d*, the results of which are shown in FIG. 22 as the solid line. FIG. 22 shows that peak rotational acceleration was reduced by over 1,500 rad/s2.

Figure 23:
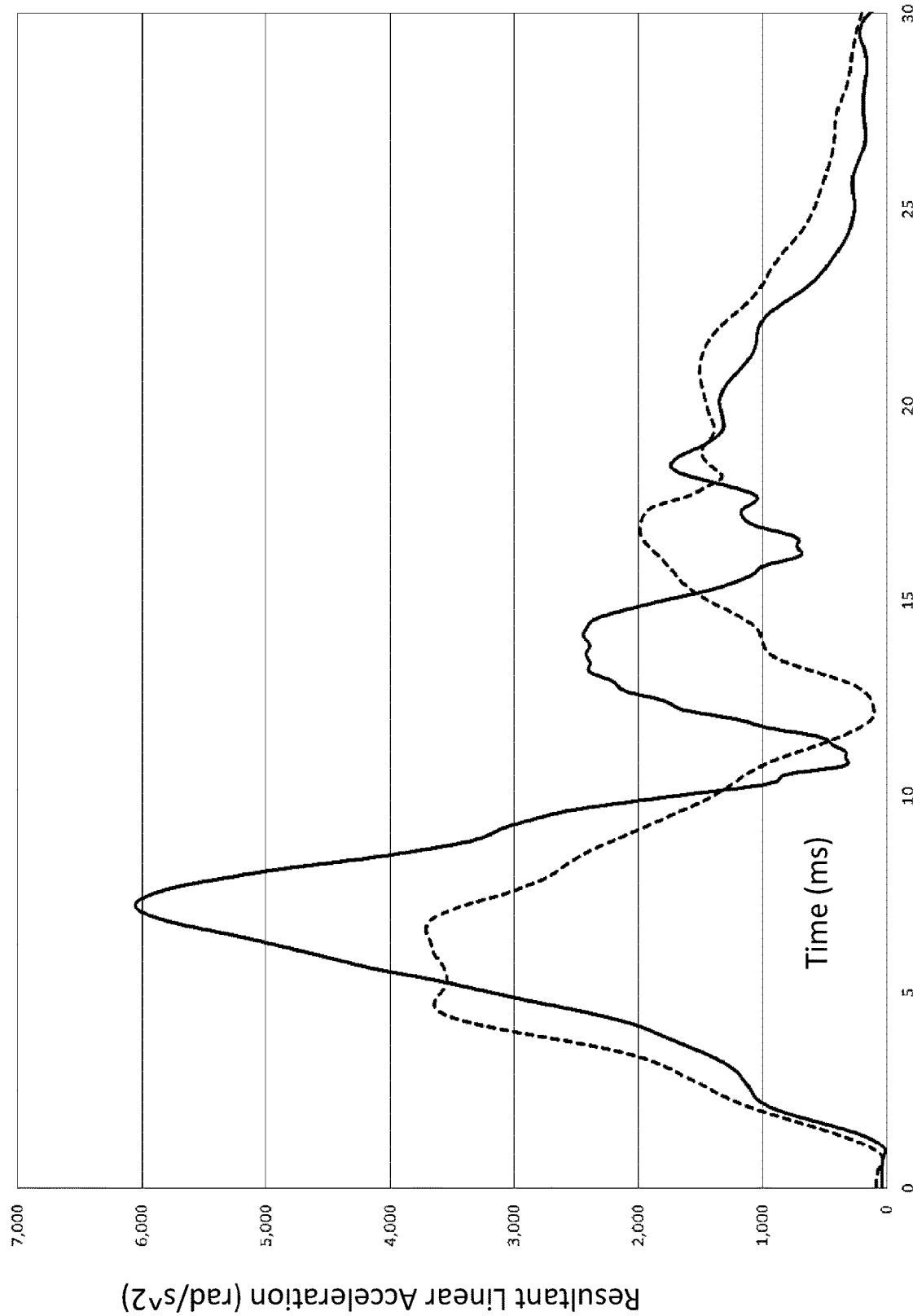
FIG. 23 shows time v rotational acceleration results for examples of embodiments according to the present invention.

A helmet comprising a foam liner (VNR), typically used in ice hockey, was also measured for rotational acceleration, shown in FIG. 23 as the solid line. An identical helmet was then fitted with inserts according to embodiments of the present invention described herein with reference to FIGS. 20*a*-*d*, shown in FIG. 23 as the dashed line. FIG. 23 shows that embodiments of the present invention reduce rotational acceleration even in helmets designed for multi-impacts, and which do not traditionally use EPS. The reduction in rotational acceleration was over 2,200 rad/s2.

Figure 24:
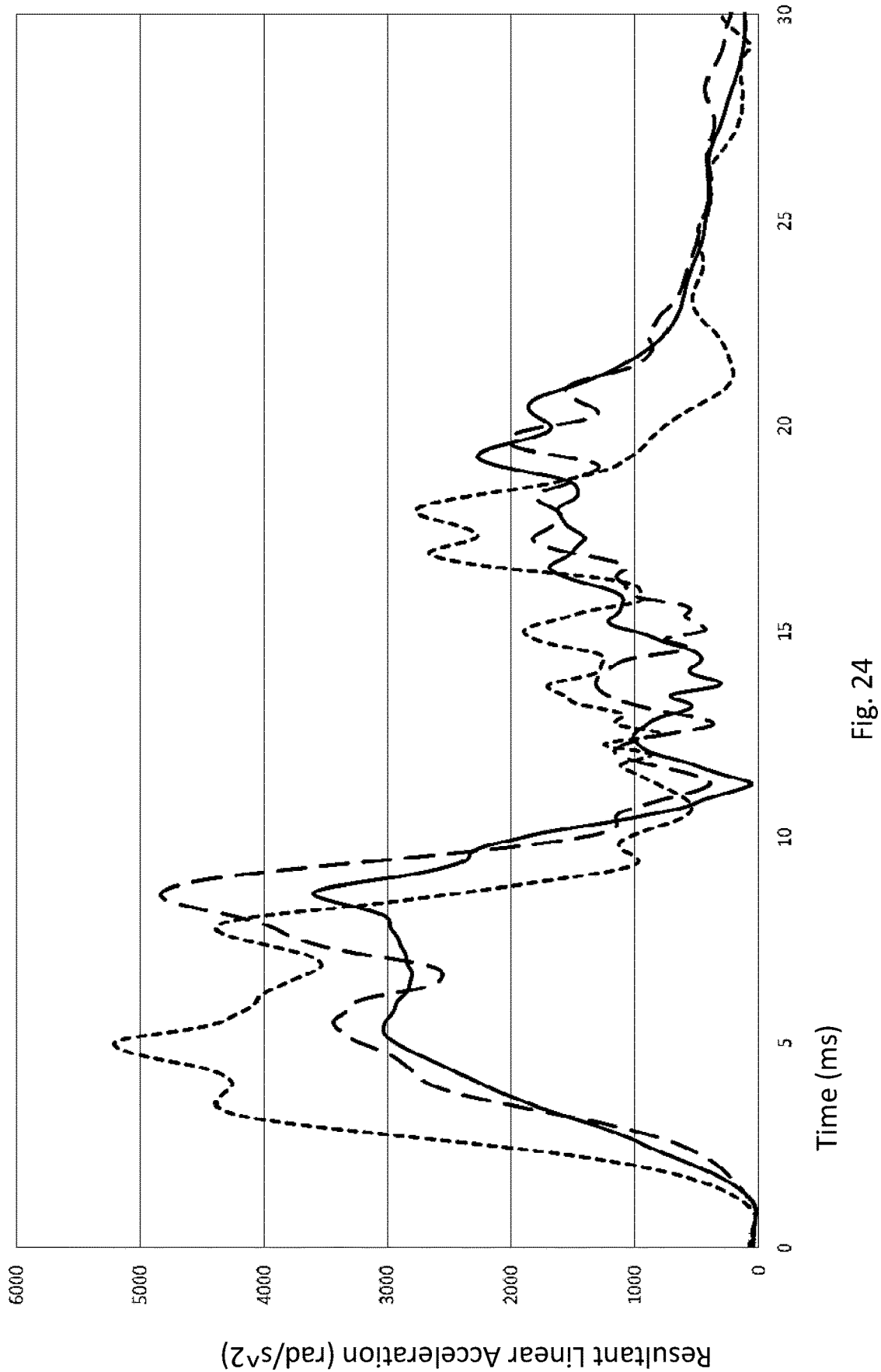
FIG. 24 shows time v rotational acceleration results for examples of embodiments according to the present invention.

In a further test, a mountain bike helmet was tested under an oblique frontal impact at 30 degrees, shown as the line with small dashes on FIG. 24. A second identical helmet was equipped with a Multi-directional Impact Protection System (MIPSTM), shown as the line with longer dashes on FIG. 24. A third helmet was equipped with eight energy absorbing systems according to embodiments of the present invention as described herein with reference to FIGS. 19*a*-*d*, shown as the solid line on FIG. 24. FIG. 24 shows that the peak rotational acceleration was lowest for the helmet comprising embodiments according to the present invention. Compared to the standard helmet, peak rotational acceleration was reduced by over 1,500 rad/s2. Compared to the helmet lined with MIPSTM, peak rotation acceleration was reduced by over 1,000 rad/s2.

Figures 25A, 25B:
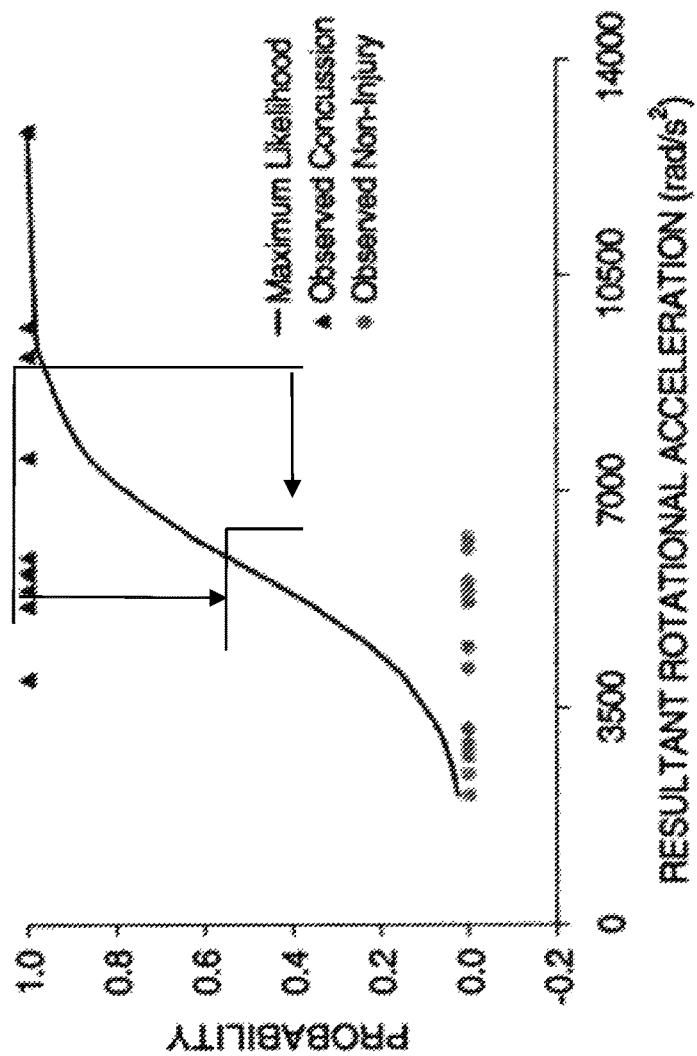
FIGS. 25a-b show suggested injury thresholds for Mountain Biking Injuries based on linear and rotational acceleration.

FIGS. 25*a*-*b* show suggested injury thresholds for mountain bike injuries (MTBI), as suggested by research paper "Zhang, Liying, King H. Yang, and Albert I. King; "A proposed injury threshold for mild traumatic brain injury"; Journal of biomechanical engineering 126.2 (2004): 226-236". Using the suggested injury thresholds shown in FIGS. 25*a*-*b*, it is possible to relate the effect of reduction in linear and rotational acceleration to survivability and risk of brain damage. The curve describing the risk of MTBI in FIG. 25*a*-*b* shows a non-linear relationship with rotational acceleration. The same can be said for the relationship with linear acceleration. For oblique impacts at 6.2 m/s the liners employing embodiments of the present invention shows a reduction in rotational acceleration from 7300 rad/s2 to 3900 rad/s2. This represents a reduction in the probability of attaining MTBI from nearly 80% down to less than 25%; a reduction of almost 70%. At the same speed, the linear acceleration is reduced by 43%. These results clearly show the potential for embodiments of the present invention to reduce the probability of sustaining MTBI according to injury thresholds defined in an independent research paper.

Embodiments according to FIGS. 15a-20d allow for an intelligent approach to optimizing geometry in an energy absorbing system so that the response to impacts from different directions is different.

Figure 26B:
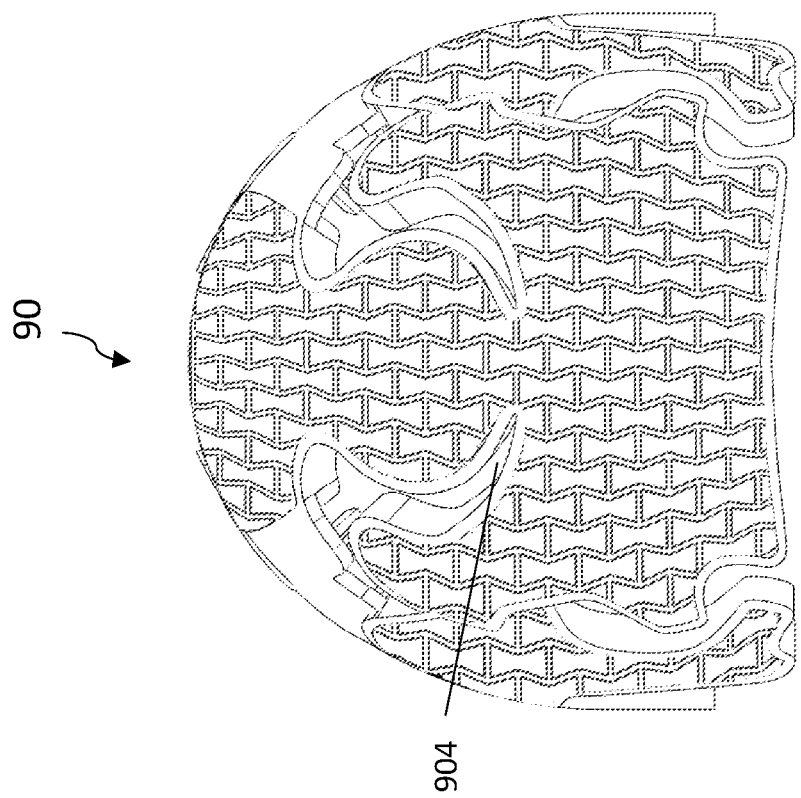
FIGS. 26a-b show a top view of an energy absorbing system according to embodiments of the invention in a planar form and a front view of the energy absorbing system in an aspherical form, respectively.
Figure 26A:
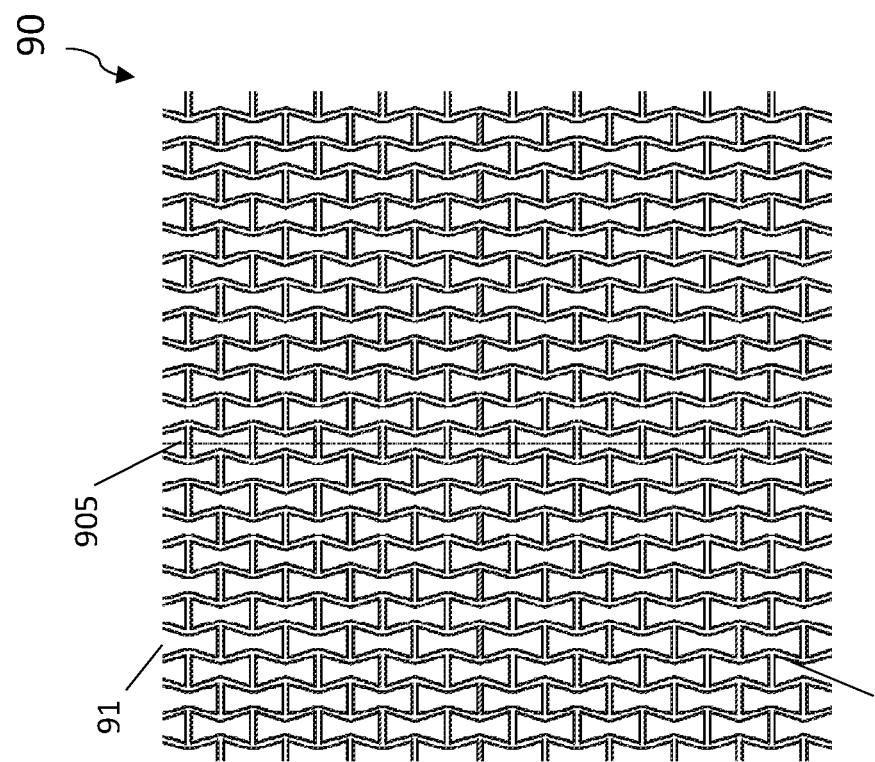

FIG. 26a shows a top view of a flexible energy absorbing system 90 according to embodiments of the present invention. The system 90 comprises a plurality of cells 900 on a plane 91. The cells 900 of system 90 comprise strain rate sensitive material. The system 90 is configurable in a planar form, as shown in FIG. 26a, and in an aspherical form, as shown in FIG. 26b. FIG. 26b shows a side view of the system 90 when configured in the aspherical form. When the system 90 is configured in the aspherical form, the cells 900 comprise a re-entrant geometry. In some embodiments, the system 90 is configurable in other forms, for example a curved form.

In some embodiments according to FIGS. 26a-b, when the system 90 is configured in the aspherical form, the cells 900 comprise a re-entrant geometry in non-radial directions relative to the aspherical form. In some embodiments according to FIG. 26a, when the system 90 is configured in the planar form, the cells 900 comprise a re-entrant geometry along the plane 91, for example along line 905 of FIG. 26a.

FIGS. 27a-c show an isometric view, top view and side view of a cell 900 of the system 90, respectively. In some embodiments, when the system 90 is configured in planar form, walls 901 of the cells 900 are arranged vertically, normal to the plane 91. In some embodiments, the walls 901 have a tapering geometry as shown in FIG. 27c, wherein the width of the walls 901 is smaller at the top of the cells 900 than at the bottom of the cells 900. In some embodiments, when the system 90 is configured in planar form, at least one wall 901 has a re-entrant geometry in a direction normal to the plane 91. In some embodiments, the re-entrant geometry in a direction normal to the plane 91 comprises a plurality of corrugations or folds (e.g. see FIG. 8d). In some embodiments, the re-entrant geometry in a direction normal to the plane 91 comprises one or more of a tapering cylinder, a tapering rectangular prism, a tapering polygonal prism (e.g. see FIG. 1), and a tapering anisotropic geometry (e.g. see FIG. 3a).

In this embodiment, the walls 901 of each of the plurality of cells 900 comprise one or more corrugations or folds along the plane 91. In some embodiments, each corrugation or fold is inwardly angled to form a re-entrant angle along the plane 91.

In some embodiments, one or more of the cells 900 are anisotropic, resulting in a system 90 that has a different response to impacts in different directions. The cells 900 may also provide a different response to impacts in different directions when the system 90 is in planar form as compared to in the aspherical form.

Figure 28C:
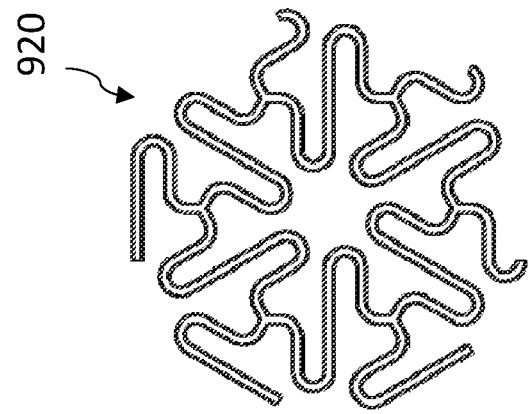
FIGS. 28a-c show a top view of an energy absorbing system according to embodiments of the invention in a planar form and an isometric view and a top view of a cell of the energy absorbing system, respectively.
Figure 28B:
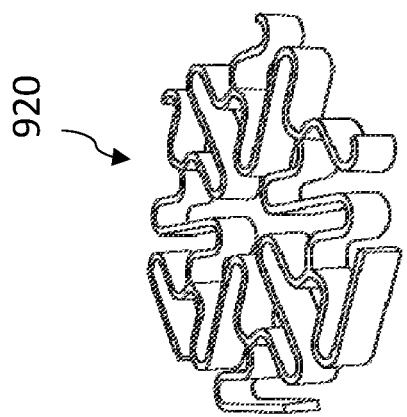
Figure 28A:
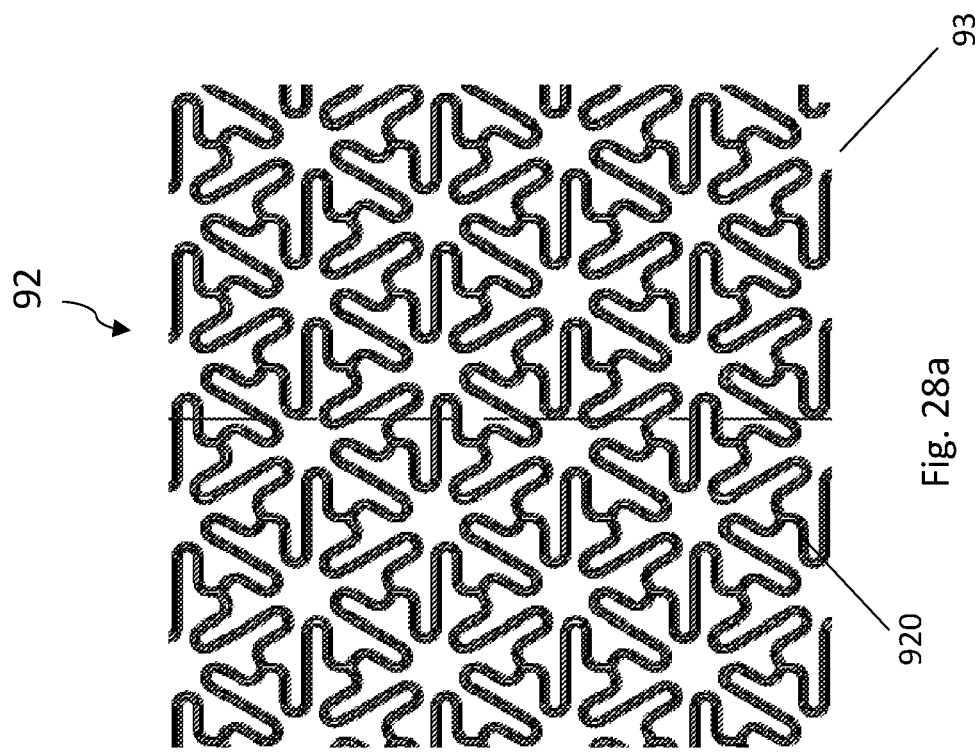

FIG. 28a shows a top view of a flexible energy absorbing system 92. The system 92 comprises a plurality of cells 920 on a plane 93. The system 92 is configurable in a similar manner to system 90 and may comprise any of the features described with reference to the system 90. In this embodiment, the cells 920, as shown in FIGS. 28b-c, are a different shape to the cells 900 of system 90. Each cell 920 comprises a plurality of corrugations or folds along the plane 93, the corrugations or folds being in a plurality of different directions along the plane 93. The geometry of the cells 920 may provide a more flexible system 92 than the system 90, which may allow the system to curve on a tighter radius when in the aspherical form than the system 90.

FIG. 29a shows a top view of a flexible energy absorbing system 94. The energy system 94 is configurable in a similar manner to systems 90 and 92 and may comprise any of the features described with reference to the system 90. The system 94 comprises a plurality of cells 940, having re-entrant features similar to the cells 900 and 920 of the systems 90 and 92, respectively. In this embodiment, the cells 940 are substantially triangular, but in other embodiments, the cells 940 may have any other geometry that is re-entrant along the plane 95. In this embodiment, the cells 940 comprise a thickened wall 941 at the vertices of the cells 940. The thickened wall 941 comprises an opening 942 having a re-entrant geometry in a direction normal to the plane 95 when the system is in the planar form. When the system 94 is in the aspherical form, the re-entrant geometry in the direction normal to the plane 95 when the system 94 is in the planar form, is in a radial direction. In this embodiment, the re-entrant geometry in the direction normal to the plane 95 has a geometry similar to that described with reference to FIGS. 8d and 9b. In other embodiments, the openings 942 may be any other shape with a re-entrant geometry normal to the plane 95. In other embodiments, the thickened wall 941 may be at any other location in the system 94.

FIG. 30a shows a top view of a flexible energy absorbing system 96. The energy system 96 is configurable in a similar manner to systems 90, 92 and 94. FIG. 30b shows the system 96 configured in the aspherical form. The system 96 comprises a plurality of cells 960 comprising cells comprising a first geometry 961 and cells comprising a second different geometry 962, as shown in FIGS. 30c and 30d.

In this embodiment, the cells comprising the first geometry 961 are the same as those described above with reference to FIGS. 3a-e and have re-entrant geometry in a direction normal to the plane 97 of the system 96 when in planar form. In other embodiments, the cells 961 could have any other re-entrant geometry normal to the plane 97. In this embodiment, the cells comprising the second geometry 962 comprise a re-entrant geometry in a direction along the plane 97 of the system 96 when in planar form. In other embodiments, the cells 962 could have any other re-entrant geometry along the plane 97.

In this embodiment, the cells comprising the second geometry 962 are interspersed between the cells comprising the first geometry 961. In other embodiments, the cells 960 could be arranged in any other way along the plane. This provides a system 96 with an anisotropic response to impacts in different directions. In some embodiments, the layout of the cells 960 in the plane influences the amount of flex in the system 96 and thus the aspherical radius that the system 96 can achieve. In this embodiment, the cells comprising the second geometry 962 have a different flexing response than the cells comprising the first geometry 961, in order to facilitate configuration of the system 96 from the planar form to the aspherical form.

The re-entrant geometry of the plurality of cells 900, 920, 940, 960 of a respective system 90, 92, 94, 96 may be according to any of those described above in relation to FIG. 1-6, 9-8, 14-15, 17-18 or 20, or a combination of two or more of them.

In some embodiments, the systems 90, 92, 94 and 96 are manufactured on the plane 91, 93, 95, 97, and configurable to the aspherical form after manufacture. This permits cost effective and simple manufacturing, whilst creating a threedimensional system 90, 92, 94, 96 that is re-entrant in different directions both along the plane 91, 93, 95, 97 and out of the plane 91, 93, 95, 97. In addition, a planar system 90, 92, 94, 96 of particular geometry may have multiple applications. For example, the system 90, 92, 94, 96 may be used to create different aspherical systems, for example with different surface profiles. In some embodiments, the plurality of cells 900, 920, 940, 960 of a respective system 90, 92, 94, 96 are interlinked with one another. For example, FIG. 27*a* shows a wall 902 which links a first cell in the plurality of cells 900 to a second cell. In some embodiments, the cells 900, 920, 940, 960 of a respective system 90, 92, 94, 96 are linked together by a base element (not shown) to connect the plurality of cells 900, 920, 940, 960 on the plane. In some embodiments the base element is integral to the plurality of cells 900, 920, 940, 960. In some embodiments, the base element comprises a strain rate sensitive material. In some embodiments, the base element comprises a tensile layer, for example a textile.

In some embodiments, the system 90, 92, 94, 96 comprises a flexing mechanism for facilitating configuration of the system from the planar form to the aspherical form. In some embodiments, the flexing mechanism comprises an absence of cells, which increases the flex in the system 90, 92, 94, 96 at an area absent of cells. An example absence of cells is shown in area 963 of system 96 in FIG. 30*b*. In some embodiments, the flexing mechanism comprises an orientation of cells 900, 920, 940, 960. For example, as shown in FIG. 30*a*, at least a subset of the plurality of cells 960 are arranged according to a first curvature 967 when the system 96 is configured in the planar form. This configuration of cells 960 on the first curvature facilitates flex of the system to the aspherical form shown in FIG. 30*b*. The radius of the curve may be selected based on the desired aspherical form so that the cells 960 are in a predetermined orientation when the system 96 is configured in the aspherical form. Alternatively or additionally, at least a subset of the plurality of cells 900, 920, 940, 960 are arranged according to a second curvature 968 when the system is configured in the aspherical form. In some of these embodiments, the first curvature 967 is at a different orientation to the second curvature 968.

In some embodiments, the flexing mechanism comprises a slit, as shown as slit 904 in FIG. 26*b* and slit 964 in FIG. 30*a*. In some embodiments, the flexing mechanism comprises a textile portion. In an embodiment, the textile portion is integral with the system 90, 92, 94, 96. In some embodiments, the flexing mechanism comprises at least part of the base element. In some embodiments, the flexing mechanism comprises one or more slits in the base element.

In some embodiments, the system 90, 92, 94, 96 comprises at least two interconnected portions of cells. For example, first portion 965 and second portion 966 shown in FIG. 30*a*. In some embodiments, a first portion 965 has a first shape and a second portion 966 has a second different shape.

Embodiments comprise a flexible energy absorbing system comprising a plurality of cells. In embodiments, the cells comprise a strain rate sensitive material. In embodiments, the system is configurable in a planar form and a non-planar form; in some such embodiments, when configured in the non-planar form, the cells comprise a re-entrant geometry. The non-planar form may comprise an aspherical form or any other form which is not aspherical (or planar).

FIG. 31*a* shows an isometric view of a flexible energy absorbing system 98 according to an embodiment of the present invention. FIG. 31*b* shows a front view of the system 98. The system 98 comprises a cell 990 with a constant cross-section along a first axis 981 and a re-entrant geometry along a second axis 982. The cell 990 comprises a strain rate sensitive material. In this embodiment, the system 98 comprises three cells 990, 991, 992, collectively labelled 980, with a constant cross-section along a first axis 981 and a re-entrant geometry along a second axis 982. In some embodiments, the system 98 comprises one or more cells further 992, 992. In some embodiments, the one or more further cells 991, 992 each have the same geometry and orientation as the cell 990. In other embodiments, a subset of the one or more cells 980 has a different geometry to another different subset of the one or more cells 980.

In some embodiments, the second axis 982 is substantially normal to the first axis 981. In some embodiments, the one or more cells 980 comprise an extrusion.

In some embodiments, the one or more cells 980 comprise at least one wall 983, the at least one wall 983 being formed of at least one corrugation or fold 984, the at least one corrugation or fold 984 being inwardly angled to form a re-entrant angle. In some examples, the cross-section of the one or more cells 980 comprises a re-entrant dome structure 985.

In some embodiments, the system 98 comprises a base element 986 connecting a cell 990 to at least one further cell 991. The base element may be as described with reference to any other base element as described herein.

Embodiments of the present invention provide body armor comprising a flexible energy absorbing system according to any of the examples described herein.

In some embodiments, a combination of the systems described herein are used in the same piece of body armor. The body armor may be, for example, a back protector, a headband, a knee pad, an elbow pad, a glove or a helmet. The body armor may for example be used for protecting users during sporting, industrial and/or military activities.

In some embodiments, a system according to the present invention is used to create non-planar, ergonomic energy absorbing body armor. In some embodiments, the thickness of the system is selected based on the type of body armor and the intended use of the body armor. In some embodiments, the shape of first and second portions 965, 966 of a system 90, 92, 94, 96 are optimized around particular parts of the body armor so that the geometries of the cells 900, 920, 940, 960 are mapped in 2D or 3D so that they follow the curvature of the body armor. In some embodiments, the geometry of the cells 900, 920, 940, 960 used in the first and second portions 965, 966 are selected to optimize energy absorption at different locations in the body armor.

Embodiments of the present invention provide a helmet comprising a flexible energy absorbing system according to any of the embodiments described herein. In some embodiments, a combination of the systems described herein are used in the same helmet. For example, one system may be more suitable for absorbing energy at the front of a helmet and another may be more suitable at the back of the helmet. In some embodiments, the system is selected based on the intended use of the helmet and the anticipated types of impact in use. Helmets for some sports are required to withstand multiple relatively minor impacts, whereas other helmets are required to withstand a single relatively major impact. For example, a different system may be used for a soft shell helmet used in rugby compared to a hard shell helmet used for downhill skiing.

In yet other embodiments, the system may be selected based on the shape of the helmet. For example, the system 98 may be particularly suitable for road bicycle helmets, wherein the system 98 is sectioned along the length to fit on the thinner internal edges of a road bicycle helmet, which currently have very thin sections of EPS in contact with the head. As another example, the system 98 may be die cut, perforated or stamped and placed into a helmet to give fully anisotropic performance characteristics in different directions.

In some embodiments, the aspherical shape to which the systems 90, 92, 94, 96 are configurable, are the shape of a helmet liner and the systems 90, 92, 94, 96 are placed and fixed into position in the shell of a helmet in their aspherical form. In some embodiments, the shape of the first and second portions 965, 966 are optimized around particular parts so that the geometries of the cells 900, 920, 940, 960 are mapped in 2D or 3D so that they follow the curvature of the helmet. In some embodiments, the geometry of the cells 900, 920, 940, 960 used in the first and second portions 965, 966 are selected to optimize energy absorption at different locations in the helmet. In some embodiments, the shape of the first portion 965 depends on a first parameter of the helmet and the shape of the second portion 966 depends on a second parameter of the helmet. For example, a parameter may be a radius of the helmet, a curvature of the helmet or the material at a particular location in the helmet.

In some embodiments, the systems 90, 92, 94, 96 are used between the two layers of EPS in double layer helmets. In some embodiments, the systems 90, 92, 94, 96 are used between the EPS and shell.

In some embodiments, where the systems 90, 92, 94, 96, 98 comprise a base element, the base element is used to attach the system 90, 92, 94, 96, 98 to the helmet. For example, the base element may comprise hooks or adhesive.

In some embodiments, the system 85 is used as a liner in a helmet. In some embodiments, the system 85 is used between a typical existing energy absorber used in a helmet and a liner.

In some embodiments, the systems according to embodiments of the present invention provide optimized protection in optimized locations once the systems are added and attached to body armor or a helmet. The anisotropic nature of the cells used in some of the systems according to embodiments of the present invention can give different dampening properties in different directions. In a helmet, the cells can be thought of as having one normal plane and two shear planes. The normal function can be optimized for normalized impacts, and the two shear functions can be optimized for different impact directions. Here the global effect of the helmet liner would give a different response to oblique impact in the sagittal plane to the coronal plane.

In testing, examples of systems 90, 92, 94 and 96 were tested with thicknesses ranging from 3 mm to 12 mm. The systems 90, 92, 94 and 96 resulted in performance improvements ranging from 16-37% for American football, hockey, EPS ski and motorcycle helmets.

Figures 32B, 33:
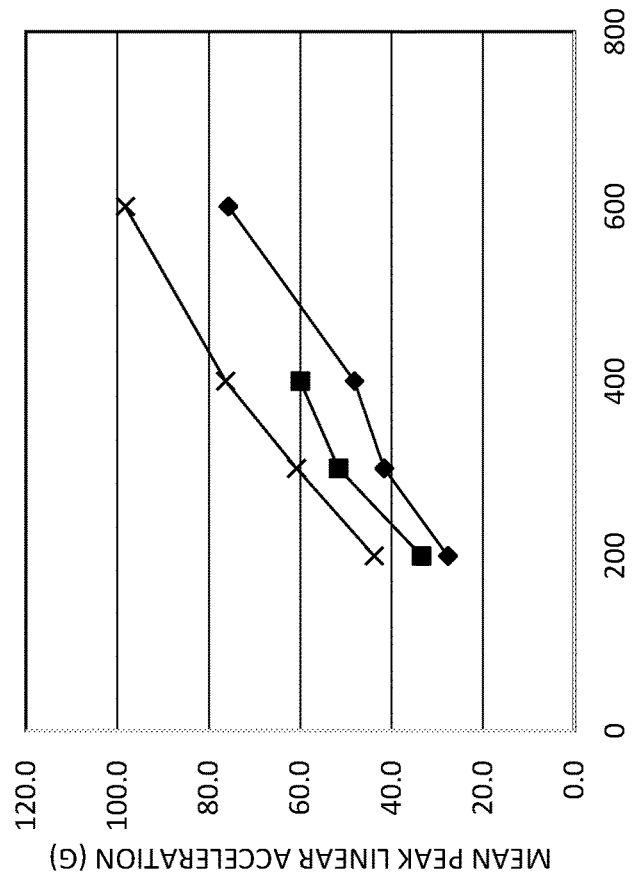

FIGS. 32*a-b* show the results of tests using flexible energy absorbing systems according to embodiments of the present invention as a lining in various helmets, which were subjected to linear and oblique impacts. FIG. 32*b* is a continuation of the table of FIG. 32*a*. The helmets had a variety of shapes, shell types and liner types. The table shows that systems according to embodiments of the present invention result in a reduction in in linear acceleration and rotational acceleration compared to standard helmets. The systems according to embodiments of the present invention provide varying levels of reduction, depending on different parameters. By way of example only, these parameters may be the type of helmet, the geometry of the system or of the cells in the system, the type and magnitude of impact, the size of the system, the nature of the base element of the system and the thickness of the system. For example, the table shows that an 8 mm thick system according to FIG. 17 provides a significant reduction in linear acceleration and rotational acceleration compared to a 6 mm thick system having the same features. FIG. 32 shows that some systems that were tested provided a reduction in acceleration of up to 45-50%.

FIG. 32 shows that a layer 310 of the system 30 provided a reduction in rotational acceleration of 50.7% for an oblique impact. In this test, the existing PU liner in an American football helmet was replaced by a layer 310 of 24 mm thickness, with some additional holes die cut into the layer 310 to reduce weight. The resultant helmet was lighter than the original helmet with the PU liner, while reducing acceleration.

The tests conducted were also tested on PORON® as a helmet liner. The systems according to embodiments of the present invention showed significantly greater reductions in acceleration compared to PORON®.

FIG. 33 shows a graph plotting drop height versus mean peak linear acceleration for a reference EPS helmet. The systems were tested on standard helmet drop apparatus on a flat anvil, as defined in BSI 13078, for linear impacts. The graph shows that the energy absorbing system 70 (FIG. 19) provides a reduction in mean peak linear acceleration of up to 37% compared to the reference EPS helmet. In addition, the system 70 provides a greater reduction in mean peak linear acceleration compared to the system 65 (FIG. 18) when in the same double configuration shown in FIG. 19. The system 65 when in the same double configuration shown in FIG. 19 provides a reduction in mean peak linear acceleration of up to 24% compared to the reference helmet. The systems improve the dynamic range of the control helmet. The linear response is improved to make a safer helmet in the sub-concussive, or below 106 g, range. The systems 65 when in the same double configuration of system 70 and 70 thus help with rotational and low speed impact of helmets, making a potentially safer helmet.

Embodiments of the present invention provide a method of manufacturing a flexible energy absorbing system, for example the system 90, 92, 94, 96. The method comprises forming a cell on a plane, forming the cell using a strain rate sensitive material, forming the system to be configurable in a planar form and in an aspherical form and forming the system such that, when configured in the aspherical form, the cell comprises a re-entrant geometry. In some embodiments, the forming comprises forming a plurality of cells on a plane. In some embodiments, the forming comprises forming the cell to have a re-entrant geometry along the plane when the system is configured in the planar form. In some embodiments, the forming comprises forming the cell to have a re-entrant geometry in a direction normal to the plane when the system is configured in the planar form. The re-entrant geometry may be any geometry as described with reference to the flexible energy absorbing systems described herein.

In some embodiments, the method comprises forming a plurality of cells, wherein the plurality of cells comprises cells comprising a first geometry and cells comprising a second different geometry. In some examples, the first geometry is re-entrant along the plane and the second geometry is re-entrant normal to the plane.

In some embodiments, the method comprises forming at least two interconnected portions of cells, wherein a first portion has a first shape and the second portion has a second different shape.

In some embodiments, the forming comprises injection molding. In some embodiments, the injection molding is in the plane of an open-shut tool. In some examples, the forming comprises manufacture in simpler single parting line tools. In some embodiments, textile is attached to the tool and the forming is molded on to the textile. In some embodiments, the manufacture in on a 3-axis machine. In some embodiments, the forming comprises additive manufacturing.

Embodiments of the present invention provide a method of manufacturing a flexible energy absorbing system. The method comprises forming a cell having a constant cross-section along a first axis, forming the cell to have a re-entrant geometry along a second axis and forming the cell using a strain rate sensitive material. In some embodiments, the method is used to manufacture a cell 980 of the system 98 of FIG. 31. In some embodiments, the method comprises forming a plurality of cells.

In some embodiments, wherein the cell comprises an extrusion, the forming of the method comprises conducting an extrusion process.

In some embodiments, for any of the methods of manufacturing described herein that comprise forming, the forming comprises injection molding and/or additive manufacturing.

Some embodiments according to the present invention comprise a method of manufacturing tools for use in the manufacture of energy absorbing systems according to the present invention. In some embodiments, the tools are manufactured using advanced manufacturing methods. In some embodiments, the tools are manufactured using advanced manufacturing technologies similar to those used in rapid prototyping. In some embodiments, the tools are manufactured using a metallic printing technique. In some embodiments, the tools are manufactured using selective laser melting, for example a Concept LaserTM. In some embodiments, the tools are manufactured from 316 Stainless steel. In some embodiments, harder materials are used, for example maraging steel.

The above methods allow for the re-entrant geometries of the parts of the energy absorbing systems according to the invention to be made in a single tool face. Undercuts in the tool(s), which give the cells, protrusions or bodies in the energy absorbing systems their re-entrant geometry, cannot be achieved with traditional manufacturing methods comprising subtractive techniques.

In some embodiments, the tool is larger than an opening in part of the energy absorbing system being manufactured. The resultant part can be pulled from the tool without the tool being opened in the traditional way because the materials being molded are elastomeric. In some embodiments, a part is manufactured with a textile in the tool. In such embodiments, the part can more easily be pulled from the tool by pulling on the textile, because the moldable material of the part is forced through the open weave structure of the textile when it is injected in to the tool.

In some embodiments, the porosity of the surface of the tool is altered to allow air to pass, but not the moldable material of the energy absorbing system being molded. In some embodiments, having a porous tool surface allows air out of the tool during injection of the moldable material. In some embodiments, having a porous tool surface allows for an air blast in to the tool to help with ejecting the part that has been molded. In some embodiments, cooling cavities are provided, which improve cycle time.

In some embodiments, the tool comprises injection ports. Such embodiments negate the need for machining runners, therefore reducing cost and time for manufacturing the tools.

These printed tools are printed on a build plate, and subsequently left on the build plate. In some embodiments, they remain stable without additional heat treatment. A common bolster can be used that accepts that build plate, using a common injection port in the bolster. This way different tools can be printed that each line up with the common injection port in the bolster. This allows for the easy change of rapid prototyped tools, into injection mold machines. In some embodiments, the injection gate from the bolster leads to a runner that is printed in the tool, thus further reducing any extra runners or gates to be machined, as these can be printed in the tool. Indeed, in some embodiments, no additional finishing is needed between 'print and mold'. In some embodiments, the mold parts may be taken off of the concept laser, cleaned, blasted if needed and then placed into the injection mold machine. In some embodiments, there is a common entry for the injection point in the bolster, and the rest of the gate details are printed in the tool. Using this technique it is possible to go from CAD, to print, to mold and onto the drop tower test apparatus in under 24 hours.

Embodiments according to the present invention described herein which describe a flexible energy absorbing system comprising strain rate sensitive material may alternatively or in addition comprise an elastomeric material.

The above embodiments are to be understood as illustrative examples of the invention. Further embodiments of the invention are envisaged. For example, the strain rate sensitive material may be any other active material. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A flexible energy absorbing system comprising:
   a plurality of cells formed from a strain rate sensitive material and connected to a base element, wherein:
   each respective cell of a first subset of the plurality of cells comprises a cell wall continuously tapering in a single direction from a first cell wall width at a first end of the cell wall attached to the base element to a second cell wall width at a second end of the cell wall opposite the base element, the cell wall having a continuous concave curvature,
   each respective cell of the first subset of the plurality of cells comprises a hole at a top of the respective cell opposite the base element,
   the plurality of cells comprise a re-entrant geometry along a re-entrant geometry axis,
   each respective cell of the first subset of the plurality of cells comprises an anisotropic geometry comprising a major axis and a minor axis, the major axis and the minor axis being perpendicular to the re-entrant geometry axis, and
   the hole at the top of each cell of the first subset of the plurality of cells comprises an anisotropic geometry comprising the major axis and the minor axis.

2. The flexible energy absorbing system of claim 1, wherein:
   each cell in the plurality of cells comprises at least one wall,
   the at least one wall has a re-entrant geometry in a direction normal to the base element, and
   the re-entrant geometry in the direction normal to the base element comprises one or more of:
      a tapering cylinder,
      a tapering rectangular prism,
      a tapering polygonal prism, or
      a tapering anisotropic geometry.

3. The flexible energy absorbing system of claim 1, wherein the plurality of cells comprises first cells comprising a first geometry and second cells comprising a second different geometry.

4. The flexible energy absorbing system of claim 1, wherein:
   the plurality of cells comprises a second subset of cells comprising a first geometry and a third subset of cells comprising a second geometry, different from the first geometry and
   the third subset of cells comprising the second geometry have a different flexing response than the second subset of cells comprising the first geometry in order to facilitate configuration of the flexible energy absorbing system from a planar form to an aspherical form.

5. The flexible energy absorbing system of claim 1, further comprising: a flexing mechanism for facilitating configuration of the flexible energy absorbing system from a planar form to an aspherical form.

6. The flexible energy absorbing system of claim 5, wherein the flexing mechanism comprises one or more of:
   an absence of cells,
   an orientation of cells,
   a slit, or
   a textile portion.

7. The flexible energy absorbing system of claim 1, further comprising:
   a flexing mechanism for facilitating configuration of the flexible energy absorbing system from a planar form to an aspherical form,
   wherein the flexing mechanism comprises one or more slits in the base element.

8. The flexible energy absorbing system of claim 1, further comprising:
   a flexing mechanism for facilitating configuration of the flexible energy absorbing system from a planar form to an aspherical form,
   wherein the flexing mechanism comprises at least part of the base element.

9. The flexible energy absorbing system of claim 1, wherein:
   at least a first set of the plurality of cells are arranged according to a first curvature when the flexible energy absorbing system is configured in a planar form,
   at least a second set of the plurality of cells are arranged according to a second curvature when the flexible energy absorbing system is configured in an aspherical form, and
   the first curvature is at a different orientation to the second curvature.

10. The flexible energy absorbing system of claim 1, further comprising:
   at least two interconnected portions of cells, wherein a first portion has a first shape and a second portion has a second, different shape.

11. A body armor, comprising:
   a flexible energy absorbing system, comprising:
      a plurality of cells formed from a strain rate sensitive material and connected to a base element, wherein:
         each respective cell of a first subset of the plurality of cells comprises a cell wall continuously tapering in a single direction from a first cell wall width at a first end of the cell wall attached to the base element to a second cell wall width at a second end of the cell wall opposite the base element, the cell wall having a continuous concave curvature,
         each respective cell of the first subset of the plurality of cells further comprises a hole at a top of the cell opposite the base element,
         the plurality of cells comprise a re-entrant geometry along a re-entrant geometry axis,
         each respective cell of the first subset of the plurality of cells comprises an anisotropic geometry comprising a major axis and a minor axis, the major axis and the minor axis being perpendicular to the re-entrant geometry axis, and
         the hole at the top of each cell of the first subset of the plurality of cells comprises an anisotropic geometry comprising the major axis and the minor axis.

12. A helmet, comprising:
   a flexible energy absorbing system, comprising:
      a plurality of cells formed from a strain rate sensitive material and connected to a base element, wherein:
         each respective cell of a first subset of the plurality of cells comprises a cell wall continuously tapering in a single direction from a first cell wall width at a first end of the cell wall attached to the base element to a second cell wall width at a second end of the cell wall opposite the base element, the cell wall having a continuous concave curvature,
         each respective cell of the first subset of the plurality of cells further comprises a hole at a top of the cell opposite the base element,
         the plurality of cells comprise a re-entrant geometry along a re-entrant geometry axis,
         each respective cell of the first subset of the plurality of cells comprises an anisotropic geometry comprising a major axis and a minor axis, the major axis and the minor axis being perpendicular to the re-entrant geometry axis, and
         the hole at the top of each cell of the first subset of the plurality of cells comprises an anisotropic geometry comprising the major axis and the minor axis.

13. A method of manufacturing a flexible energy absorbing system, comprising:
   forming a plurality of cells from a strain rate sensitive material on a base element, wherein:
      a first subset of the plurality of cells comprises a cell wall continuously tapering in a single direction from a first cell wall width at a first end attached to the base element to a second cell wall width at a second end of the cell wall opposite the base element, the cell wall having a continuous concave curvature,
      each respective cell of the first subset of the plurality of cells comprises a hole at a top of the respective cell opposite the base element,
      the plurality of cells comprise a re-entrant geometry along a re-entrant geometry axis, each respective cell of the first subset of the plurality of cells comprises an anisotropic geometry comprising a major axis and a minor axis, the major axis and the minor axis being perpendicular to the re-entrant geometry axis, and the hole at the top of each cell of the first subset of the plurality of cells comprises an anisotropic geometry comprising the major axis and the minor axis.

\* \* \* \* \*